July 10, 1962    J. B. WHITEHOUSE ETAL    3,043,069
AUTOMATIC PROCESSING APPARATUS
Filed Aug. 8, 1960    34 Sheets—Sheet 1

John B. Whitehouse
Ralph M. Lamade, Jr.
Carmelo A. DiMaggio
George H. Hall
        INVENTORS BY
        Attorney John B. Whitehouse  Ralph M. Lamade, Jr.   INVENTORS
Carmelo A. DiMaggio   George H. Hall
BY
Attorney John B. Whitehouse
Ralph M. Lamade, Jr.
Carmelo A. DiMaggio
George H. Hall
INVENTORS July 10, 1962    J. B. WHITEHOUSE ETAL    3,043,069
AUTOMATIC PROCESSING APPARATUS
Filed Aug. 8, 1960    34 Sheets-Sheet 5

John B. Whitehouse
Ralph M. Lamade, Jr.
Carmelo A. DiMaggio
George H. Hall
INVENTORS BY
Attorney John B. Whitehouse
Ralph M. Lamade, Jr.
Carmelo A. DiMaggio
George H. Hall
INVENTORS

DIRECTION OF TRAVEL

John B. Whitehouse
Ralph M. Lamade, Jr.
Carmelo A. DiMaggio
George H. Hall
  INVENTORS July 10, 1962 J. B. WHITEHOUSE ETAL 3,043,069
AUTOMATIC PROCESSING APPARATUS
Filed Aug. 8, 1960 34 Sheets-Sheet 18

John B. Whitehouse
Ralph M. Lamade, Jr.
Carmelo A. DiMaggio
George H. Hall
INVENTORS BY *Bessie A. Lepper*
Attorney John B. Whitehouse
Ralph M. Lamade, Jr.
Carmelo A. DiMaggio
George H. Hall
INVENTORS

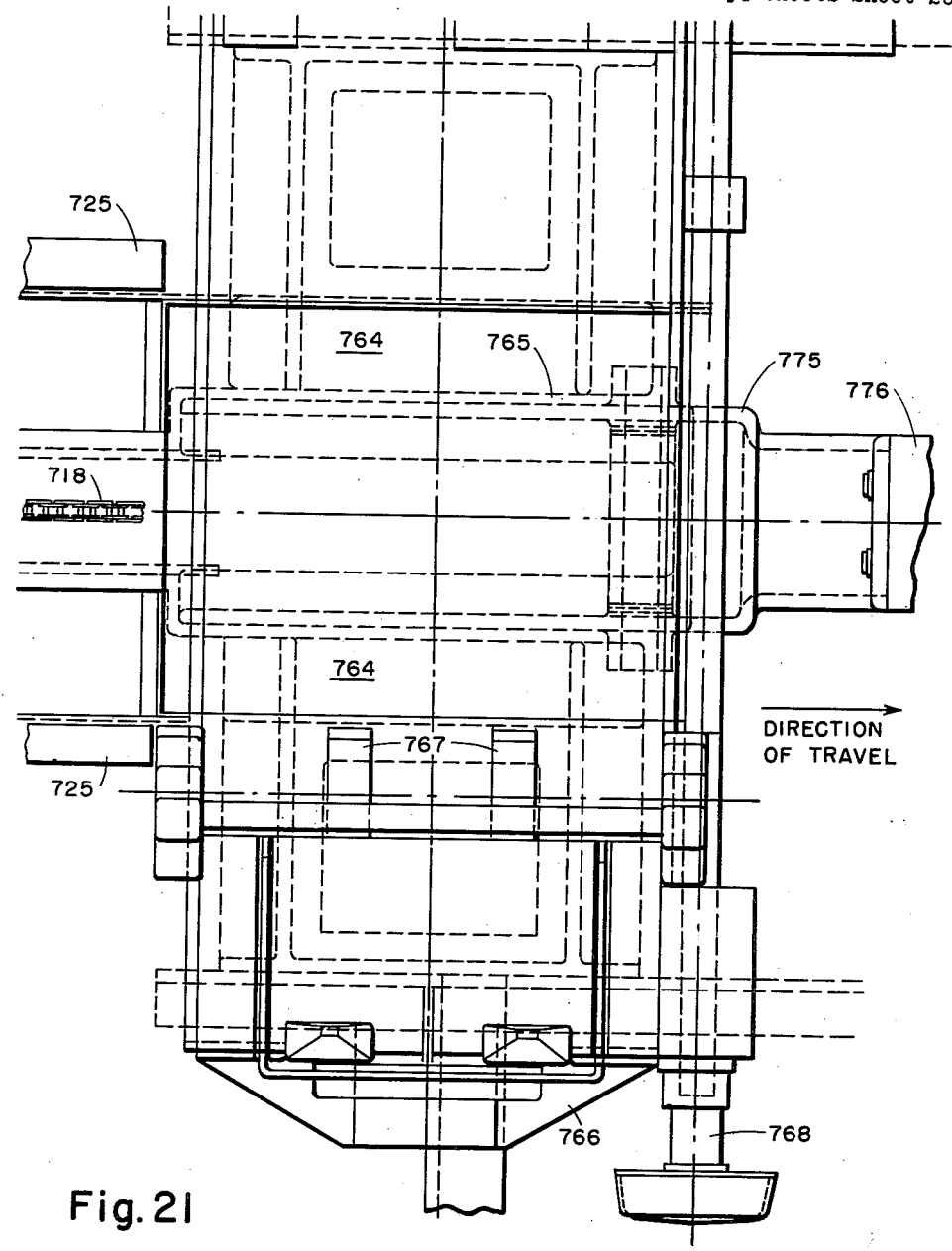

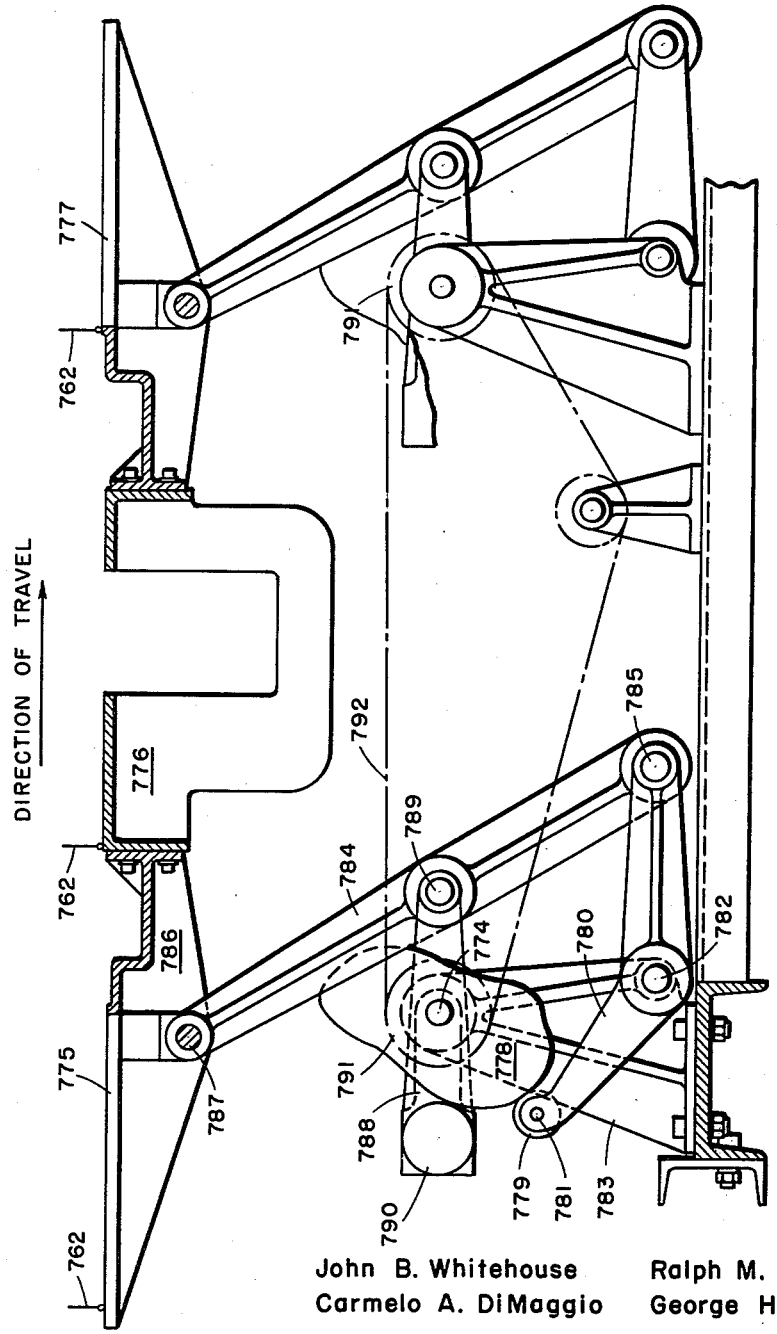

John B. Whitehouse
Ralph M. Lamade, Jr.
Carmelo A. DiMaggio
George H. Hall
*INVENTORS*

DIRECTION OF TRAVEL

John B. Whitehouse  Ralph M. Lamade, Jr.   INVENTORS
Carmelo A. DiMaggio  George H. Hall John B. Whitehouse
Ralph M. Lamade, Jr.
Carmelo A. DiMaggio
George H. Hall
INVENTORS John B. Whitehouse
Ralph M. Lamade, Jr.
Carmelo A. DiMaggio
George H. Hall
INVENTORS July 10, 1962  J. B. WHITEHOUSE ETAL  3,043,069
AUTOMATIC PROCESSING APPARATUS
Filed Aug. 8, 1960  34 Sheets-Sheet 26

John B. Whitehouse
Ralph M. Lamade, Jr.
Carmelo A. DiMaggio
George H. Hall
    INVENTORS BY
    Attorney John B. Whitehouse  Ralph M. Lamade, Jr.   INVENTORS
Carmelo A. DiMaggio  George H. Hall John B. Whitehouse
Ralph M. Lamade, Jr.
Carmelo A. DiMaggio
George H. Hall

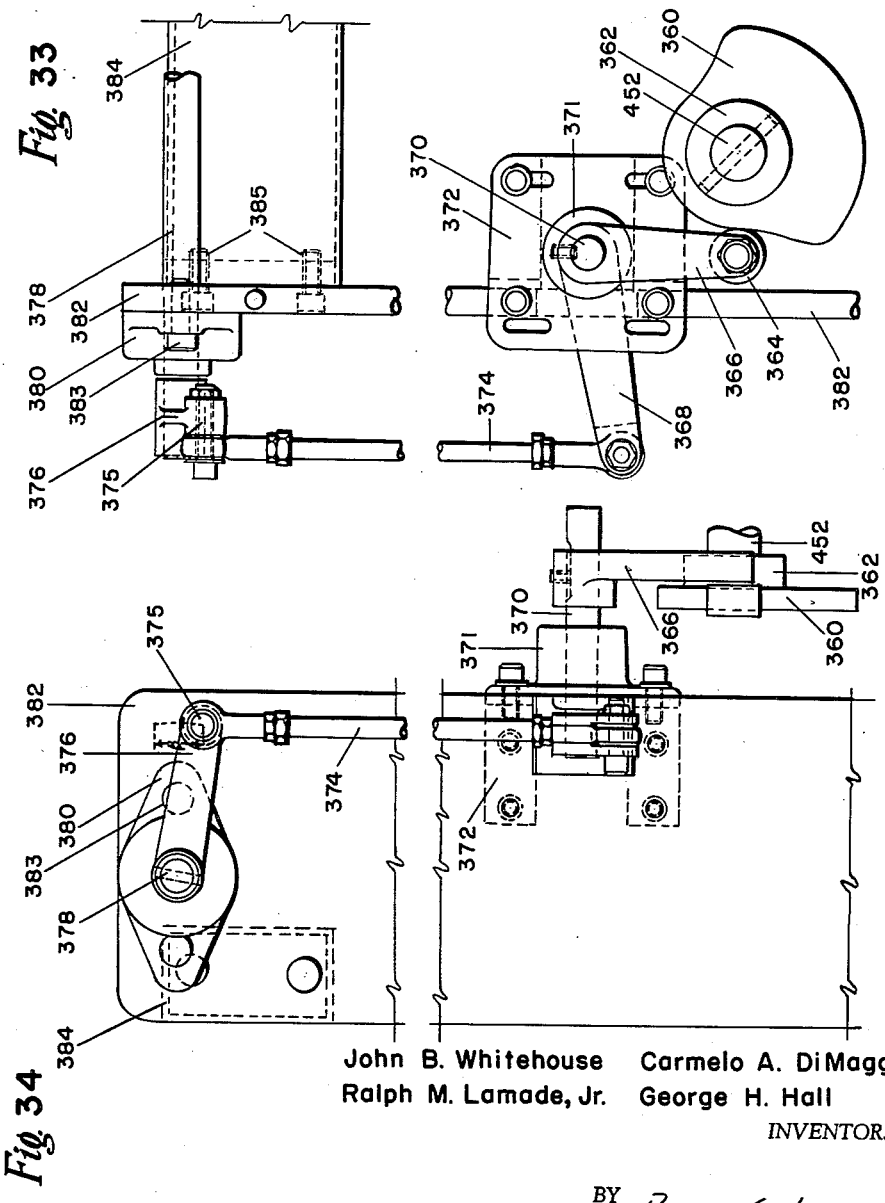

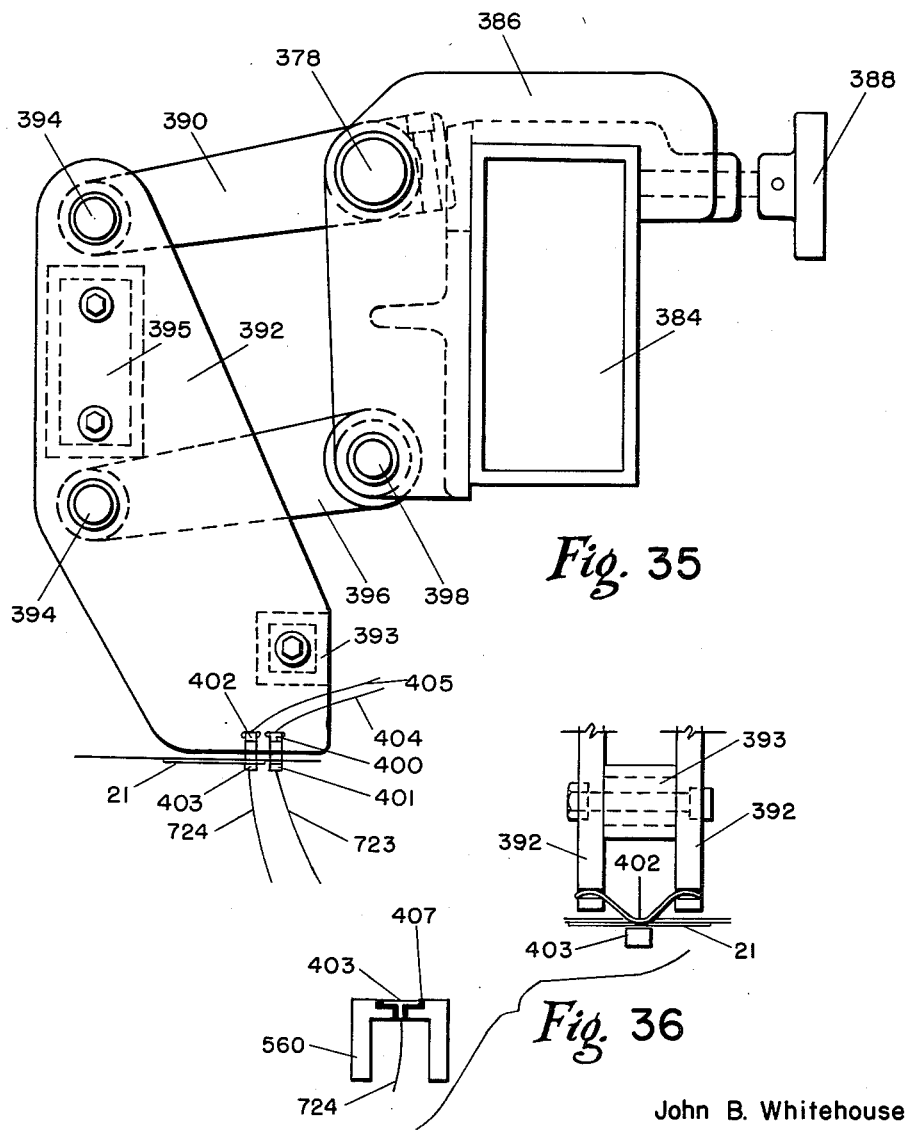

July 10, 1962    J. B. WHITEHOUSE ETAL    3,043,069
AUTOMATIC PROCESSING APPARATUS
Filed Aug. 8, 1960    34 Sheets-Sheet 32

John B. Whitehouse
Ralph M. Lamade, Jr.
Carmelo A. DiMaggio
George H. Hall
                INVENTORS BY *Bessie G. Lyppu*
           Attorney John B. Whitehouse
Ralph M. Lamade, Jr.
Carmelo A. DiMaggio
George H. Hall
INVENTORS John B. Whitehouse  Ralph M. Lamade, Jr.   INVENTORS
Carmelo A. DiMaggio  George H. Hall

United States Patent Office 3,043,069
Patented July 10, 1962

3,043,069
AUTOMATIC PROCESSING APPARATUS
John B. Whitehouse, Cochituate, Ralph M. Lamade, Jr., Concord, Carmelo A. Di Maggio, Waltham, and George H. Hall, Watertown, Mass., assignors to Arthur D. Little, Inc., Cambridge, Mass., a corporation of Massachusetts
Filed Aug. 8, 1960, Ser. No. 48,176
16 Claims. (Cl. 53—157)

This invention relates to an apparatus for automatically processing items which are to receive some form of treatment after being folded, including packaging them after such treatment. The treatment may include wrapping and handling a predetermined number of items together and the addition of folders, cards and the like to the item before packaging. More particularly this invention is concerned with the handling of normally sheer or lightweight items of clothing which are customarily enclosed in tissue paper and banded and subsequently packaged for marketing.

Items of clothing such as nylon hosiery are processed in great numbers and it would be highly desirable to have available equipment which could carry out these processing steps automatically and reliably. In a co-pending application filed in the names of Ralph M. Lamade, Jr., John B. Whitehouse, Carmelo A. Di Maggio, George H. Hall, and George A. Wood, Jr., Serial No. 792,151, now U.S. Patent 2,954,906, there is disclosed and described apparatus for automatically tagging, folding and stamping clothing of this nature. The apparatus described herein is designed for use with the apparatus described in Serial No. 792,151. The apparatus presently to be described is designed to take the folded item from the so-called delivery end of the apparatus of Serial No. 792,151 and process it to the point where it is delivered in boxes. There is therefore provided in these two pieces of apparatus automatic means for tagging, folding, stamping, wrapping, banding and boxing sheer items of clothing. The apparatus of this invention may, of course, be used as a separate and distinct device, with items to be processed being introduced at its forward end by any suitable device or by hand. As shown in Section IX, if the apparatus of this invention is to be used as a separate device, then it is preferable to use a sensing and control mechanism with it.

Up to this time all of these processing steps involved in handling sheer items have been done manually. This is expensive and the processing is, of course, subject to human error. Apparatus which has been made for handling other items is not adaptable to the handling of nylon hosiery and the like because of the nature of such items. It can be appreciated that the very qualities of a pair of nylon hosiery, e.g., extremely light weight, sheerness and the individual stocking's tendency to slip with respect to each other and to the pair's location, make them extremely difficult to handle automatically. Thus to pick up a pair of nylon hosiery which has been folded by any known conveying means and wrap them by known wrapping techniques would not be possible. It is, therefore, necessary to provide equipment which is so coordinated and so arranged that a folded pair of nylon hosiery may be handled and processed without as much as disturbing their alignment or folds, either with relationship to the handling equipment or with relation to the fold established therein.

The same types of difficulties in handling are inherent in other pieces of clothing such as sheer lingerie, blouses and the like. The apparatus of this invention is also adaptable for processing such items and is not limited to nylon hosiery. However, for the sake of convenience in describing the apparatus of this invention, it will be presented in terms of processing a pair of nylon hosiery.

It is therefore an object of this invention to provide automatic equipment for handling normally sheer materials. It is another object to provide such equipment which is capable of processing a pair of nylon hosiery from the point at which a pair of hosiery in a folded condition is placed onto the equipment to the point at which the pair is delivered in a box, the box having been stamped and filled with a predetermined number of pairs. It is a further object of this invention to provide automatic apparatus which can process a pair of nylon hosiery or other sheer articles in the manner described above, reliably, accurately and at a rapid rate. These and other objects will become apparent in the discussion below as the description proceeds.

The apparatus, its construction and method of operation will be described in detail with reference to the accompanying drawings in which:

FIG. 21 is a top plan view of a mechanism for feeding cards and the like;

FIG. 22 is a side view of the transport mechanism associated with the card placement and banding apparatus;

FIG. 33 is a cross-sectional view, taken along the crosswise direction of the apparatus, of the inspection system drive;

FIG. 34 is a cross-sectional view, taken along the lengthwise direction of the apparatus, of the inspection system drive;

FIGS. 35 and 36 are detailed drawings of one of the inspection heads of the inspection system;

Figure 1:
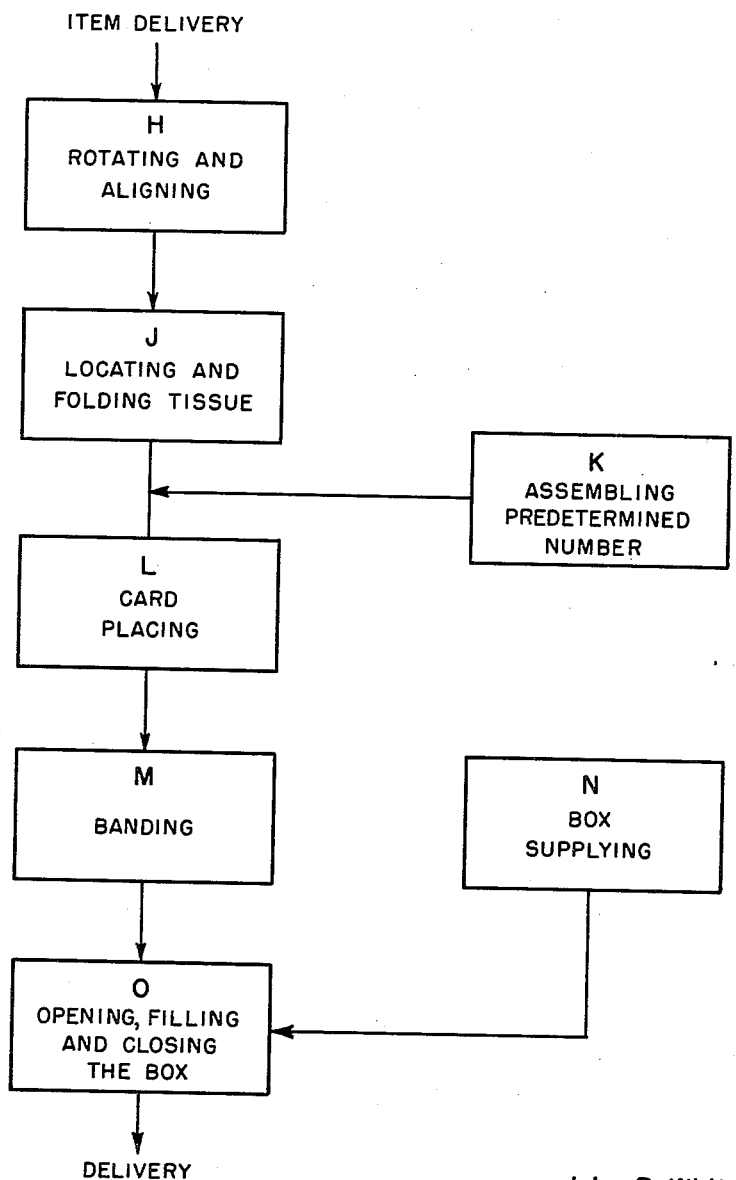
FIG. 1 is a schematic flow diagram representing the steps in the processing of a folded pair of nylon hosiery or other sheer item.
Figure 2:
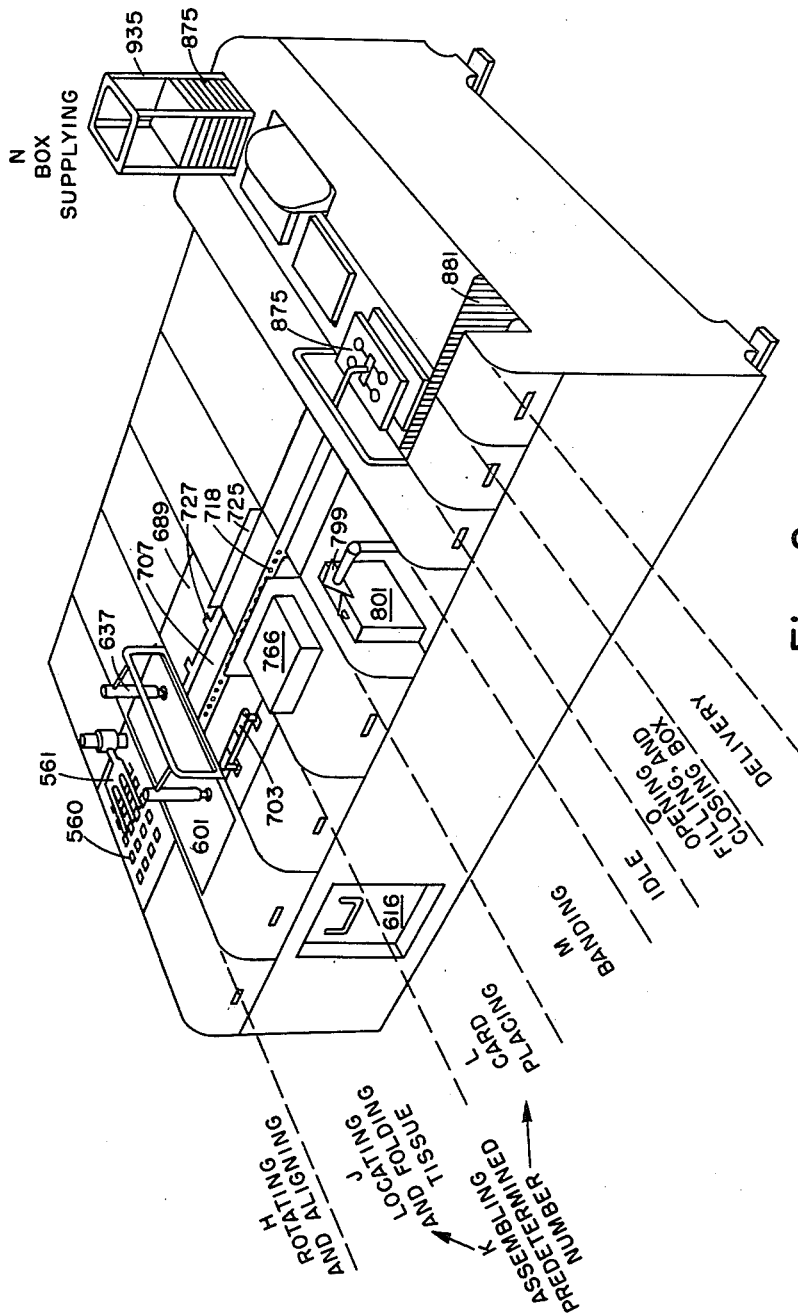
FIG. 2 is a perspective view of the apparatus of this invention showing the various stations or steps involved in the processing.

I. GENERAL DESCRIPTION (FIGS. 1 and 2)

In general the apparatus of this invention includes means for receiving the folded pair of hosiery and rotating it in a horizontal plane through 90° whereby the folded pair may be processed through the apparatus with the welt end serving as the trailing edge. Subsequently the oriented folded pair of hosiery is placed on a shuttle plate on top of a tissue which is eventually to be wrapped around one or more pairs. Means are provided for folding the tissue over the pair of hosiery with adjusting means being provided to fold over either side of the tissue first. A predetermined number of pairs of hosiery is assembled either at this folding station or at the next station as will be shown in detail below. After assembly of the predetermined number of pairs, means are provided for placing on the assembly a card, or other insert such as an advertising folder and the like, which is to be included in the box. The assembly of hosiery then passes to a station where means are provided for banding the assembly.

Turning now to apparatus for handling the box in which the hosiery are to be placed, there are provided means for selecting a box, means for printing information, such as size, color and the like, on the one end of the box, and means for separating the upper and lower portions of the box, preferably by holding the upper portion in place and lowering the bottom portion to permit the items to be introduced into the box. Means are then provided for depositing the banded assembly of items into the bottom portion of the box, for closing the box by raising the bottom portion up into the top portion, and finally for conveying the reassembled box containing the items from the apparatus.

The components of the apparatus are so driven and so coordinated that the pair of hosiery is being continuously processed (including the step of forming assemblies of more than one pair) and handled in a manner to keep it always in proper alignment. Means are also included for controlling the assembling of a predetermined number for boxing and using information from that point to actuate the remaining operations in the pair's progress through the apparatus. This memory system up to the assembly point may be an integral part of the memory system described in Serial No. 792,151 and thus whether or not the stations up to this point will operate may depend upon whether or not a pair of hosiery has originally been placed in proper alignment in the first portion of the apparatus. If the apparatus described hereinafter is used alone, then inspection means and control means are incorporated as described.

The apparatus of this invention is represented functionally in FIG. 1 and is shown in perspective in FIG. 2. The apparatus may be divided into seven so-called stations, designated in FIGS. 1 and 2 as Stations H–O. (There is no Station "I" because of possible confusion in using this designation. It will be noted that these stations are designated to follow Stations A–G of the apparatus of Serial No. 792,151 and that numbers from Serial No. 792,151 which relate to the same parts of the apparatus are carried over and used in the figures used in the drawings herein. In order to prevent confusion, apparatus elements are numbered beginning with No. 560.

The detailed description given below will be presented to correspond to each of these stations. The portion of the control and memory systems which are supplementary to those in Serial No. 792,151 will be presented in appropriate sequence. This portion of the description in turn will be followed by a detailed description of the sequence of the operation of the apparatus, tracing the progress of a folded pair of nylon hosiery through the apparatus to the point where the box containing the hosiery is delivered.

Briefly the entire apparatus may be first described to illustrate how these stations are coordinated into one integral apparatus. Station H, designated the rotating and aligning station, comprises an interdigitated receiving platform and an interdigitated spatula designed to pick up the folded pair of hosiery as delivered and rotate it through 90° thereby placing it in position to be delivered to Station J.

Simultaneously while the folded hosiery are being picked up and rotated and aligned in Station H, a tissue is placed upon a shuttle plate in Station J to receive the now properly oriented pair of hosiery. The tissue on which the hosiery is placed is, of course, sufficiently large to be folded over thereby to completely envelop the folded hosiery. It is therefore necessary at Station J to provide means for folding the tissue over. Because it may be desired in some cases to fold the tissue with one or the other side on top, means are provided for adjusting the folding mechanism to accomplish this. Moreover, means are provided to sufficiently crease the tissue to retain its position around the hosiery, and adjustment means are provided to locate the tissue with respect to the location of the hosiery laid on it so that the extent to which one side or the other of the tissue is folded may be regulated to accommodate various package configurations.

In packaging hosiery it is very often desirable to band two or more pairs of hosiery for packing in the same box. Therefore it is necessary to provide a means for assembling a predetermined number of tissue-wrapped pairs of hosiery prior to the further processing of the hosiery. In FIG. 1 this station has been designated as Station K and referred to as the station at which a predetermined number of items are assembled. Thus, Station K is designated as a separate station as it is a separate step which must be automatically controlled. However, in the apparatus this Station K is associated directly either with Station J or with Station L, described below.

It is often desirable in packaging items of the nature to be handled by this apparatus to include in the package a card, folder or advertising material in a manner such that this material may be banded with the hosiery or other items. There is therefore provided Station L in which such card or material is placed on top of a predetermined number of tissue-wrapped items. It is therefore convenient to incorporate the assembly of a predetermined number of tissue-wrapped items into Station L for after the predetermined number has been assembled the mechanism forming Station L may be actuated to place the card, folder or other material on top of the items.

In the case of nylon hosiery, for example, where it is often customary to package more than one pair in a box, it is desirable to be able to band two or more pair of hosiery together. This is done in Station M where means are provided for encircling the predetermined number of folded pairs of hosiery with a band of paper or the like, and sealing the band. Sealing is normally accomplished by placing the ends of the band together under the assembled items, thus providing a banded group of wrapped pairs of nylon hosiery with a band which is not joined at the top.

Simultaneously with the wrapping, assembling and banding of the pairs of hosiery, means are provided at Station N for supplying a box into which the hosiery is to be placed. At Station N means are provided for removing from the bottom of a stack of boxes a single box which is then directed toward the banded pairs. It may be preferable to use boxes which are not labeled as to size, color, price and the like, but which are to be so labeled as they are filled. For this reason there is also provided in Station N means for stamping on one end of the top portion of the box the information desired to be contained thereon. After stamping it is then necessary to open the box and introduce the hosiery.

The opening, filling and closing of the box is performed at Station O. In the apparatus described herein it has been found desirable to open the box by holding the top by suction means and permitting the bottom to be moved sufficiently below the top to permit introducing the banded pair of hosiery. Means are therefore provided for lowering the bottom portion, holding it in position and introducing the hosiery in such a manner that it will fall flat without disturbing the alignment of the folded hosiery in the banded assembly. Closing the box is therefore accomplished by raising the bottom portion of the box after the hosiery has been introduced to the point where it again fits into the top portion of the box. The suction holding the box top is released and the box containing the hosiery is free to be taken by suitable conveying means to a point where the filled box of hosiery is picked up.

In describing the apparatus in the sections below the term "forward end" is used to indicate that end at which the item to be processed is introduced, i.e., Station H; while "after end" designates the end of the apparatus at which the filled box is delivered. Movement of the hosiery is therefore from the forward to after end.

II. ROTATING AND ALIGNING—STATION H
(FIGS. 3–6)

The mechanism at Station H is designed to pick up a folded pair of hosiery in proper alignment, rotate it through 90° and place it on a shuttle plate on top of a large tissue sheet the sides of which are subsequently folded around the hosiery. The folded pair of hosiery is picked up from the interdigitated horizontal bars of the transport system, as described in Serial No. 792,151, which have taken the folded and tagged pair of hosiery from the delivery Station G of the apparatus described in the above-identified application and deposited it on the holding means of Station H of the apparatus of this invention. Thus the moving interdigitated bars 26 pick up the folded and tagged item (in this example a pair of hosiery) and deposit it by means of the up-forward-down-back motion described in Serial No. 792,151 onto a holding platform formed of a plurality of relatively small horizontal platforms 560 (FIG. 3) which are separated by spacings so designed as to permit insertion from below of the tynes 562 of a spatula conveyor 561. By imparting an upward motion to the tynes 562 and then subsequently rotating them through 90° in a horizontal plane, the folded pair of hosiery is moved onto the shuttle plate of Station J for further processing. The rotation is necessary since the pair of hosiery as delivered by the interdigitated transport bars of the delivery station of the automatic apparatus of Serial No. 792,151 has one of its sides as its trailing edge rather than the welt edge as is desired in the processing of this apparatus. In the drawings where it can be conveniently indicated the direction of travel of the item being processed is indicated by an arrow.

When the spatula conveyor 561 has completed its rotating motion, it is in a position about one-half inch above the shuttle plate which carries a tissue and is in proper position to receive the folded hosiery. The tynes 562 of the spatula descend vertically placing the hosiery so that its trailing edge is adjacent to, and behind, two small wedges 602 (FIG. 12) on the shuttle plate 600. The spatula holds the hosiery in this position while the shuttle moves forward out from under, carrying the hosiery with it (stripping it from the spatula with the projections 602). The spatula conveyor 561 then moves downwardly and through a return arc to reach a horizontal position somewhat below the level of the platforms 560 of the holding means. During the return cycle of the spatula conveyor 561 another pair of hosiery has been placed on the holding means and the tynes 562 of the spatula conveyor 561 are in position to move directly upward and pick up this next pair.

Figure 4:
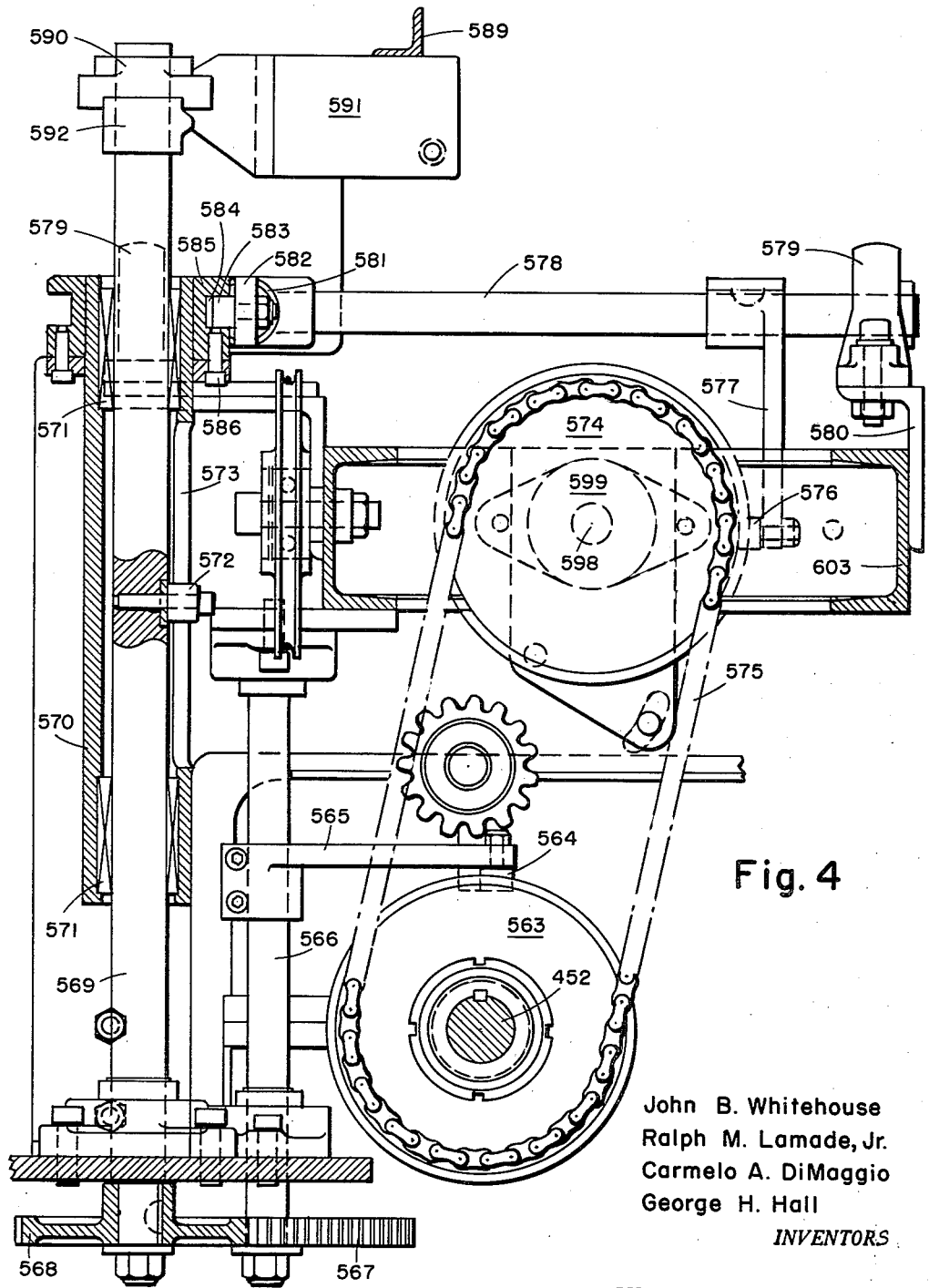
FIG. 4 is an end view partially cut away of the mechanism of FIG. 3.

The mechanism for effecting this movement of the spatula conveyor is illustrated in FIG. 4. Since it is necessary to impart both an up and down as well as a turning motion to the spatula conveyor, there are provided two cams and associated equipment. The first of these is a barrel cam 563 which operates off of main shaft 452. A cam follower 564 is affixed to a cam follower arm 565, which in turn is rigidly connected to shaft 566 and imparts to it a specified turning motion due to the contour of the grooves on cam 563. Shaft 566, operating through suitable bearings and in suitable supports, has positioned at its bottom end a gear 567 which drives a second gear 568, the latter in turn being rigidly positioned to the bottom portion of a second shaft 569. Surrounding a portion of shaft 569 is a sleeve 570 which is so supported in linear ball bushings 571 that it can move up and down while it is constrained to turn with shaft 569 by roller 572. It will be appreciated that rotating the shaft 569 through the gear arrangement described above serves to rotate the sleeve 570, thus imparting a turning movement to the sleeve 570.

The up and down movement of the sleeve 570 is attained by means of a second barrel cam 574, which is maintained on an auxiliary shaft 598 through a pillow block 599. This barrel cam 574 is in turn also driven on an auxiliary drive shaft 598 by main drive shaft 452 through chain 575. Cooperating with barrel cam 574 is cam follower 576, cam follower arm 577, which in turn is rigidly affixed to a shaft 578. Shaft 578 is suitably supported on both ends by means of pillow blocks 579, which are mounted to the main frame 603, through a suitable bracket 580.

Turning again to FIG. 3, it may be seen how shaft 578 by swinging back and forth through the action of cam 574 imparts the necessary up and down motion to the spatula conveyor 561. Shaft 578 is rigidly affixed to an arm 581 affixed to a cam follower 583 which runs in a groove 584 (FIG. 4) in collar 585 which is an integral part of the sleeve assembly 570. The spatula arm 587 is in turn attached to collar 585 by means of bolts 586 through plate 588, thus rigidly attaching the spatula conveyor to the sleeve 570. This means that the up and down motion of shaft 569 and the back and forth motion of shaft 578 combine to give the spatula conveyor 562 the desired motion pattern as described above. Shaft 569 is supported at its upper end to the main frame through bearing block 590 and a support plate 591 (FIG. 4).

Figure 5:
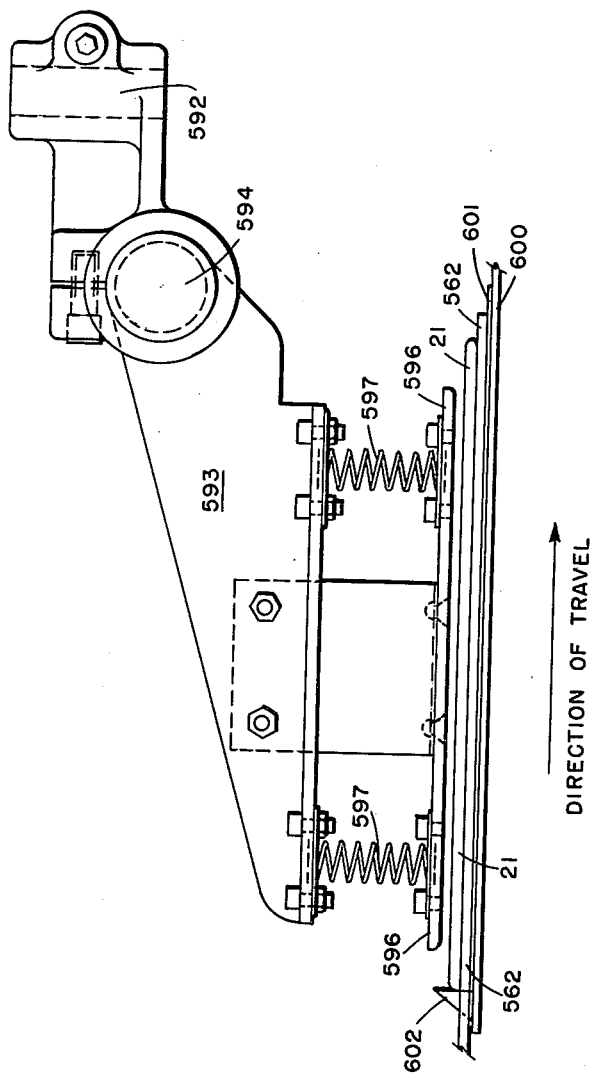
FIG. 5 is a side view of a holding apparatus associated with the apparatus of FIG. 3.
Figure 6:
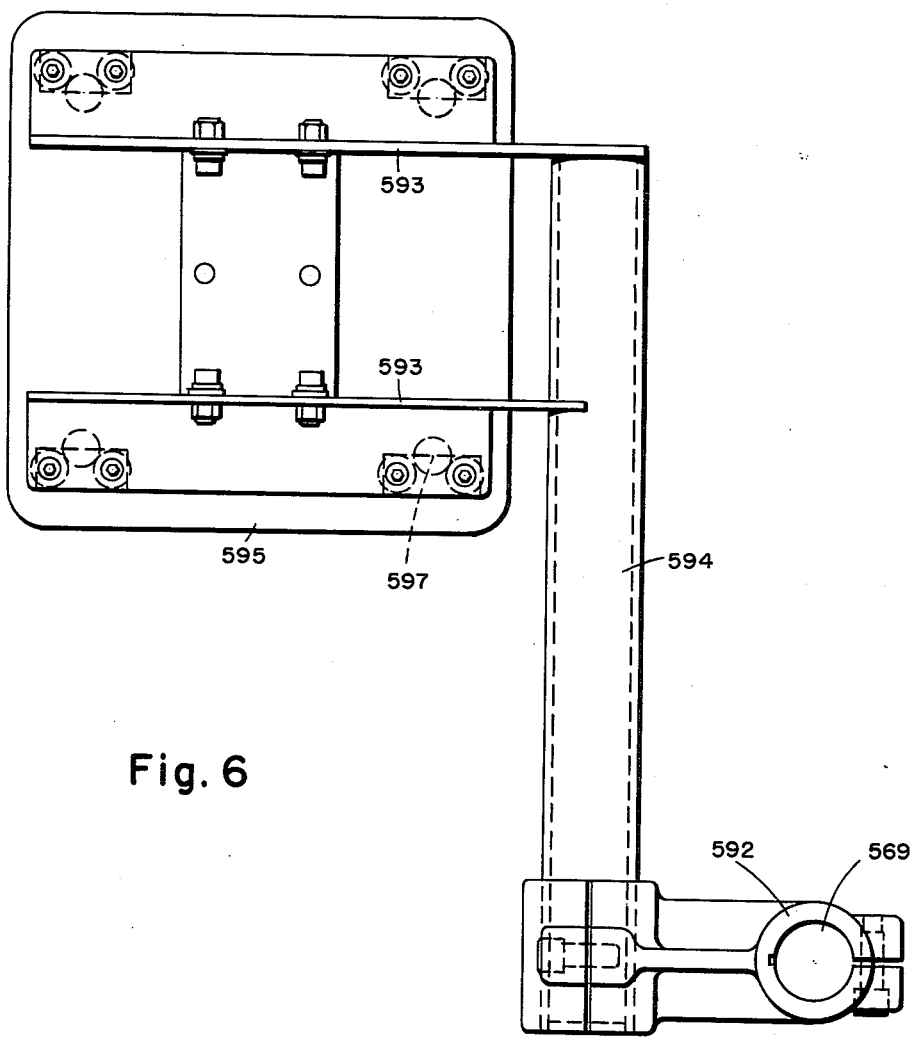
FIG. 6 is a top plan view of the holding apparatus of FIG. 5.

When the folded pair of hosiery is picked up by the spatula conveyor 561, it is necessary to hold the hosiery firmly on the spatula conveyor while it is rotating to deposit the hosiery on the shuttle plate of Station J. This is done by the use of a holding plate (FIG. 5) the mechanism for which is made an integral part of the apparatus of Station H. At the upper end of shaft 569 (FIG. 4) there is rigidly affixed an arm and collar 592 which carries the arm 594 which, in turn, carries two parallel cantilevers 593 (see FIGS. 5 and 6). These cantilevers 593 support a pressure plate 596, and are joined by springs 597, which permit slight pressure to be applied to hold the pair of hosiery while the spatula conveyor is at the top of its vertical stroke. The holding mechanism operates off shaft 569, which means that the holding plates follow the turning of shaft 569 through the 90° angle and have no vertical motion. The vertical motion that presses the hosiery against the plate 596 is provided by the spatula transport, the descending of the spatula releasing the hosiery. FIG. 5 illustrates the position of the hosiery just before the shuttle plate starts its movement toward the next station, stripping the hosiery from the spatula tynes 562 by means of the wedges 602 with this same motion, the wedges 602 being rigidly attached to the shuttle plate 600.

In the operation of the mechanism of Station H, it will be seen that cam 563 and its auxiliary follower and follower arms and gears impart the necessary rotating motion to shaft 566 through an arc of approximately 70° and also then a rotating motion to the sleeve 570 through an arc of about 90°. Cam 574 imparts an up and down motion to sleeve 570 through rotary motion of shaft 578 and the movement of arm 581. This in turn means that the spatula conveyor is moved up and down and through the necessary 90° angle. Cams 563 and 574 are so designed that the spatula conveyor 562 is timed and directed to give the necessary motion cycle described above and to leave the pair of folded hosiery with the welt end as the trailing edge onto the tissue 601 on the shuttle plate 600.

III. LOCATING AND FOLDING TISSUE—STATION J

(FIGS. 7–20)

It is the purpose of the mechanism of Station J to locate a pair of hosiery on a large tissue sheet and to fold over the sides of this tissue sheet, creasing the sides so that they stay in place, and moving the wrapped pair onward.

In performing the operations, it is necessary to provide a shuttle plate which is large enough to receive and support a sheet of the tissue of such a size that it can be folded around the hosiery; and to provide means for placing this tissue flat on the shuttle plate before a pair of hosiery is received from the spatula conveyor. The pair of hosiery on the tissue is then positioned in proper relationship to a folder where the sides of the tissue are folded and creased. In the apparatus of this invention the tissues are supplied from a magazine-type feeder which is designed to keep a supply of tissues in place. The tissue in turn is picked up by vacuum cups and raised to such a position that the shuttle plate 600 can move under the tissue on its return stroke. The vacuum is released when the shuttle plate is in its forward-most position allowing the tissue to be placed on the shuttle plate. The forward motion of the shuttle plate is therefore from directly over the tissue supply to directly over the plates which hold the pair of hosiery in place for the folding operation.

It will be appreciated that it will usually be desired to place more than one pair of hosiery in a box. This necessitates building up a predetermined number of pairs of hosiery before the multiple pairs are banded together at Station M. There are two accepted ways of packaging multiple pairs of hosiery (or other items) which may be referred to as the "nested" arrangement and the "single" arrangement. In the so-called nested arrangement the predetermined number of pairs (usually two, three or four) are built up with interleaving layers of tissue and then after assembly, all the tissues are folded simultaneously. In the so-called single arrangement, the tissue is folded about each pair separately and then the tissue-wrapped pairs are assembled.

The assembling of a number of pairs of hosiery before banding means that a proper timing sequence must be provided at the appropriate station to permit such an assembly. In the case of the nested arrangement, the assembly is accomplished at the folding position; while in the case of the single arrangement the assembly is effected at the card placement station. In either case, operation timing is such that the mechanisms in the remaining stations to be described are triggered when a predetermined number of "good" signals are received, corresponding to the number of pairs to be assembled. The timing sequence will be described in detail in Section IX. The apparatus of this invention is equipped with appropriate selector switches which permit a choice between the two packaging arrangements described.

In the following description of the mechanism of Station J, it will be assumed, for convenience, that the single arrangement is being used. However, the equipment is equally adaptable to achieving the nested arrangement and only the timing sequence is different.

Station J may be subdivided into several individual mechanisms—that for supplying the tissue; that for moving the shuttle plate back and forth between the positions indicated; and that for folding the tissue sides over the hosiery and creasing the tissue in place.

Integrated into the means for providing the tissue is a vacuum system for picking up the tissue and a means for shifting the tissue magazine laterally with relation to the position of the pair of hosiery and the folding mechanism to provide a greater portion of the overlap of the tissue on the right or left side as desired. Associated with the folding mechanism is also a vacuum system for holding the tissue and hosiery on the shuttle plate while it is being advanced to the folding mechanism, a vacuum system for holding the tissue in proper orientation during the folding cycle, and means to adjust the order of folding of the sides of the tissue so that right may be folded over left or conversely, left folded over right.

Figure 7:
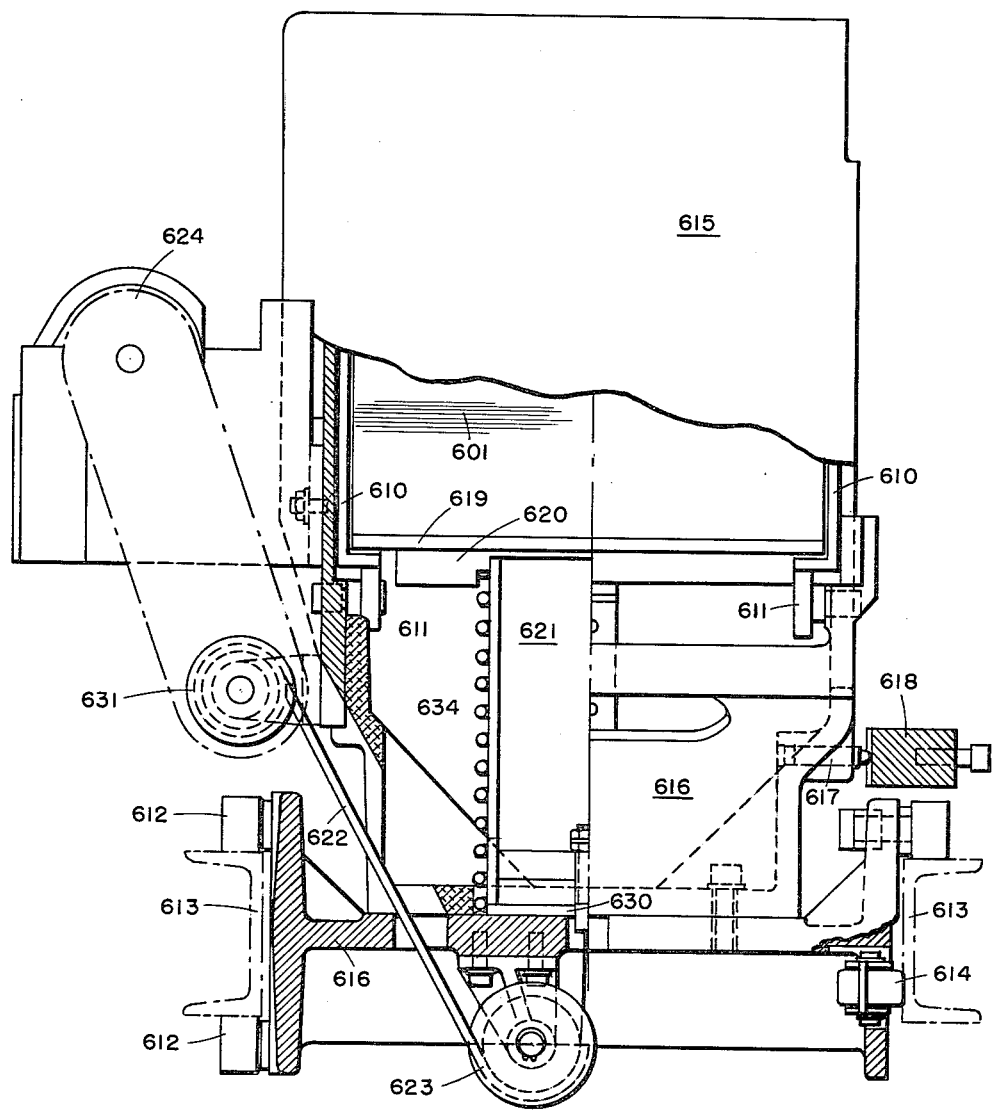
FIG. 7 is a side view partially cut away of the mechanism for providing the tissue sheet for wrapping.
Figure 8:
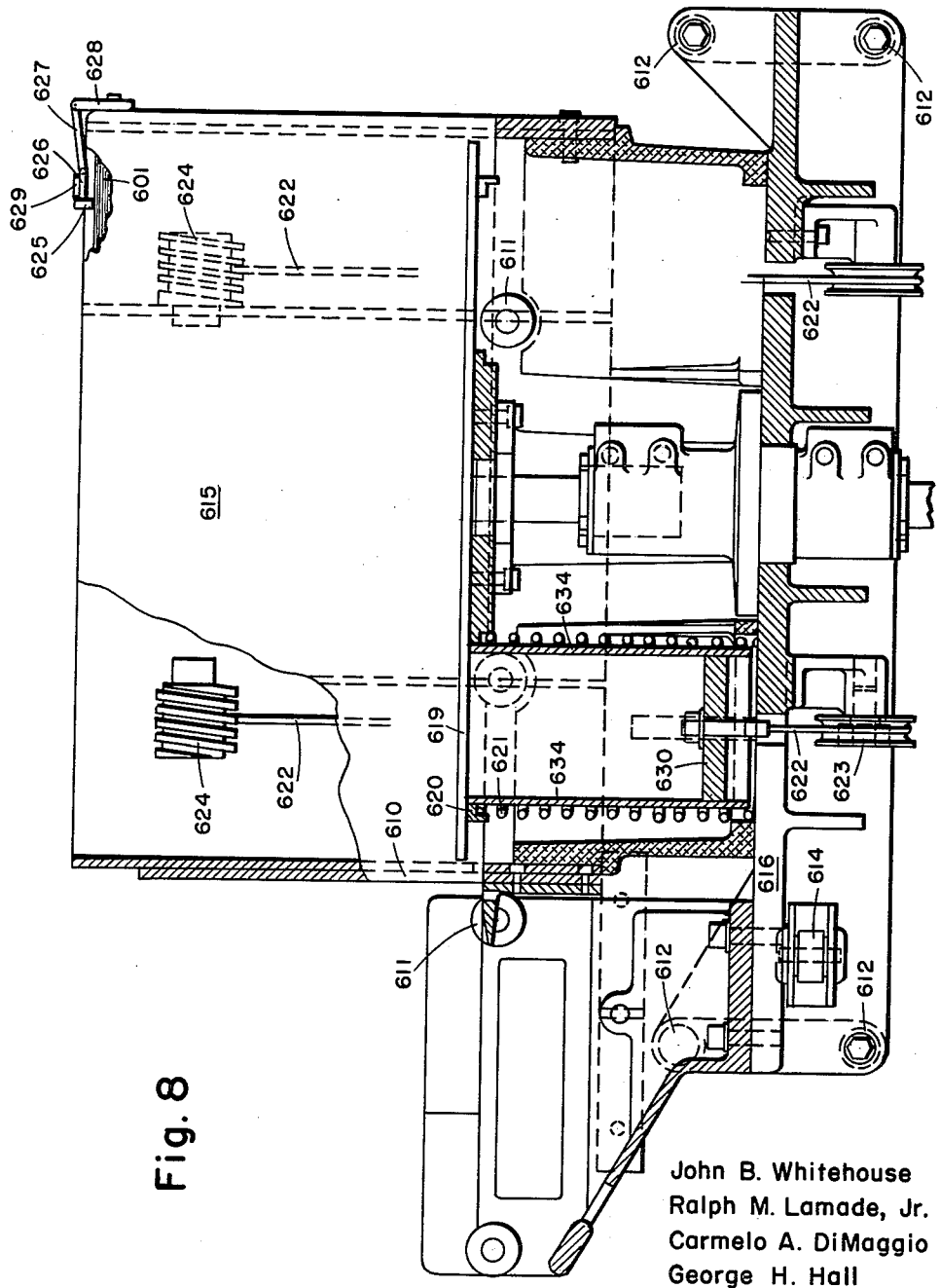
FIG. 8 is an end view partially cut away of the mechanism of FIG. 7.

The magazine for feeding the tissue sheets is shown in FIGS. 7 and 8 and generally indicated at 616 which includes framework and mounting of any suitable design. The tissue feeding magazine consists of a drawer 610 slidably located within the magazine proper indicated as 615 and having a vertically movable plate 619 as a bottom. Rollers 611 are provided to move the drawer in and out of the magazine for easy reloading. The tissues 601 in the stack in the drawer are kept at a desired level or pickup by vacuum cups as described below.

As pointed out above, the magazine for supplying the tissues can be positioned with respect to the position of the pair of hosiery and the folding mechanism. This is accomplished by making the entire tissue magazine feeder movable on the frame on which it is mounted. Rollers 612 are provided to contact and roll on frame 613 using rollers 614 as a guide. Means are also provided to lock the magazine in position with respect to the frame once it has been moved to its desired location. These locking means, shown in FIG. 7, comprise a spring-back plunger 617 mounted in magazine 616. A number of engagement points 618 for the plunger are located along frame 613 to correspond to the various locations of the magazine feeder desired.

The tissues are moved into place and held there for pickup by means of the plate bottom 619 mounted on a platform 620 and vertically movable within the drawer 610 of the magazine. Pressure is applied upwardly against the plate 619 by means of two springs 621. The action of springs 621 is controlled further by a mechanism designed to permit adjusting them when a new stack of tissues is inserted or to cause them to continuously move upwardly to supply the tissues at a predetermined level. Each of the two identical mechanisms consists of a cable 622 attached to the plate 630 which is an integral part of platform 620 through a tube 634. The cable 622 runs in a lower pulley 623 and upper pulley 624 and a guide pulley 631. The cable in turn controls the release of the spring 621 and hence the height of plate 619. This in turn positions the level of the top of the tissue stock. Because of the length of the tissue magazine, two duplicate springs, cables and their accompanying pulleys, all attached to platform 620, are provided as partially illustrated in FIG. 8.

Control of the cable is maintained through a sensing head 625 shown in FIG. 8. Sensing head 625 is joined through two arms 626 and 627 to a support plate 628 fixed to the magazine 615. On the pivotally mounted terminal arm 626 which is attached to arm 625 is located a mercury switch 629 suitably connected to a relay, not shown, so that when the supply of tissues falls below a certain predetermined level the sensing head tips sufficiently to impart an angle to arm 626 which in turn causes mercury to flow in the switch 629 to make a contact and actuate the relay which in turn actuates a motor drive connected to the pulleys 624. The motor continues to feed out the cable until the mercury switch 629 is opened by movement of arm 626 caused by the paper level build up, this having permitted the springs 621 to raise plate 619 and hence to bring the stack of tissues in the magazine to the new level.

Figure 9:
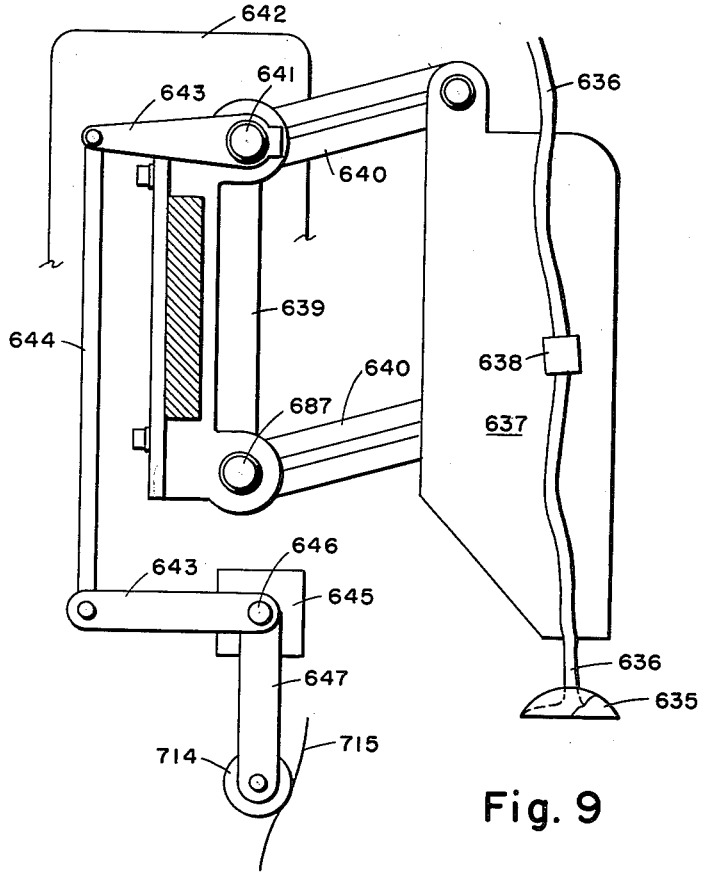
FIG. 9 is a side view of the vacuum cup mechanism for picking up the tissue sheet.
Figure 10:
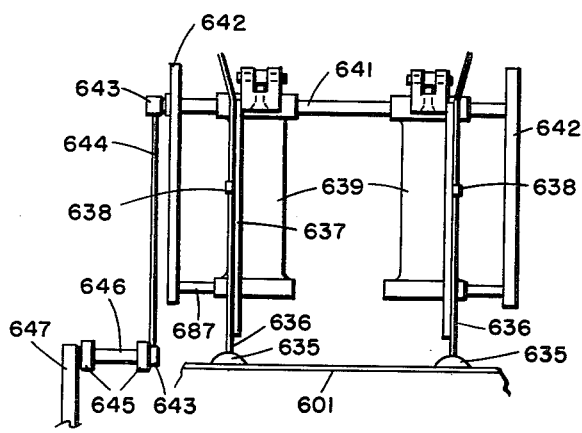
FIG. 10 is an end view of the apparatus of FIG. 9.

The tissue is picked up by means of vacuum cups and placed on the shuttle plate. The mechanism is so timed that the tissue is picked up from the magazine, held in place in an elevated position and then when the shuttle plate is moved over the magazine the tissue is dropped onto the shuttle plate. Associated with the shuttle plate operations is the mechanism for picking up the tissue by its leading edge for deposition on the shuttle plate. The tissue pickup mechanism, which incorporates the use of vacuum cups, is illustrated in FIGS. 9 and 10. The vacuum cups 635 are connected to a vacuum line 636 which is mounted on a vacuum support 637 through a suitable mounting device such as a bracket 638. The vacuum line support 637 is caused to move up and down by the rotating action of drive shaft 641 and follower shaft 687 which are rotatably mounted in a support 639 and connected to the vacuum support 637 through arms 640. Vacuum is turned off and on by a suitable device operated by a cam off of the main shaft 452 as described in Section IX below which describes the control mechanism of the device. Drive shaft 641 which is responsible for the up and down motion of the vacuum cups is mounted in a suitable frame 642 (see FIG. 10) and is in turn actuated by a vertical push rod 644 through arms 643. A follower arm 647 operating through a cam follower 714 on a suitable cam face 715 rigidly attached to auxiliary drive shaft 598 (see FIG. 4) actuates push rod 644 through auxiliary shaft 646 mounted to machine frame through bearing blocks 645.

Figure 11:
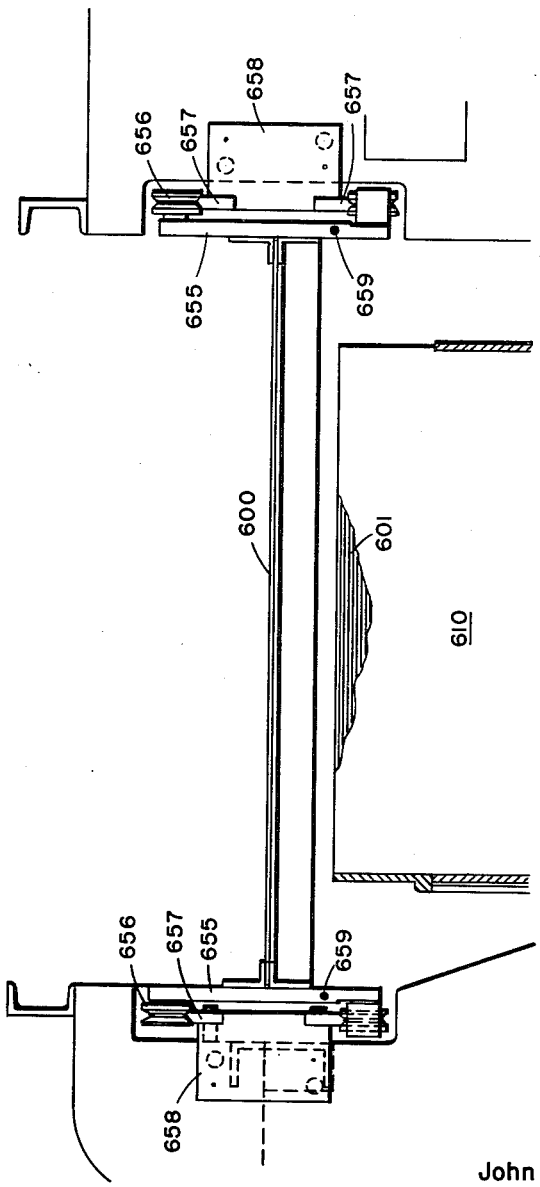
FIG. 11 is an end view of the shuttle plate on which the item is placed on the tissue sheet.
Figure 12:
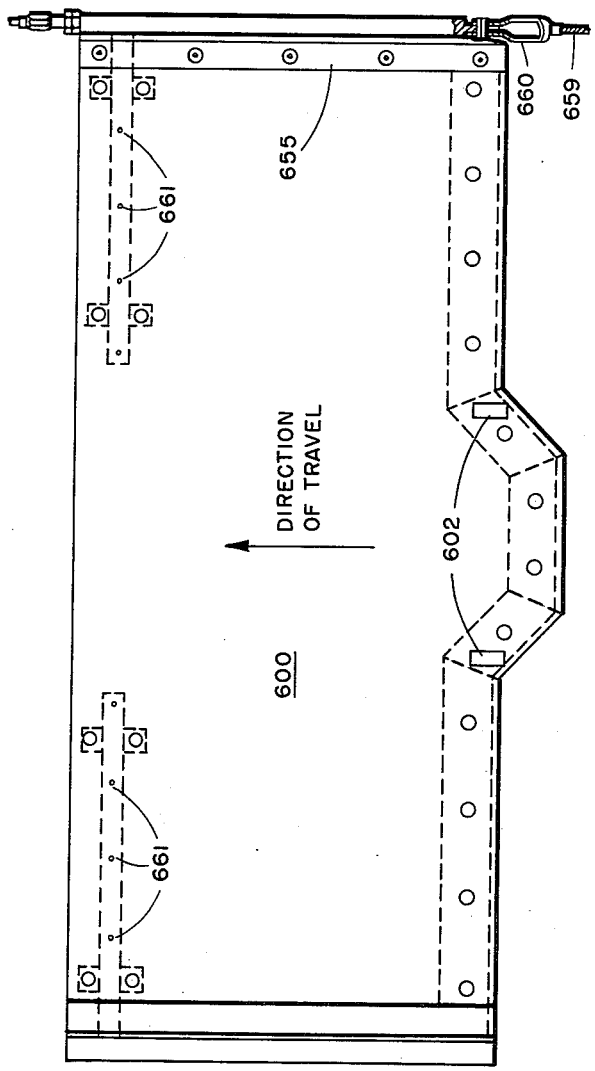
FIG. 12 is a top plan view of the shuttle plate.

The shuttle plate and the mechanism for its operation are illustrated in FIGS. 11–14. Referring now to FIG. 11, the shuttle plate is shown from its forward end. This figure illustrates the position of the shuttle plate 600 over the magazine drawer 610 which contains the tissue 601. It will be appreciated that in this position the vacuum cups 635 of FIG. 9 are in position holding a single tissue above the shuttle plate. These are not shown in FIG. 11 for simplicity of representation. The shuttle plate 600, which is shown in top plan view in FIG. 12, is mounted on a suitable frame 655 to which are attached pulley-type rollers 656. These rollers engage rails 657, attached to frame 658, and by moving along them through action of suitable cables 659 the shuttle plate is moved between its two positions; that is, from over the magazine 610 to its forward-most position in the travel sequence to deposit the hosiery lying on the tissue at the folding station. The shuttle plate 600 is equipped with suction holes 661, which are used to keep the tissue from moving on the shuttle plate during its movement to the folding station. The wedges 602 on the shuttle plate 600 are also shown in FIG. 12. It is the purpose of these to strip the hosiery from the spatula tynes when withdrawing the hosiery from the spatula conveyor.

Figure 13:
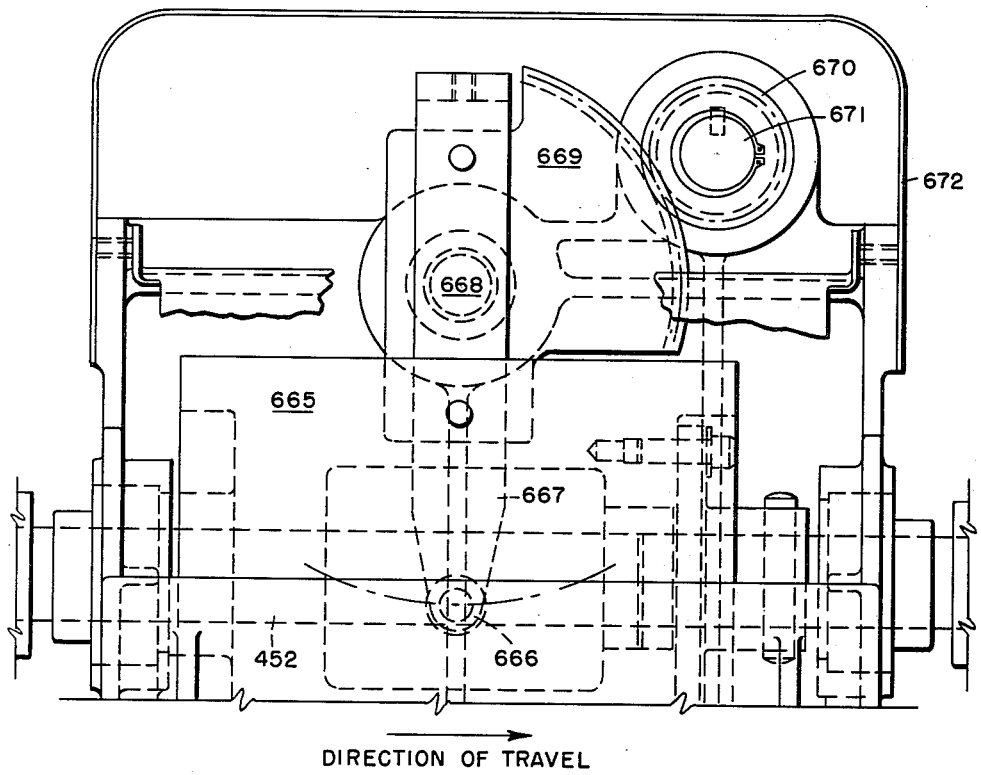
FIG. 13 is a side view partially cut away of the driving mechanism associated with the shuttle plate.
Figure 14:
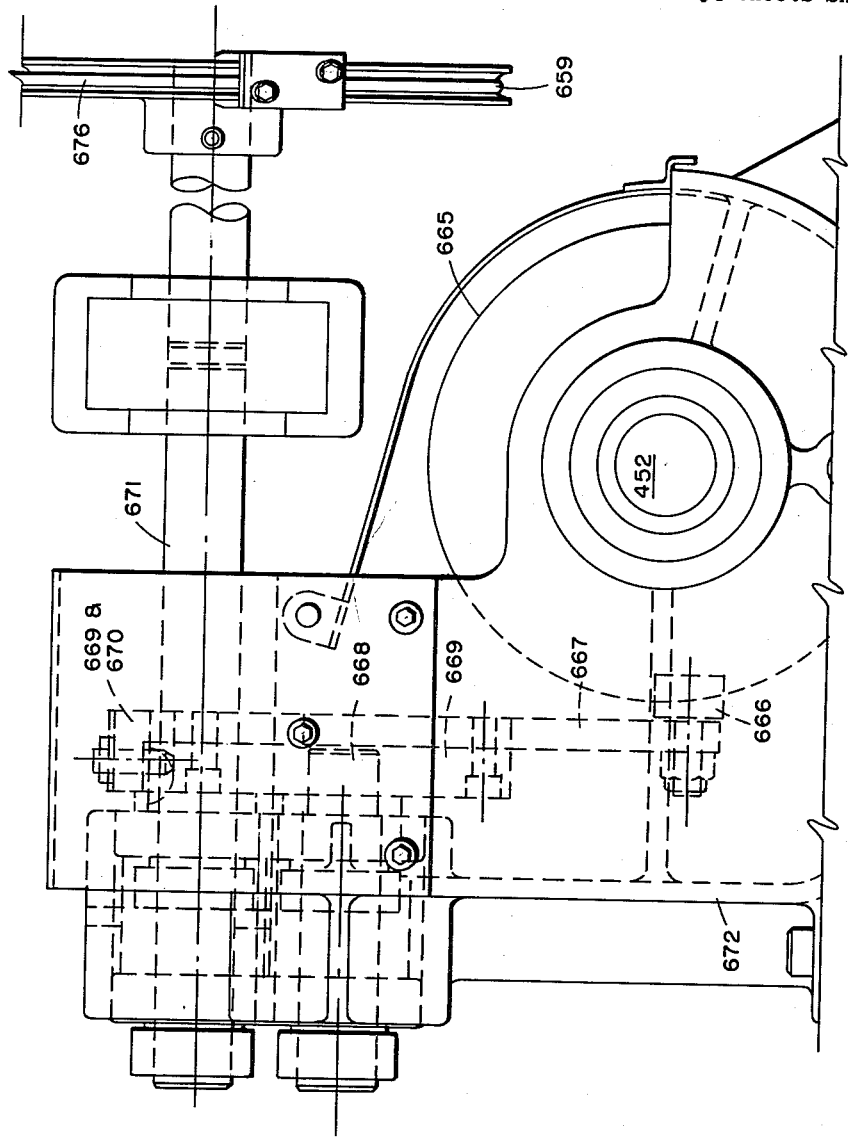
FIG. 14 is an end view partially cut away of the driving mechanism of FIG. 13.

In FIGS. 13 and 14 there are shown a side and end view, respectively, of the driving mechanism for moving the shuttle plate. Additional details of this mechanism are also illustrated in FIG. 15, which should be examined in connection with FIGS. 13 and 14 to obtain a complete description of the mechanism for operating the shuttle plate.

In FIGS. 13 and 14 it will be seen that the back and forward movement of the shuttle plate is achieved through a cam mechanism associated with the main shaft 452. On shaft 452 there is located a barrel cam 665 which has associated with it a cam follower 666 and a cam follower arm 667 which is employed to rotate a shaft 668 through a predetermined arc. All of these are enclosed in housing 672. Attached to shaft 668 and corresponding to the arc through which it is rotated is a gear segment 669 which is designed to give the proper amount of arc to a pinion 670, which in turn drives a shaft 671 to which is attached a pulley 676. The cable 659, which is permanently affixed to the shuttle plate 600 through a suitable device such as a loop 660 (FIG. 12), serves to impart the necessary backward and forward movement to the shuttle plate through the aforementioned rollers 656 which are rotatably mounted to the shuttle plate frame 655 (see FIG. 11).

Figure 15:
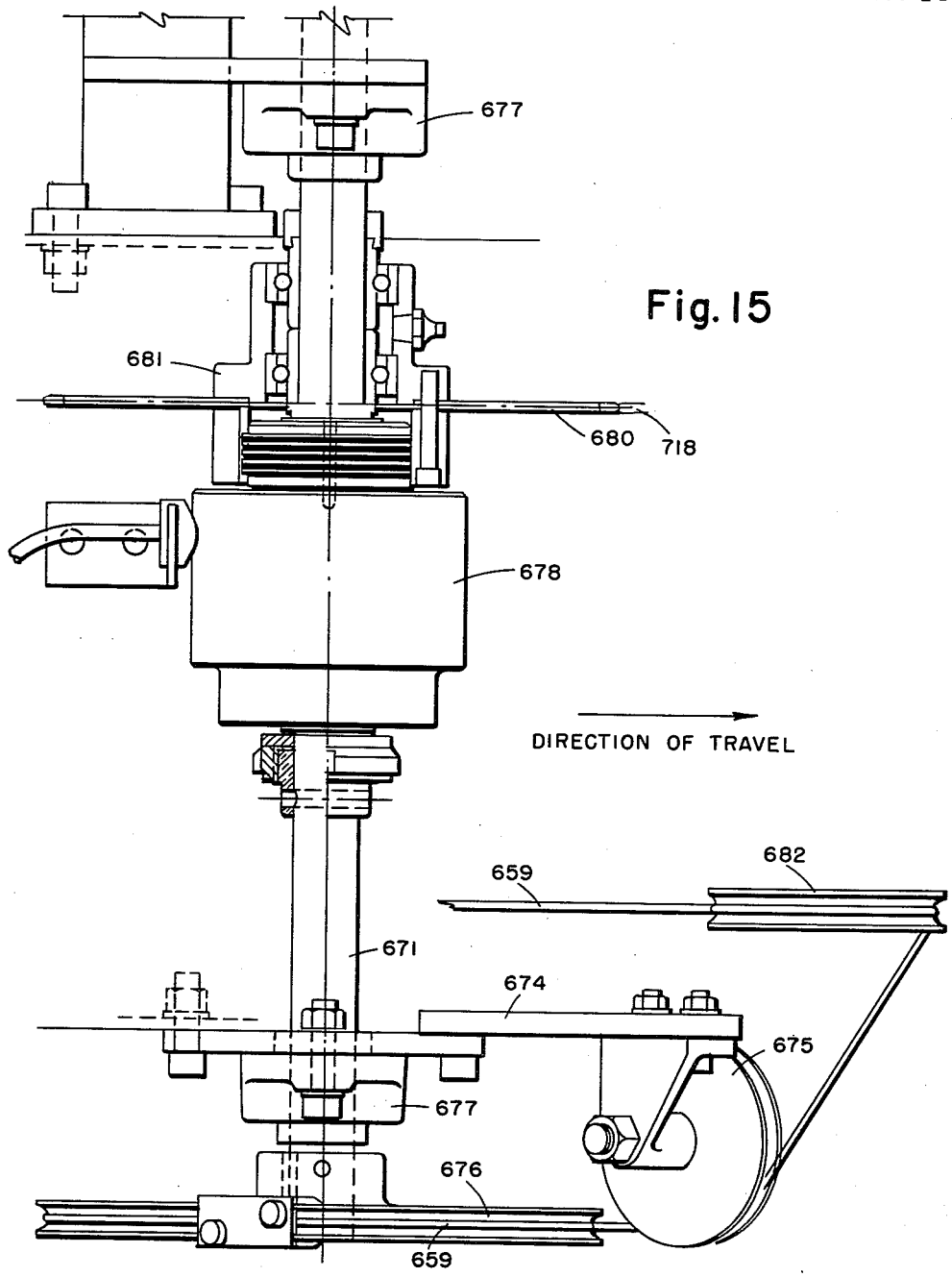
FIG. 15 is a top plan view of driving mechanisms associated with the shuttle plate and with the tissue folding portion of the apparatus.

FIG. 15 further illustrates the mechanism of the shuttle plate drive. In this figure it will be seen that there is provided a drive pulley 676, a guide pulley 675 and a secondary drive pulley 682. The shaft 671 and guide pulley 675 are mounted on a frame 674. On shaft 671, which is supported along its length by suitable support bearings such as 677, there is also located a chain transport sprocket 680 and an associated electric clutch 678, the function of which will be described below. It will be understood that there is a duplicate set of pulleys 675 and 682 at the other end of shaft 671. They are not drawn in FIG. 15 in order to simplify the drawing.

Figure 16:
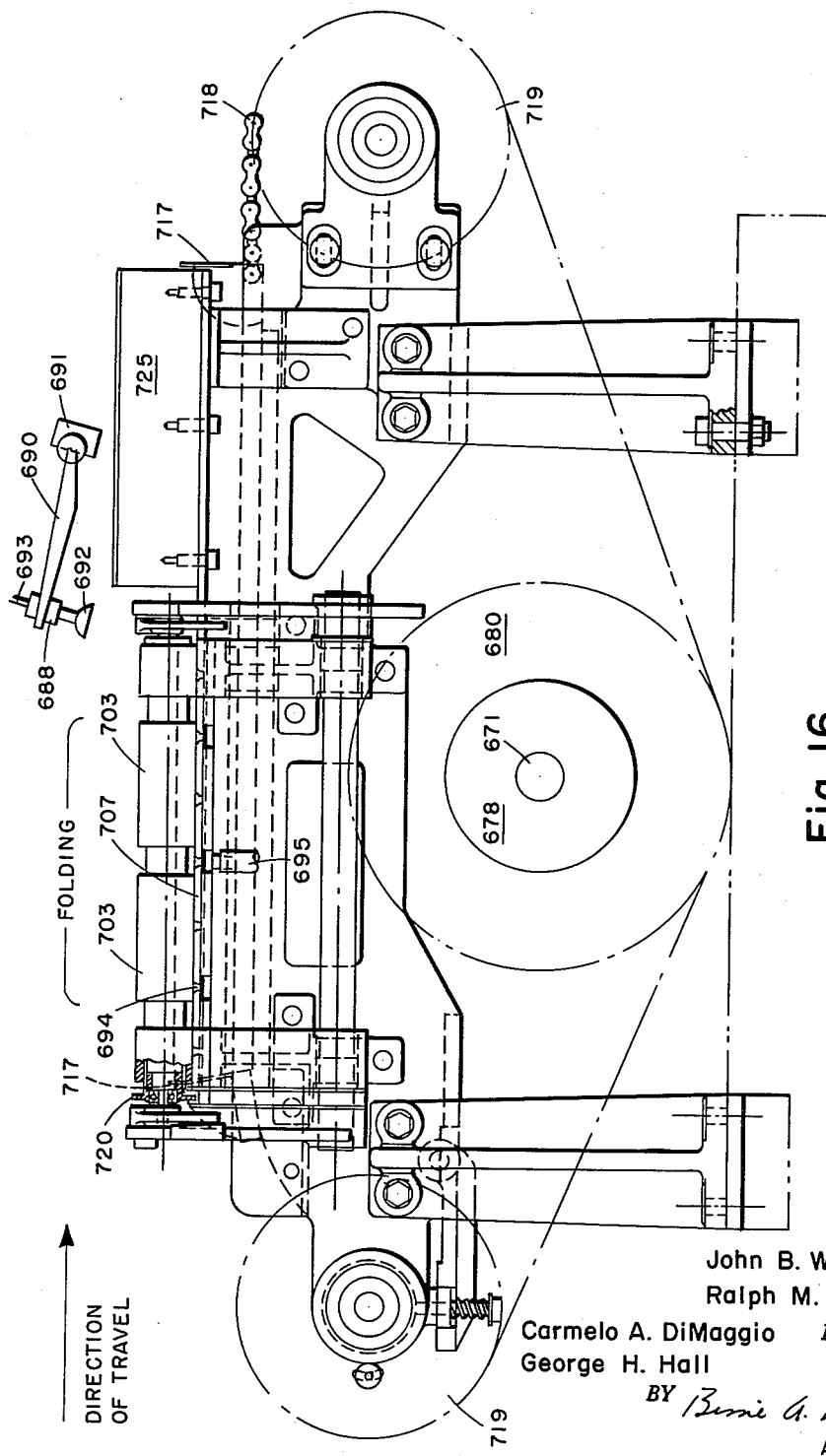
FIG. 16 is a side view of the folding station.

Shaft 671 rotates through an angle clockwise, and then through an identical angle counterclockwise as seen in FIG. 16 to move the shuttle plate 600 through its total movement from the point where it receives the folded hosiery and the tissue to the folding station and back to the original point. In order to use only the clockwise motion of the shaft 671 to move the chain 718 and pushers 717, the electric clutch 678 is activated at the proper time by a cam-operated switch (not shown) mounted on an extension of shaft 598 which is in turn driven from shaft 452 as shown in FIG. 4. The action of the chain 718 and the pushers 717 is described below. It can be seen that the chain 718 is moved simultaneously with the forward movement of the shuttle plate to the folding station and that chain 718 dwells during the return motion of the shuttle plate.

Turning now to FIG. 16, there is illustrated a side view of that portion of the travel of the shuttle plate where the folding of the tissue takes place, and of the transport mechanism used to move the tissue-wrapped pair of hosiery to Station L. In FIG. 16, and also in FIG. 17 which is a top plan view of the apparatus of FIG. 16, will be seen a portion of the means for folding over the tissue to envelop the folded hosiery. The tissue folding apparatus is shown in more detail in FIG. 18.

The shuttle plate 600 in its horizontal travel reaches its forwardmost position in the travel sequence directly over that section of FIG. 16 labeled "Folding." At this point it is necessary to hold the unfolded tissue containing the folded hosiery in position on it while the shuttle plate is withdrawn to its forward position. This is done by means of vacuum applied at two cups 692 which are mounted on arms 690 (only one which is shown) which are mounted on a rotatable shaft 691 which in turn is cam-driven by a cam or shaft 598 in a manner similar to that shown in FIGS. 9 and 10. The arms 690 move through the necessary degree of arc to contact the tissue edges just before the shuttle plate is to be withdrawn and they serve to draw the tissue and hosiery off the shuttle plate as it reverses its travel. The arms 690 then swing upwardly so as to clear the path of the folder arms 700. Vacuum head 688 and vacuum cups 692 are attached to a vacuum source through line 693. When the cups 692 hold the tissue as the shuttle plate 600 returns, the tissue and hosiery are deposited in the folding station by the rotating action of shaft 671. In order to hold the tissue 600, and hosiery on it, in its fully extended condition prior to folding up the sides there is provided a folding plate extension 689 with a suitably shaped slot 727 to accommodate passage of the folding mechanism. Vacuum applied through holes 694 is then used to hold the tissue on which the hosiery lies in the central portion of the folding position. The vacuum holes 694 are in turn connected to a vacuum source by a suitable line 695. When suction is applied through holes 694 it will be appreciated that the tissue is retained in proper position across its entire width during the folding operation.

Figure 18:
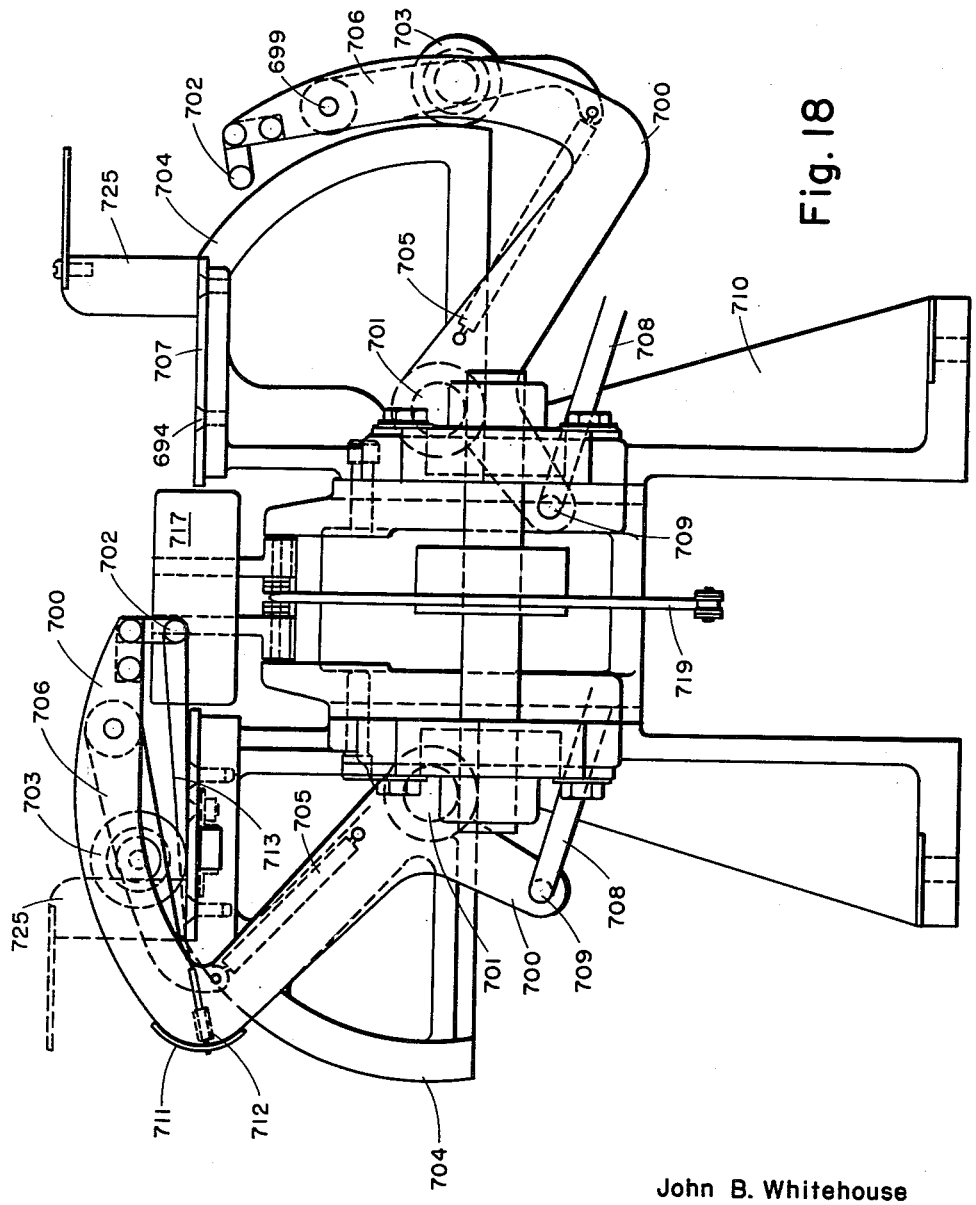
FIG. 18 is an end view of the tissue folding apparatus.

Folding is accomplished by the apparatus in FIG. 18, which is an end view of the two folders making up the folding mechanism. As previously pointed out, it is desirable to be able to choose whether the left portion of the tissue is to be folded over the right, or whether the right portion is to be folded over the left. The mechanism for making an adjustment to accomplish this is discussed below.

The folding mechanism itself consists of two assemblies, each comprising two driving arms 700 which are mounted on suitable shafts 701. There are, of course, a right and a left assembly to accomplish the folding of each side of the tissue over the hosiery. Connecting the driving arms at their outer end is bar 702, and connecting the arms at the rear of the segment is bar 711. Suspended between the two bars 702 and 711 are three strap assemblies 713 which are kept taut by springs 712.

Mounted within the arms 700 is an assembly consisting of two folding arms 706 which are connected pivotally to the arms 700 by pins 699, a creasing roller 703 and two springs 705. Mounted integrally with the creasing roller is sprocket 720 (FIG. 16) which rolls in a chain 722 (FIG. 17) rigidly attached to the circular surface 704 and the horizontal folding plate 707. The springs 705 cause the creasing roll to follow the circular surface 704 and the horizontal folding plate 707 during the folding action. The bar 702 gently folds the tissue over the folded hosiery and the strap assemblies 713 hold the tissue in this position until the creasing roll 703 rides up on the edge of the tissue and imparts a permanent crease to the tissue, so that it will remain folded through the subsequent operations.

The fold lines of the completed package lie just outboard of a line through the centers of the vacuum holes 694. Thus, as the folding arm assemblies are actuated, starting from a position beneath the horizontal folding plate 707 (and folding plate extension 689) they move up through the horizontal sequentially to fold the tissue over the hosiery.

The folding arm assembly that is programmed to start first will completely fold over and crease in place one side of the tissue before the other folding arm assembly begins its inward motion. The first arm assembly returns to its starting position while the second arm assembly is moving in to perform the folding and creasing of the other side of the tissue. And, finally, the second arm returns to its starting position. The above described sequence must be accomplished during that period of time in which the shuttle plate is clear of the paths of the folding arms, and the arms must be in their initial starting position at all other times.

The actuation and timing of the folding arms is accomplished by a double-grooved plate cam. Each groove actuates one of the folding arm assemblies. This cam is so fashioned that the superimposed cam curves of both cam tracks has symmetry about the center of the cam dwell in the retracted or starting position. This symmetry makes possible the selection of which folding arm assembly operates first by selecting the direction of cam rotation. The cam is made to stop at the zero point, which is on the axis of symmetry mentioned above, and, regardless of which direction it may be rotated from this point, the timing will remain the same—that is, the folding operation will start at the same time in the machine cycle. However, reversing the cam causes the folding operation to start with movement of the opposite folding arm. The mechanism for making this selection is described below.

The folding arms 700 are in turn driven through a turnbuckle 708 (FIGS. 18 and 20) attached to the arms 700 through a suitable pivot pin 709. The entire folding mechanism is maintained on a suitable frame such as that indicated at 710.

As pointed out above, the timing mechanism for controlling the rotation of folding arms 700 to fold over the tissue can be so adjusted as to fold over each tissue after being placed in folding position; or these folding arms may be caused to act only after a predetermined number of tissue-hosiery assemblies have been placed in position to achieve the so-called nested arrangement for subsequent boxing.

Before discussing the drive mechanism associated with the folding arms accomplished through turnbuckle arm 708 and the manner in which they may be adjusted, it will be convenient to describe the remaining portion of the mechanism associated with the folding portion of Station J, especially that mechanism which is responsible for moving the hosiery forward to Station L once the tissue has been properly folded over it.

Returning now to FIGS. 16 and 17, there is provided between the two parallel horizontal folding plates 707 an open channel 716 through which small, vertically-positioned pushers 717 mounted on a chain 718 are brought up and given a backward motion to push the hosiery contained in the folded tissue beyond Station J to Station L. It will be appreciated that the folded hosiery protected now by tissue permanently folded thereover is of such a character that it can be moved to the next station by a pushing motion such as provided by the pushers 717. The chain 718 on which pushers 717 are maintained is driven by main drive sprocket 680 (FIG. 16) around and rides on two end sprockets 719. The mechanism for rotating drive sprocket 680 has been described with reference to FIGS. 15 and 16.

Associated also with this station at the after end of the folding section is a directing channel defined by guide plates 725 which is just wide enough to pass the folded, tissue-covered hosiery to the next station.

Referring back to FIGS. 15 and 16 it will be seen that the chain 718 is driven by sprocket 680 mounted on shaft 671 and controlled by the electric clutch 678. The clutch in turn is, as stated above, controlled by a cam-operated switch connected to shaft 598 of the apparatus, the timing of which will be discussed below in connection with the section on scheduling the operation of the apparatus.

Figure 19:
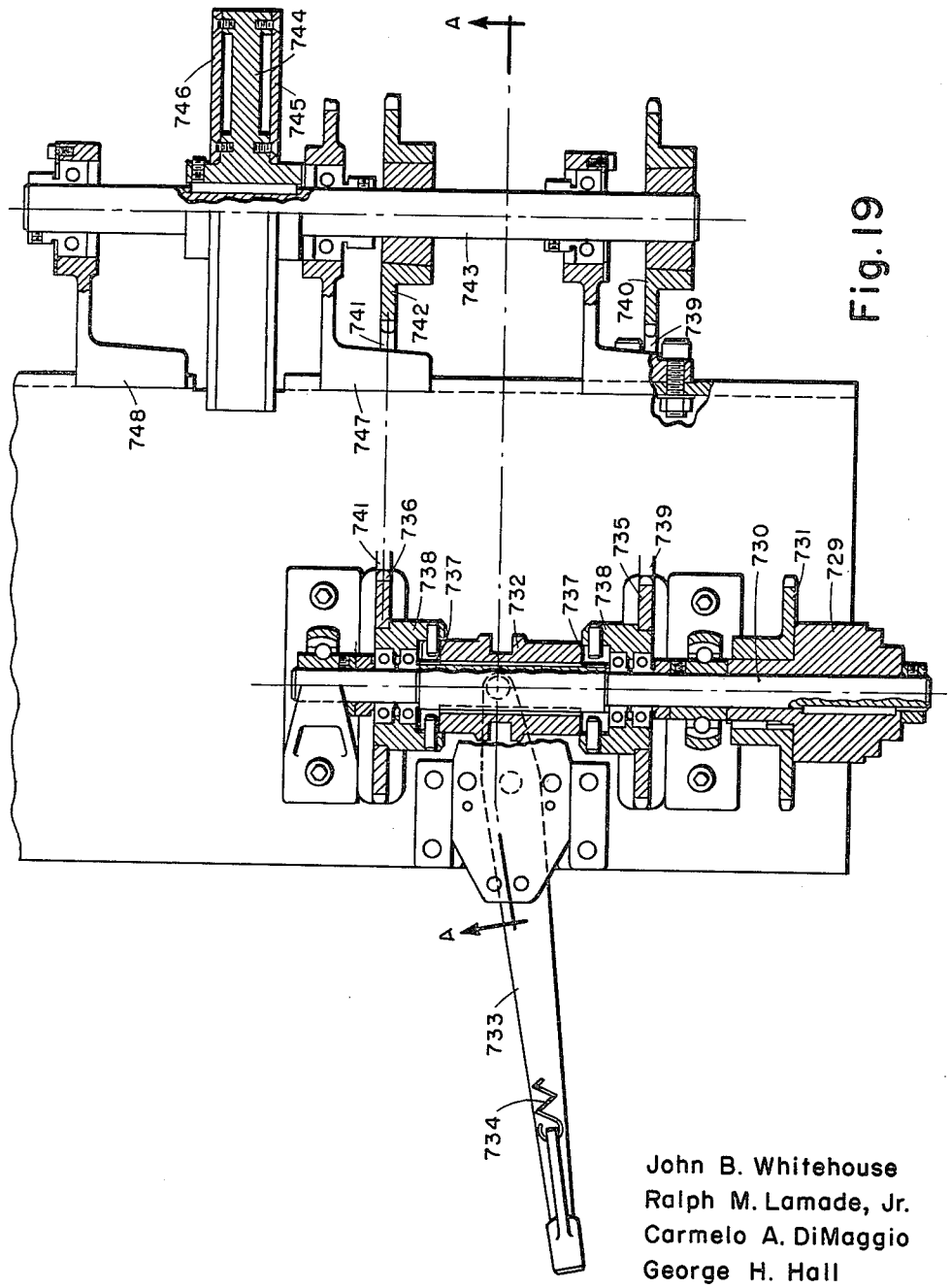
FIG. 19 is a top view partially cut away of the driving mechanism associated with the apparatus of FIG. 18 showing the means for adjusting the order of folding the tissue sheet sides.
Figure 20:
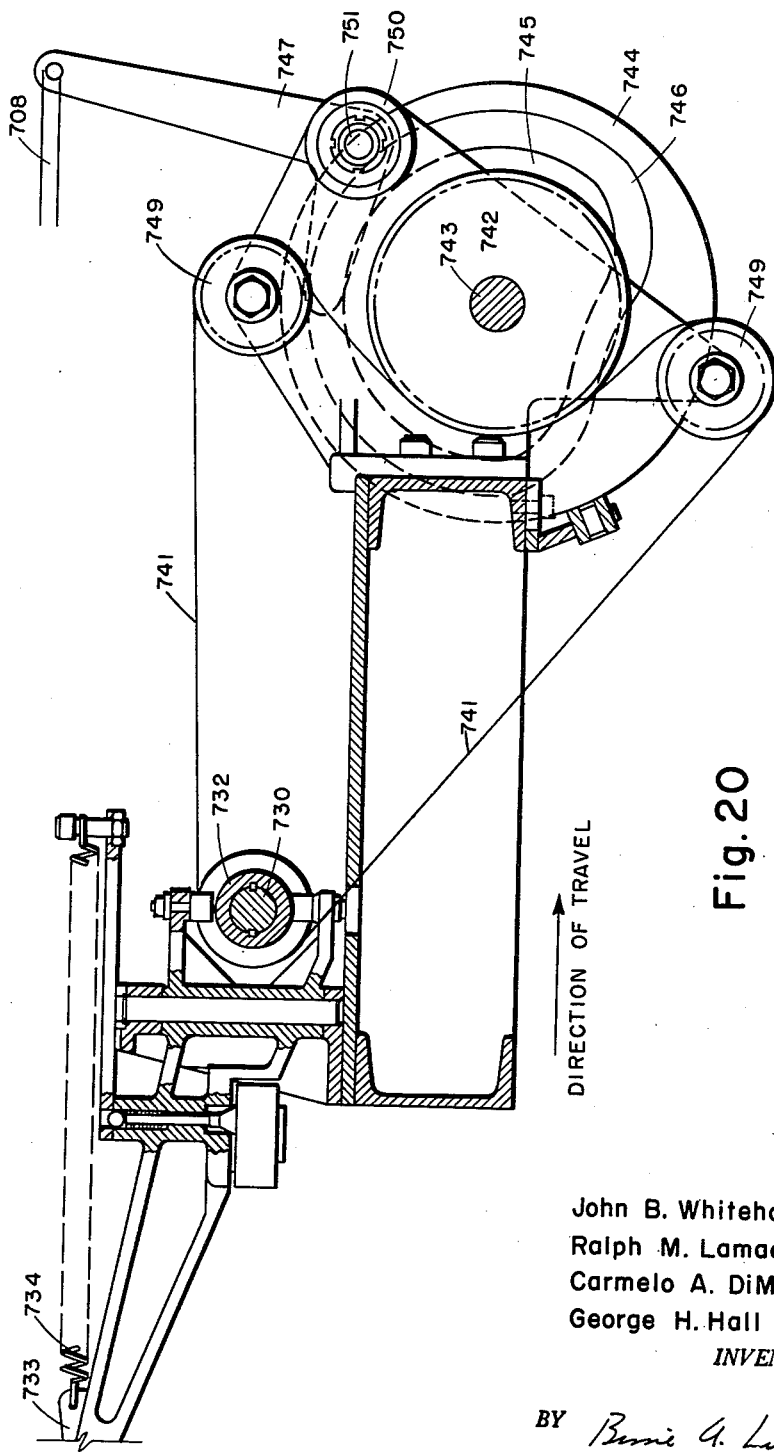
FIG. 20 is a cross-sectional view of the apparatus of FIG. 19 taken along lines A—A of that figure.

FIGS. 19 and 20 detail the driving mechanism for the folders and show how it is possible for the folder to be adjusted to determine whether the right side of the tissue is folded over the left side or the other way around. Referring first to FIG. 19 there is shown a drive shaft 730 to which sprocket 731 is fixed through a single revolution clutch 729. This sprocket in turn is driven by a chain from the main shaft 452 of the apparatus (not shown). On shaft 730 a sleeve 732 is grounded by means of a suitable key. Attached to this sleeve 732 is a shifting arm 733 maintained in proper arrangement by means of a spring 734. There are located on shaft 730 a right sprocket 735 and a left sprocket 736 which, when not engaged with sleeve 732, are free to rotate on ball bearings about the shaft 730. By proper movement of the shifting arm 733 either one of the sprockets 735 or 736 can be rigidly engaged to be driven by the shaft 730 by means of fixing the sleeve 732 into a slot 737 in either of the sprocket mountings 738.

Associated with the driving mechanism is a secondary shaft 743 on which are mounted two sprockets 740 and 742 aligned with and associated with sprockets 735 and 736, respectively. Suitable chain 739 connects sprockets 735 and 740; and chain 741 connects sprockets 736 and 742. The cam 744, which is associated with the driving mechanism of the folder, is of the double face type having faces 745 and 746.

Referring now to FIG. 20 the cam 744 will be seen to have associated with it cam followers 750 and 751 and cam follower arms 747 and 748. The cam faces are so designed that selection of the side of the tissue that is to be folded first can be made by selecting the direction of rotation of the cam. In order to impart a reversing motion to the cam, chain 741 which connects sprockets 736 and 742 is driven over guide sprockets 749 and only over a portion of sprocket 742 as shown in FIG. 20. Chain 739, however, connects sprockets 735 and 740 directly to give a forward motion to the sprocket 740. Cam follower arms 747 and 748 are in turn connected to the turnbuckle arms 708 (see FIGS. 18 and 20) which in turn provide the drive for their corresponding folding arms 700.

It will be helpful to review now the operations performed at this Station J beginning with the lifting of a single tissue sheet by vacuum cups 635 from the supply maintained at a predetermined level in tissue magazine 615 by the mechanism described. The operations of all the auxiliary drive shafts used in this station, including that associated with the folder arms (if the tissue sheet is to be folded around each pair of hosiery individually) are actuated and controlled by a suitable combination of a sensing and memory system which will be described in detail in Section IX below. It is sufficient at this point to indicate that a signal from the sensing mechanism will cause the mechanism associated with vacuum cups 635 (FIGS. 9 and 10) to lower these vacuum cups and simultaneously actuate the vacuum system. Cups 635, having picked up a single tissue sheet by the leading edge will be raised by raising the support head 637, the height they are raised being sufficient to permit the shuttle plate to be moved directly under the tissue sheet and over the magazine.

While the tissue sheet is being lifted the mechanism associated with the movement of the shuttle plate causes it to move backward and then remain in position to receive the tissue which is accomplished by lowering vacuum cup 635 again and shutting off the vacuum system.

While the shuttle plate is moving into its back-most position (relating to the direction of travel) and the tissue sheet is subsequently laid on it, the horizontal platforms 560 (FIG. 3) have received a pair of folded hosiery and the spatula conveyor has been actuated to move down and then upward to pick up the hosiery, rotate it through 90° and come to rest just above the tissue covered shuttle plate. Coordinated with the movement of the spatula conveyor is the movement of the holding mechanism of FIGS. 5 and 6. The holding mechanism has kept the hosiery in place during the rotation of the spatula conveyor. When the spatula conveyor drops down onto the shuttle plate and thus onto the sheet of tissue placed there, the wedges 602 project up between the tynes of the spatula conveyor behind the folded hosiery and push it off the tynes onto the tissue on the shuttle plate as the latter moves toward the folding station.

With the folded pair of hosiery resting on the tissue sheet, the shuttle plate moves to its forward-most position to where the folding over of the tissue is done and the tissue containing the hosiery is removed as illustrated in FIGS. 11–15.

At this point it is necessary to withdraw the shuttle plate to have the tissue sheet in a flat condition with the hosiery on it. This is done by holding the tissue in place by the vacuum cups 692 (FIGS. 16 and 17) as the shuttle plate moves out from under it allowing it to fall the short distance to the folding platform below. With the withdrawal of the shuttle plate a signal is given to actuate the folding mechanism of FIGS. 16–20. It will be appreciated that an operator has previously moved control arm 733 (FIG. 19) to select the order in which the sides of the tissue are to be folded. This will (as described above) determine the subsequent operation of the driving mechanism, i.e., whether right is folded over left, or left over right (FIG. 19). Movement of the two folding arm assemblies 700 of FIG. 18 will cause the bar 702 first to bring the tissue sides over the hosiery lying on platforms 707 and then roller 703 to crease the folds making the tissue lie flat, thus completely encompassing the pair of hosiery. The tissue in the meantime is held firmly in place by the vacuum in perforations 694 which is turned on at the time the shuttle plate is withdrawn.

After folding of the tissue has been accomplished the tissue-wrapped hosiery must be moved on to the next station. This is done by the pushers 717 which move in a horizontal motion under the folding platform and which spring up to provide the necessary vertically positioned surface as the chain 718 on which they are attached comes into proper position (FIGS. 16–28). Thus by the final action of this station a tissue-wrapped item is pushed into position at the next operation station.

IV. ASSEMBLING PREDETERMINED NUMBER—STATION K

Figure 17:
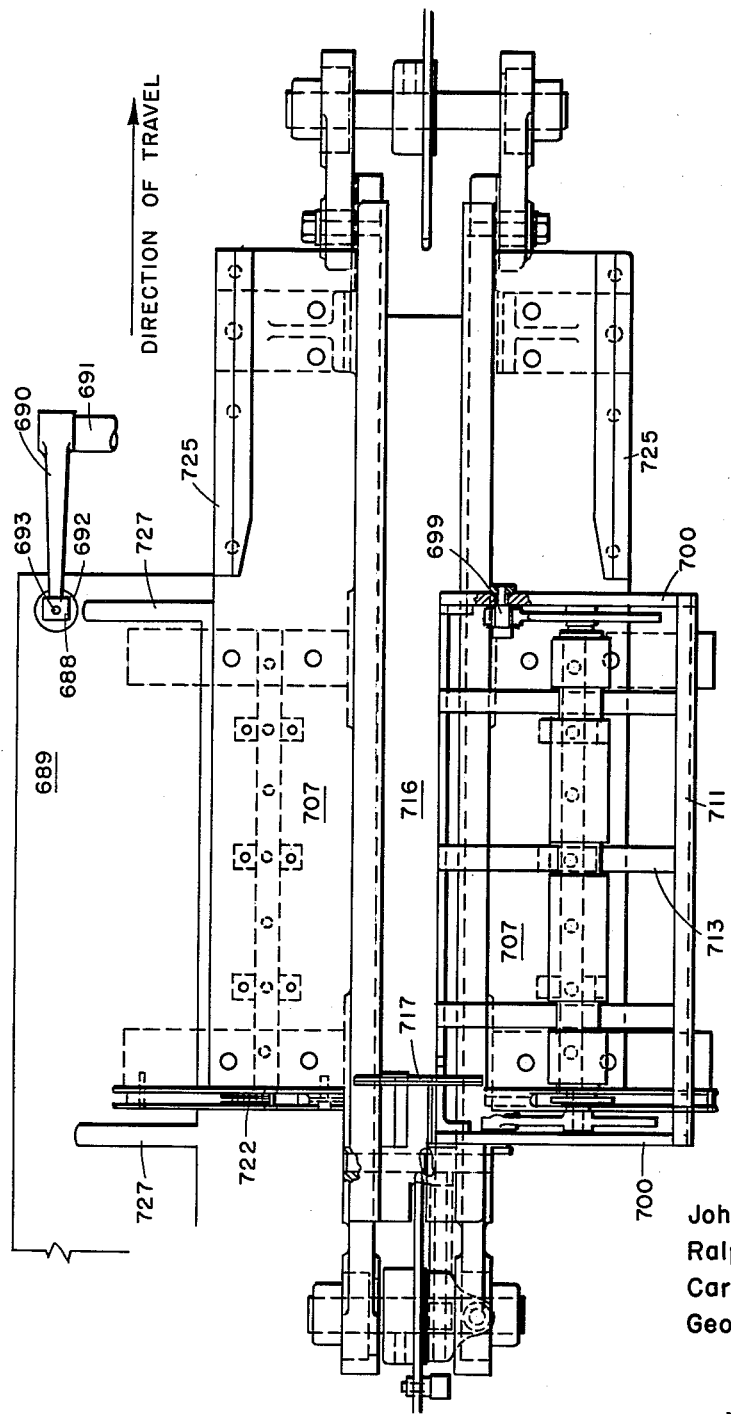
FIG. 17 is a top plan view of the apparatus of FIG. 16.

(FIGS. 17 and 21)

In boxing a plurality of items banded together in a single box it is, of course, necessary to assemble the desired number of items prior to depositing in the box. It has been pointed out previously that, for example in the case of hosiery, it is customary to band together several pairs. It has also been pointed out that assembly of the predetermined numbers may be accomplished prior to the folding of the tissues, or may be done by stacking the tissue-wrapped pairs on each other. The former type of assembly is performed in the apparatus of this invention at the folding station of FIG. 17. The control means associated with this assembly has been described above in Section III. The second type of assembly is performed in this apparatus at the card placing station, described below in Section V.

In either case, a selector switch is set so that a signal which directs the operation of the remaining operational stations of the apparatus may come from one or the other assembly stations located at the folding position or at the card placement position. It either case, when, and only when, all of the items have been assembled a signal is transmitted to the remaining operational stations. The signal is one which is accumulated in the memory system as discussed in Section IX below and is conveniently in a form to actuate a solenoid which in turn actuates a one-revolution clutch to permit the operation of a jack shaft operated from the main shaft of the apparatus. This means that each subsequent operational station has such a jack shaft, clutch and solenoid arrangement for its drive system. Because each of these drive systems is essentially the same, the arrangement is illustrated for one drive system only—that for transporting empty boxes into position for filling (see FIG. 27).

Thus, it will be seen that the assembly station (whether it is associated with the folding station or the card placement station) controls the remaining operational stations. Although it is listed as a separate station because it is used to actuate these remaining stations, it is, as noted above, made integral with either Station J or Station L.

V. CARD PLACING—STATION L

(FIGS. 21 and 22)

This station may have two functions: that of serving as an assembly point of tissue-wrapped pairs of hosiery as described above; and that of placing a card on the assembly, whether or not the assembling was accomplished at this station.

In packaging items it is generally desirable to place in the box a card, advertising circular, instructions or like material, and this is conveniently done before banding in order that the inserted material may be held in place on the items by the band. In the following description of this station it is assumed, as an example, that a so-called "punch card," such as made by International Business Machines Corporation, is to be inserted on top of three tissue-wrapped pairs of hosiery.

There are a number of devices in the prior art designed to automatically pick a card, sheet of paper, or like material from a stack, and eject it into a desired position, and the mechanism for doing this in the apparatus of this invention may be any of these so long as it is capable of having its operation triggered by an electrical signal. It is, of course, necessary to provide the necessary signal to the card placing apparatus. Since this station is to double as the assembling station use is made of (as described below in Section IX) the necessary controls and timing mechanism to collect a number of "good" signals corresponding to the number of items to be assembled before transmitting signals to the remaining operational stations.

The mechanism designed to place the card on the assembled group of tissue-covered items illustrated is one which was developed by International Business Machines Corporation for use with the cards used in their data processing machines. This mechanism is shown generally in a top plan view in FIG. 21 and indicated at numeral 766. By the chain drive pusher mechanism described above in connection with Section III, the tissue-covered hosiery is moved into position onto holding platforms 764. Timing control is such that a card is fed out through the IBM magazine 766 through rollers 767 onto the assembled items resting on platform 764 after the proper number of pairs of hosiery has been assembled. A hand operated knob 768 is supplied to permit manual setting of the mechanism when loading cards into the magazine. The resting platforms 764 at this station are spaced apart, and defined between them is a channel 765 which permits the next transport system to pick up the assembly of tissue-covered items and the card and take them to the bander.

The transport system which serves both the assembly station and the banding station is shown in a side view in FIG. 22. This transport system will be seen to be similar to that described in the above-mentioned Serial No. 792,151 with certain modifications to be noted. The platforms 775 and 777 replace the interdigitated transport bars of Serial No. 792,151 and there is also provided in this transport system a section which will be seen to be so shaped as to be provided with a well-shaped or recessed portion 776 which permits the banding station to operate at this point as described below in Section VI.

The transport mechanism (duplicate devices being used) consists of a drive shaft 774 to which there is affixed a cam 778. Associated with cam 778 is cam follower 779 and cam follower arm 780, the latter being attached to the cam follower through a pin 781. Cam follower arm 780 rotates about a pivot pin 782 which is fixed in a suitable mounting 783. To the arm 780 is attached a transport drive arm 784 through pin 785. This drive arm in turn is mounted to a transport support 786 through pin 787. There is also associated with this transport mechanism a device which permits adjusting the distance of travel of the platforms 775, 776 and 777. This is identical to that described in Serial No. 792,151 in connection with FIG. 5 of that application, and for simplicity in presentation, it is indicated in FIG. 22 here as comprising a driving yoke 788, pin 789 through which the yoke 788 is fixed to drive arm 784, and an adjusting mechanism generally indicated at 790.

The after transport mechanism, in which like numbers refer to like elements in the forward mechanism described, is driven off shaft 774 through sprockets 791 and chain 792.

It will be appreciated that this transport mechanism imparts upward, forward, downward and backward motion to the platforms 775 and 777 and to the modified platform 776 which brings the assembled pairs of hosiery into position for the banding operation. The adjusting mechanism permits varying the length of travel and hence the allowable distance between stations.

In operation, whether the card placing station is or is not serving as the point of assembly, the mechanism for kicking out the card will be actuated by a signal from the memory device either after the three pairs of accumulated hosiery are transported (as described above) to the card placing station or after the memory device has received the proper number of "good" signals coincident with the arrival of the proper number of tissue-wrapped pairs of hosiery. This signal actuates the card placing mechanism and the transport mechanism at the same time, the timing between the movement of the card and the actual picking up of the hosiery package being such that this is possible. The transport mechanism is controlled as to its motion by a one-revolution clutch and a jack shaft through to the cams and their associated equipment so that after the signal actuates the clutch, the platforms 775, 776 and 777, being mechanically connected, will move from the position they occupied at the end of the previous cycle in a upward-forward-downward-backward motion, picking up the assembly with the card or insert on top.

It will be appreciated that the transport mechanism is actually moving three items in its travels. The first will be the assembled items picked up from the card placing station to be moved to the banding station; the second will be the banded items which are moved to an idle station; and the third will be the assembled items moved from the idle station to the box filling station. Each of these has holding platform means associated with it (see for example the horizontal platforms 795 which define a channel 796 between them) to receive the items from the transport system and to hold them while the necessary operation is being performed at the station.

Associated with each of the platforms 775, 776 and 777 may be a pivotally mounted backstop 762, the purpose of which is to prevent the items on each of these transport platforms from slipping out of place as the transport mechanism is moved backward (i.e., toward the next succeding station). The backstops are conveniently attached to a conventional spring loaded device (not shown) which will cause them to assume a horizontal position during the return cycle or backward movement of the transport mechanism.

VI. BANDING—STATION M

(FIGS. 23–26)

Figure 23:
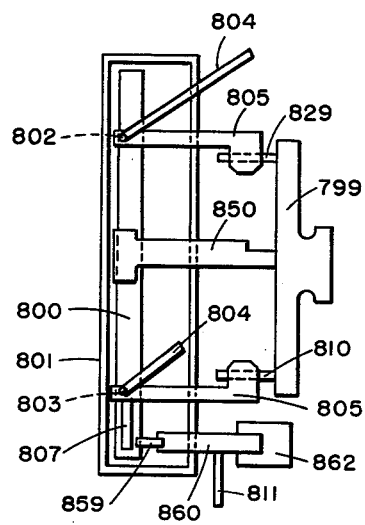
FIG. 23 is a top plan view of the banding mechanism.
Figure 24:
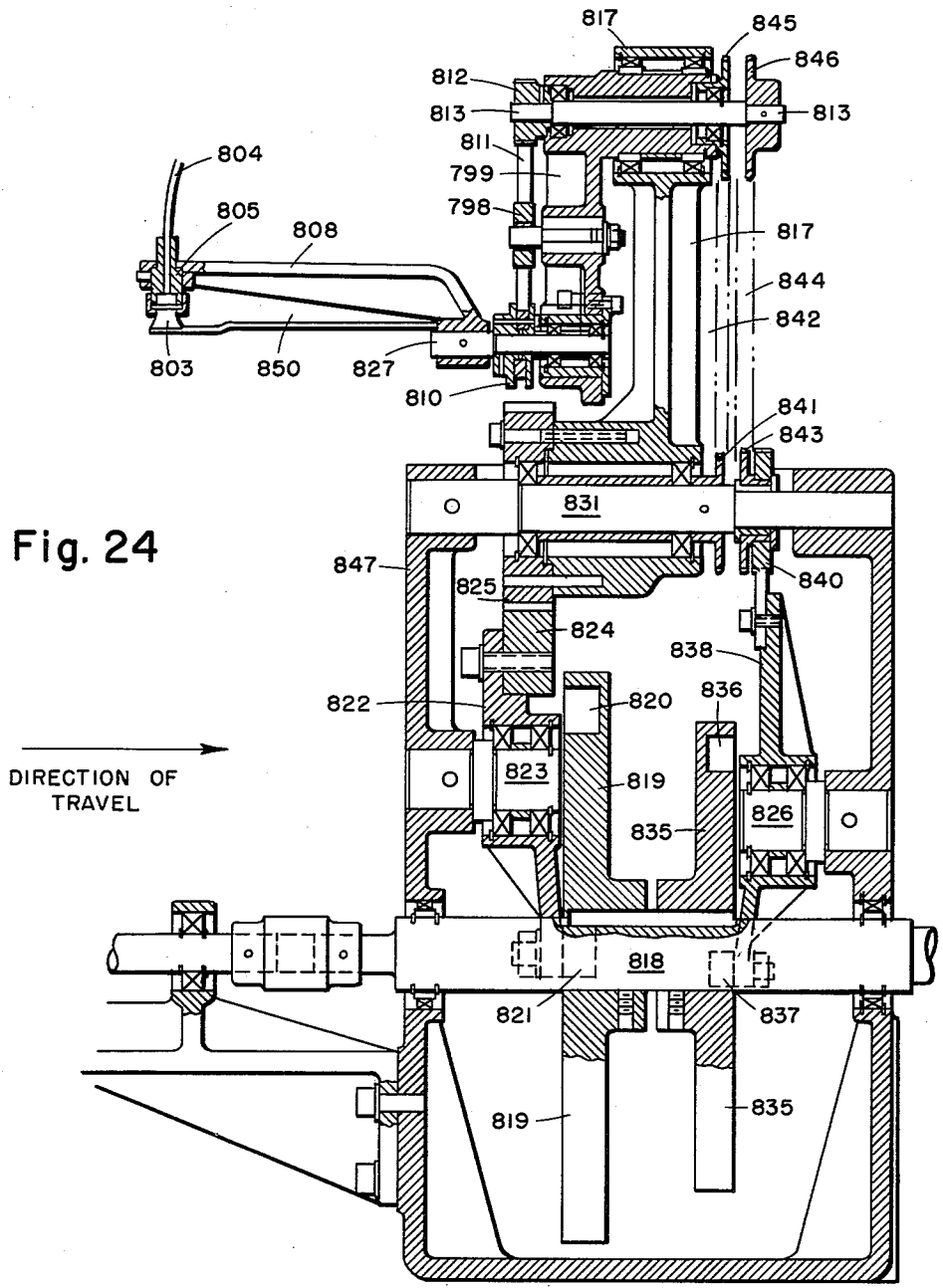
FIG. 24 is a side view partially cut away of the driving mechanism associated with the banding mechanism.
Figure 25:
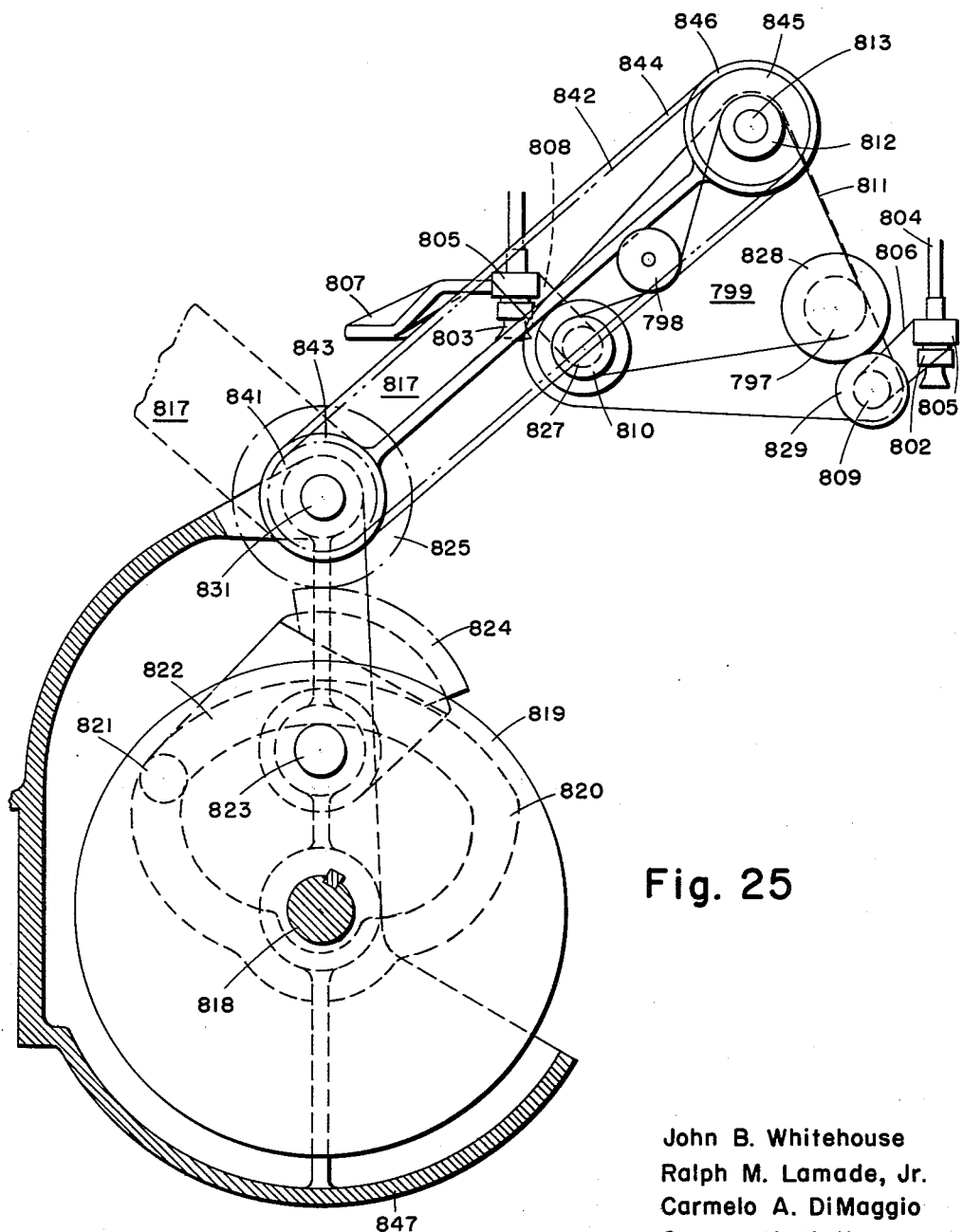
FIG. 25 is an end view of the banding mechanism showing the driving mechanism responsible for the radial movement of the banding apparatus.
Figure 26:
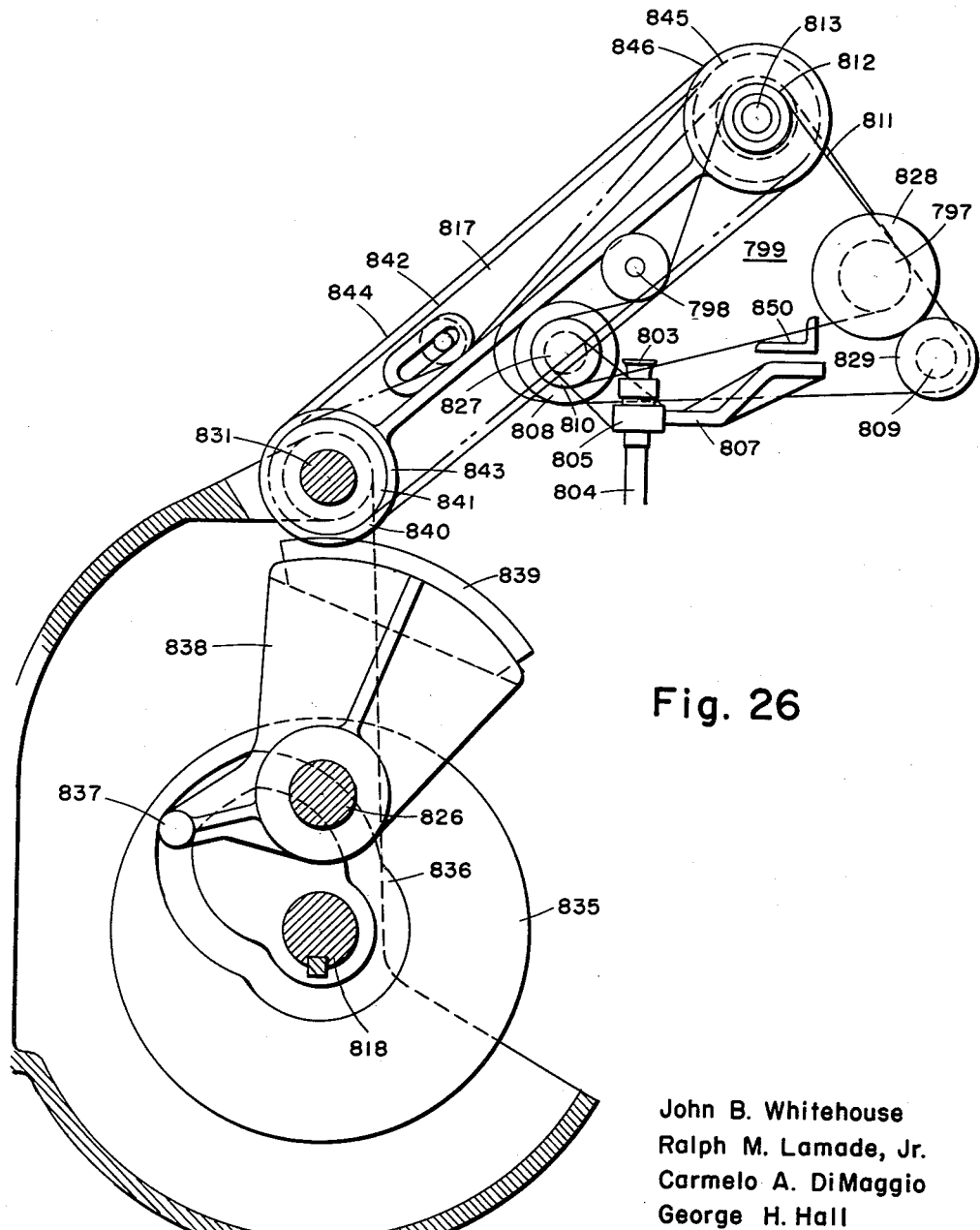
FIG. 26 is an end view of the banding mechanism showing the driving mechanism responsible for the movement of the arms holding the bands.

In processing tissue-wrapped items (and prior to placing them in a box), it is usually customary to band together two or more of them, or to band a single item in a manner to hold the tissue in place. It is the purpose of this banding station to provide a mechanism for picking up a suitable band and wrapping this band around the assembled items and affixing the band permanently. The bands themselves may be of a variety of widths and shapes, but are generally long narrow strips of paper. These bands may be permanently affixed around the assembled items either by the use of an auxiliary strip of an adhesive coated material such as a short strip of a pressure-sensitive coated tape, or one end of the band itself may contain a pressure-sensitive adhesive which when contacted to the other end of the band will remain permanently affixed to it. In the banding mechanism it will be appreciated that it is necessary not only to pick up the band and wrap it around the assembly, but also to time the mechanism such that one end of the band is put in position before the other so that the latter may overlap and become affixed to the former. The mechanism for banding is illustrated in FIGS. 23–26. FIG. 23 is a simplified top plan view of the banding mechanism, FIG. 24 is a side view and FIGS. 25 and 26 are end views of the driving mechanisms associated with operating the two arms for handling the two ends of the band.

In FIG. 23 it will be seen that the bands 800 are supplied from a stack in a magazine 801. They are picked up by two vacuum cups 802 and 803 which are connected to a suitable vacuum system by lines 804 through vacuum cup heads 805. The bands are then wrapped around the items and fastened on the underside. The items during the banding operation rest on the holding means 795. The remaining portion of the apparatus will be described with reference to FIGS. 24–26. However, it will be convenient at this point to describe the mechanism associated with the magazine 801 for maintaining a constant supply of the bands at a desired level for picking up the vacuum cups. This is done conveniently by means of a mercury switch 859 which is pivotally mounted on an arm 860 which in turn is held through a supporting arm 861 to the frame of the apparatus. Associated with this mechanism is a small electric motor generally indicated as box 862 which is wired to the mercury switch 859 (connections not shown). When a sufficient number of bands have been removed from the magazine the mercury switch 859 is caused to tilt to the extent that a circuit is made by the mercury flowing forward, the motor 862 is actuated and drives a plate (not shown) holding the stack of bands 802 upward into position to the point where the mercury switch breaks the contact and the bands are again in place.

The wiring is also such that when the magazine is empty, the motor will reverse itself and return the magazine adjustment means to the lowered position, simultaneously turning on a light to warn the operating personnel this fact. The magazine can then be replaced with a full one and by actuating a switch, the magazine adjustment mechanism is actuated to move the top level of the bands to the operating level where the automatic adjustment means takes over. Since this is a fairly standard mechanism, it is not shown in greater detail.

Turning now to FIGS. 24–26, the driving mechanism to effect the controlling of the movement of the two vacuum cups 802 and 803 may be described. In the drawings, vacuum cup 802 is the faster one; while vacuum cup 803 rotates slower. This means that the end of the band held by vacuum cup 803 overlaps the end controlled by vacuum cup 802. In this arrangement the bottom surface of the band end controlled by vacuum cup 803 will be coated with a suitable pressure-sensitive adhesive, and the upper surface of the band end controlled by vacuum cup 802 will be coated with a pressure-sensitive adhesive which is compatible in the adhesive sense with that adhesive on the other end.

FIGS. 25 and 26 illustrate the mechanism associated with vacuum cups 802 and 803. FIG. 25 shows the position of the triangular head 799, which supports the vacuum cup driving mechanisms, in position over the assembled pairs of hosiery prior to the rotation of the arms 806 and 808 which support vacuum cups 802 and 803, respectively, to cause the band to encompass the assembled items. FIG. 26 shows the position of the slower rotating vacuum cup 803 in position after the band has been folded around the assembled pairs. Finally the partial, dotted lines in FIG. 25 illustrate the position assumed by the main support arm 817 when the triangular head 799 and its associated mechanisms is in its normal rest position at the time when the transport mechanism is advancing a stack of items to be banded and at the time it is moving a banded stack on to the next station.

The various driving mechanisms and their associated components are so designed, as will be seen, to maintain the triangular support head 799 always in the same position with relation to the horizontal plane and hence to maintain arms 806 and 808 in the same relative horizontal position, their rotation being about their respective shafts 809 and 827.

Since arms 806 and 808 must be operated at different rates, means must be provided to rotate cup 802 faster than cup 803. Both arms 806 and 808 are driven through shaft 813 which in turn is mounted in a bearing support head which is an integral part of main support arm 817. Mounted on shaft 813 is a sprocket 812 which drives a chain 811 which in turn is directed by a guide sprocket 798 to drive sprockets 810 and 797. The means for rotating shaft 813 will be discussed below.

Sprocket 810 is associated with shaft 827 and hence is responsible for the movement of arm 808 and vacuum cup 803. Sprocket 797 is attached to a gear 828 which in turn drives another gear 829 and hence shaft 809 and arm 806 associated with the faster rotating vacuum cup 802. By proper gear design it will be appreciated that arm 806 (and with it vacuum cup 802) is rotated at a more rapid rate than arm 808 and cup 803, thus bringing that end of the band held by cup 802 into position first.

Gear 829 is attached to shaft 809 by means of a friction clutch (not shown) so that the rotation of shaft 809 will be maintained at 180° in each direction in spite of the gear ratio involved to increase the rotating speed of shaft 809. The exact rotation of shaft 809 is controlled by fixed stops not shown.

Mechanism must be provided for rotating main support arm 817 back and forth through an arc determined by the angle indicated by the two arm positions shown in FIG. 25. There must also be provided suitable mechanisms for driving shaft 813 and for maintaining triangular head 799 in its required position with respect to the horizontal. These mechanisms are driven off a jack shaft 818 which in turn is driven off the main shaft through a one-revolution clutch (not shown) actuated by a solenoid in the manner described above and illustrated in FIG. 27. The signal for the actuation of the solenoid and this mechanism is described below in Section IX.

The mechanism for rotating main support arm 817 is shown in FIGS. 24 and 25. It consists of cam 819 having a cam groove 820. Cam follower 821, cam follower arm 822 and shaft 823 are provided for the operation of cam 819. Affixed to cam follower arm 822 is a gear segment 824 which drives gear 825 which in turn is grounded to main support arm 817 which is free to rotate about shaft 831. Grounded to shaft 831 is sprocket 841 which is connected to sprocket 845 by means of chain 842.

This sprocket is in turn grounded to the hub on head 799. Inasmuch as shaft 831 is nonrotating, the transfer of this orientation to the hub of head 799 is such that head 799 will maintain its relative orientation with respect to shaft 831 when the arm 817 rotates about the shaft 831. Thus, the orientation of head 799 is maintained so that the relationship of arms 806 and 808 and the horizontal plane is constant.

Finally, there is provided the mechanism for driving shaft 813 which, as explained above, drives chain 811 and hence rotates the arms 806 and 808. This mechanism is shown in FIGS. 24 and 26. It consists of a cam 835 (having a cam groove 836), cam follower 837 and cam follower arm 838. A gear segment 839 is attached to cam follower arm 838 and engages gear 840 mounted on shaft 831 (FIG. 25). Grounded to gear 840 is sprocket 843 which is connected to sprocket 846 on shaft 813 by means of a chain 844. The movement of cam 835 therefore imparts the desired movement to chain 811 and thus ultimately to vacuum cups 802 and 803.

At the point where the band ends meet to be bonded together after being wrapped around the items, it is necessary to be able to apply localized pressure to activate the pressure-sensitive adhesive on the end of the band controlled by cup 803. This is done by hammer 807 which is attached to the head 805 of cup 803. In order to provide a localized rigid surface against which hammer 807 may exert pressure, an anvil 850 is extended out from triangular head 799 (see FIGS. 23 and 24).

Subsequent to the bringing of an assembly of items to the banding station by the transport mechanism, the vacuum in cups 802 and 803, which are resting in position over the band supply (FIG. 23), is turned on and a band is picked up and held by these cups. Immediately thereafter the gear segment 824 (FIG. 25) is caused to rotate by the cam 819 to move the main support arm 817 from its normal or rest position (indicated in FIG. 25 by dotted lines) to its operating position. Simultaneously sprocket 841 is engaged with chain 842, sprocket 845 and triangular head 799 to maintain the latter in the necessary fixed position with respect to the horizontal. With the end of the movement of main support arm 817, the band is positioned over the items to be banded and may then be wrapped around the items and adhered end to end. Cam 835 (FIG. 26) is designed to drive chain 811 in the manner previously described and hence to rotate arms 806 and 808, the former at a more rapid rate. At the end of the arm rotation, hammer 807 is in position to press the end of the band carried by cup 803 against the other end and to exert sufficient pressure against the bands, by virtue of the presence of anvil 850 to seal them together, thus banding the assembled items. At this point the vacuum is shut off and the vacuum cups are freed from the band.

After banding is completed the arms rotate back to their position shown in FIG. 25 and the main support arm 817 is swung back into rest position to pick up another band upon receipt of another signal.

The banded items are then picked up by the transport mechanism (FIG. 22) and placed in position at an idle station from which they will subsequently be transferred to the box filling station. The purpose of the idle station is to better coordinate the remaining operations.

VII. BOX SUPPLYING—STATION N (FIGS. 27–29)

Figure 27:
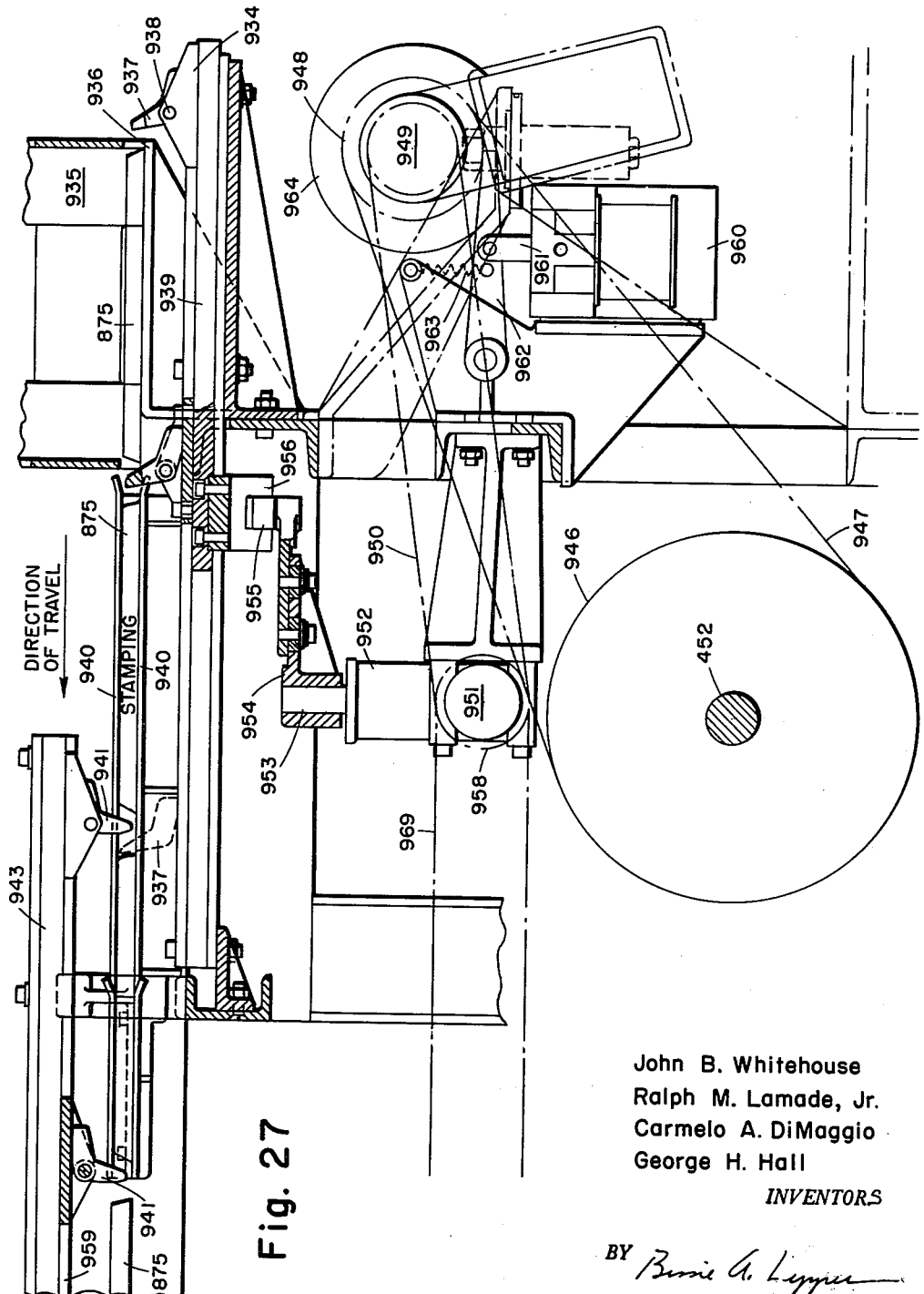
FIG. 27 is an end view (looking toward the front) of the right-hand portion of the box-feeding apparatus and its driving mechanism.

It is the purpose of this station to supply empty boxes to Station O for filling with the banded items as they arrive at that station. Associated with this station may be a means for printing data on one end of the box cover. The boxes may, of course, be marked by printing or gluing on a strip of printed matter before use in the apparatus of this invention. In that case, the printing means, which is in itself not part of this invention as a special piece of apparatus, may be omitted. In FIG. 27 the location of a suitable printing device will be shown along with the means for holding the box in position for printing.

Figure 28:
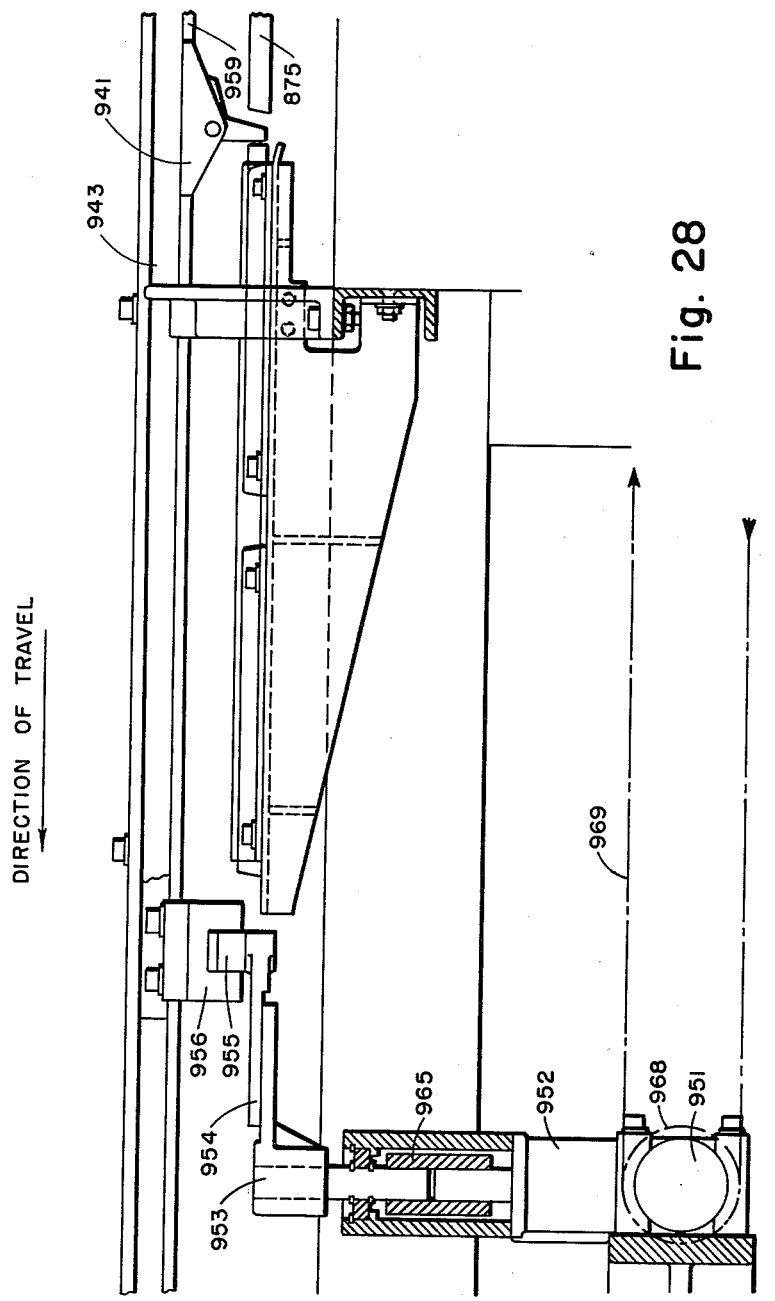
FIG. 28 is an end view of the left-hand portion of the box-feeding apparatus of FIG. 27.

The boxes to be used are conveniently stacked in a vertical box holder as indicated at numeral 935 in FIG. 27 which represents approximately one-half of this station, the remaining half being illustrated in FIG. 28. As one box is removed another one falls into place and it is the purpose of the mechanism of this station to remove the bottom-most box, transport it to the printer where one of the box cover lips may be printed and then further move it to Station O where it is opened, filled and closed.

The box to be delivered, represented by box cover 875, rests on a box holder plate 936. Motion is imparted to the box to be advanced by means of pushers 937 which are rotatably mounted on pins 938. Movement of the pushers 937 is achieved through a Scotch yoke arrangement, the pushers being mounted through a suitable pin support 934 onto a Scotch yoke arm 939. The first stop in the movement of the box is to rest between upper and lower holding plates 940 which serve to hold the box in place during printing if printing is to be a part of the sequence of operations. The second stop for the box is in the idle station and still between plates 940. Subsequently, the movement of the boxes is achieved through additional pushers 941 which depend from a second Scotch yoke arm 943. These pushers 941 take over the movement of the box at the idle station. The box remains there through one operational cycle before being pushed on to the box filling station generally indicated at 959.

The Scotch yokes are driven off the main shaft 452 through sprocket 946 which is mounted on this main shaft, and by means of chain 947 it drives a sprocket 948 mounted on a jack shaft 949. The jack shaft in turn controls and drives the Scotch yoke shaft 951 through chain 950 and sprocket 958. This shaft 951 in turn imparts the required rotating motion to a vertical shaft 953 through a right angle gear 952. Shaft 953 in turn is grounded to Scotch yoke arm 954 to impart the required motion to Scotch yoke pin 955 actuating the Scotch yoke 956 which is grounded to arm 939.

Control of the pusher movement is achieved by solenoid 960 which is shown in FIG. 27 in simplified detail to have an arm 961 which in turn is attached to an acuating arm 962, the latter being spring-loaded to normally remain in its upper position by means of spring 963. Associated with solenoid 960 is a one-revolution clutch 964. When solenoid 960 receives the proper signal (as explained below in Section IX) it pulls arm 961 downwardly, actuates the one-revolution clutch 964, which in turn permits jack shaft 949 to make one revolution and to advance the pushers 937 and 941 through the proper distance by means of the Scotch yoke device described above.

Associated with shaft 951 and sprocket 958 is a second chain 969 which drives a sprocket 968 and hence a shaft 951 which is associated with the second Scotch yoke illustrated in FIG. 28. It will be appreciated that FIGS. 27 and 28 represent the entire end view of the apparatus at this station. The box opening and closing mechanism actually lies midway of this station and box cover 875 is indicated in position for filling in FIGS. 27 and 28.

Figure 29:
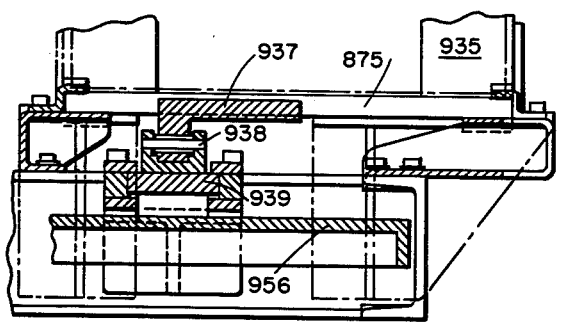
FIG. 29 is a detail of a portion of the driving mechanism of FIG. 27.

FIG. 29 illustrates the Scotch yoke drive for the pusher 937 as it is in position to move the box 875 along out of the box supply stack 935.

It is the purpose of the second Scotch yoke arrangement shown in FIG. 28 to provide the necessary motion to the pushers 941 which are responsible for moving the empty box from the idle station to the box opening and closing mechanism and then to the belt 881 (see FIG. 30), the purpose of which is to carry the filled box to a delivery station. The means for driving pushers 941 is identical with that used to drive pushers 937 and in FIG. 28, like numbers refer to like elements of FIG. 27. For convenience of machinery arrangement, shaft 953 is coupled to angle gear 952 by means of a coupling 965.

A signal to push out another box is sent as described below in Section IX to the solenoid 960 which in turn actuates the one-revolution clutch 964 permitting shaft 949 to rotate, move the pushers 937 through action of the Scotch yoke and push a box along the line to the stamping station. If stamping is to be performed, the mechanism associated with the stamping means (not shown) is driven as described below in Section O. Simultaneously pushers 941 have been caused to advance an empty box to the box loading station 959 and then on to delivery belt 881 after filling has been completed.

VIII. OPENING, FILLING AND CLOSING THE BOX—STATION O

(FIGS. 30–32)

It is the purpose of this station to provide means for opening a box, positioning it so that the banded items may be placed therein, and finally closing the box and passing it on to a delivery belt. The box itself is furnished and printed at Station N, described above in Section VII.

Figure 30:
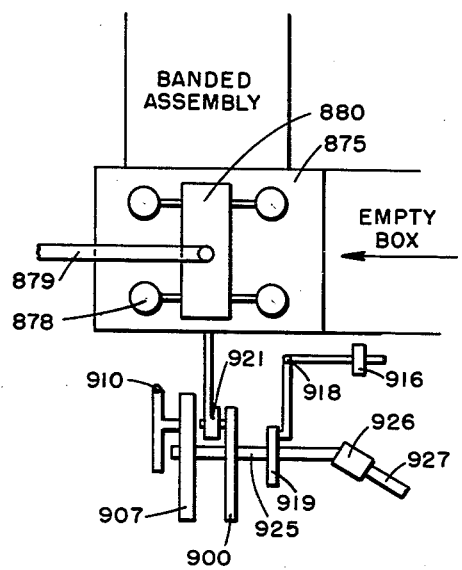
FIG. 30 is a top plan view of the box-filling station.

FIG. 30 is a top plan view of the box loading station. In this figure there will be seen to be provided a box cover 875, which is held in position (as described below) by four vacuum cups 878 after delivery from an idle station 942. The vacuum cups are attached by means of line 879 to a vacuum system not shown and are supported on a frame 880.

Figure 31:
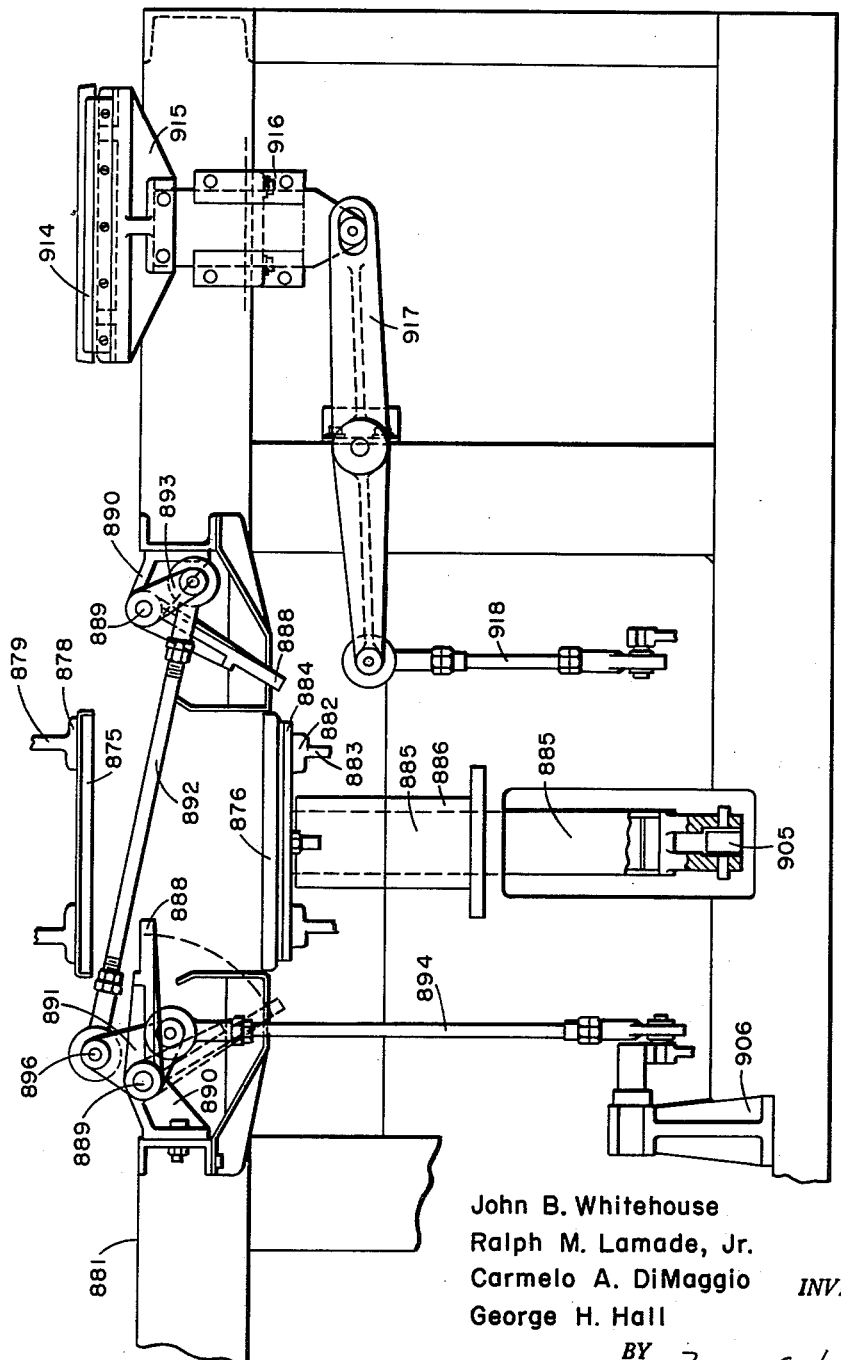
FIG. 31 is an end view of the box-filling mechanism of FIG. 30.

Referring now to FIG. 31 it will be seen that the filling of the boxes is accomplished by holding the box cover 875 in a rigid or fixed position while the bottom of the box 876 is moved downwardly and held in proper relationship with the top of the box 875 so that the box may be subsequently closed after filling. In order to hold the bottom of the box 876 in the desired relationship to the top 875, the bottom is held in position by vacuum cups 882 which in turn are supplied with vacuum through line 883. The bottom of the box 876 rests upon a support plate 884 which is provided with perforations (not shown) so that the vacuum in vacuum cups 862 may be pulled through the perforations and hold the bottom 876. The support 884 in turn rests upon a piston 885 which is movable in a second vertical support 886. The method by which piston 885 is moved vertically will be described below in connection with FIG. 32.

Turning now to the mechanism which is provided for placing the banded items into the box bottom 876, it will be seen that there is provided guide arms 888 which are movable through the arc indicated by the dotted line. In order to illustrate the rotation of arms 888 in FIG. 31, one of the guide arms is shown in its horizontal position while the other is shown in the position it occupies at the time the banded items are received in the box bottom 876. It will be appreciated that these guide arms 888 act together and that at no time do they ever occupy the different relative positions illustrated in FIG. 31. At the time the banded items are delivered to the boxing station, arms 888 are in their horizontal position as represented by that of the left-hand arm in FIG. 31. In this position they receive the banded items and subsequently they are caused to move downwardly through the arc indicated, thus permitting the banded items of nylon hosiery, as in the case of this example, to fall into the box bottom 876. Guide arms 888 in moving through this arc serve as a means for directing the travel of the hosiery into the bottom of the box so that the hosiery does not experience any undesired wrinkling or other misalignment.

Each of the guide arms 888 is rotated about a pivot pin 889 which is in turn mounted on an arm support 890. Rotation of both guide arms 888 is accomplished by means of the vertical motion of arm 894 which in turn moves a triangular head 891 up and down. Attached to head 891 is shaft 896 associated with the left-hand guide arm and an extension shaft 892 is attached, through arm 893, to shaft 889 which is associated with the right-hand guide arm.

Figure 32:
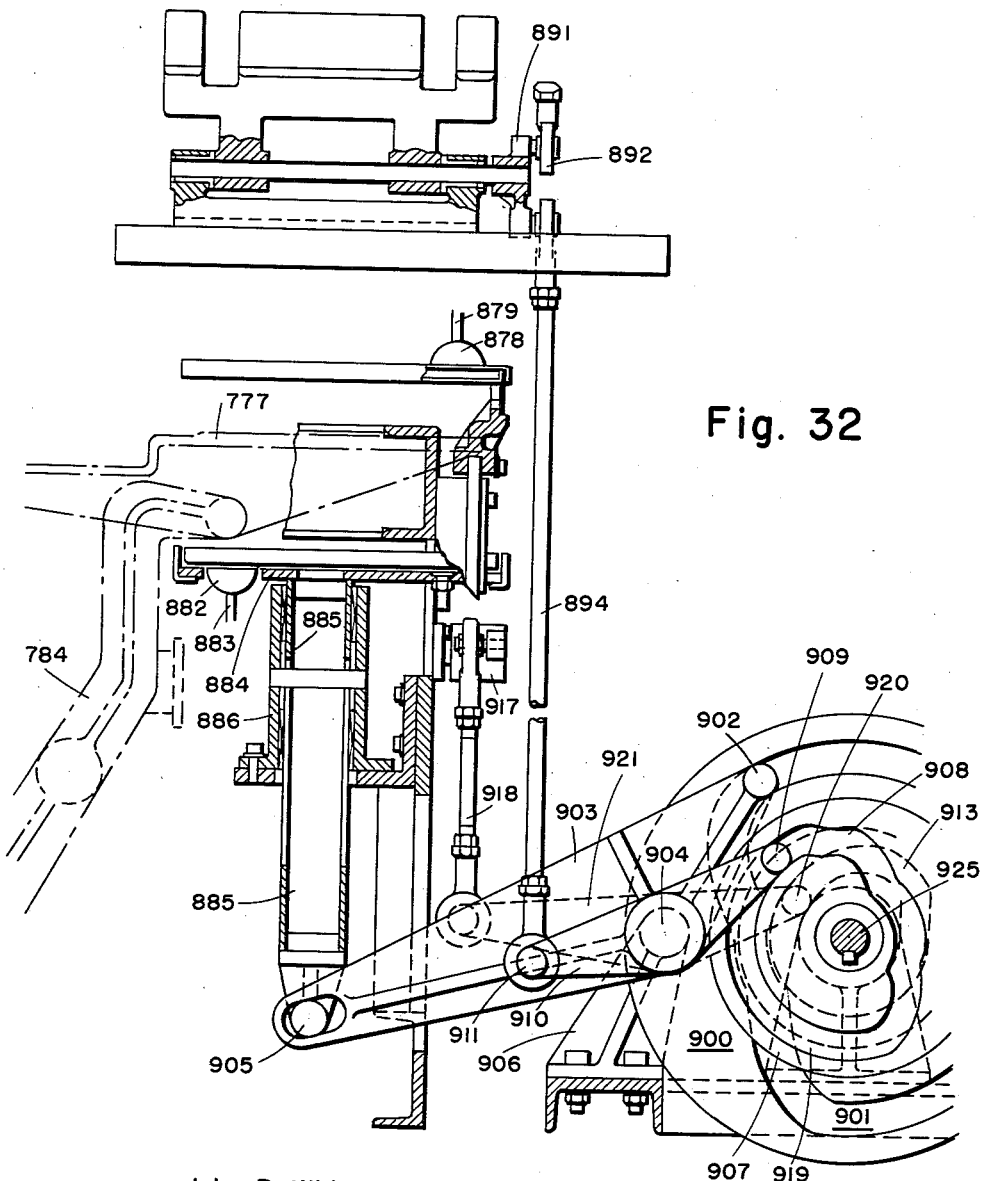
FIG. 32 is a side view partially cut away of the apparatus of FIG. 31.

Turning now to FIGS. 30 and 32, mechanisms associated with the desired motions of arm 894 and piston 885 will be described. In FIGS. 30 and 32 it will be seen that the cams operating the piston 885, which serves to move the bottom of the box up and down, and the shaft 894, which controls the movement of the guide arms 888, are mounted on a shaft 925. This shaft in turn is driven by an auxiliary shaft 927 through a universal joint 926 (see FIG. 30).

On shaft 925 are mounted three cams 900, 907, and 919. Cam 900 is associated with the mechanism for moving the bottom of the box up and down and has associated with it a groove 901, cam follower 902 and cam follower arm 903, pivoting on pin 904 mounted in support 906, which in turn is attached to piston 885 through shaft 905. Thus, moving the cam follower arm 903 gives the piston 885 the necessary up and down motion as controlled by the cam groove 901.

Cam 907 is associated with the mechanism for controlling the movement of the guide arms 888. In FIG. 32 it will be seen to have associated with it a groove 908, cam follower 909 and a cam follower arm 910. This arm in turn is connected to arm 894 through a pin 911 and by imparting the desired up and down motion to arm 894 it will be appreciated that it moves guide arms 888 through the mechanism described in connection with the apparatus of FIG. 31.

In FIGS. 31 and 32 there will be seen to be a third arm 918 which is driven and controlled by cam 919 with groove 913, which has associated with it cam follower 920 and cam follower arm 921. The purpose of shaft 918 is to impart motion to arm 917 which in turn is mechanically connected to a backup bracket 914 mounted on supports 915 and 916. The purpose of this driving mechanism is to provide rigid backup of the box lid lip during the printing operation through the raising of bracket 914 behind this lip as the printing head moves forward and to control and actuate the printer which is of the conventional type operated by a solenoid actuated one-revolution clutch, and which is capable of printing data on the end of the box prior to its delivery to the box opening and closing station. Inasmuch as the printer is a device commercially available and may be any one suitable for printing such data on the end of a box, it need not be described further here.

With the delivery of a box to Station O, the mechanism of FIGS. 30–32 is set in motion. The vacuum is turned on and both the box cover 875 and box bottom 876 are firmly held. Then the cam 900 is rotated causing, by the mechanism described, the box holding plate 884 to be lowered holding the box bottom in alignment. Simultaneously, the transport mechanism has advanced a banded assembly to the guide arms 888 which have now assumed their horizontal position after the bottom of the box is lowered by virtue of the operation of cam 907 and its associated mechanism. The assembly resting on the guide arms may then be deposited in the box bottom by the guide arms moving downwardly, permitting the banded items to fall into the bottom of the box while guiding their fall to achieve perfect alignment. Then the bottom of the box now filled, is moved upwardly into the cover, the vacuum is shut off cups 878 and 882, and the filled box is ready for delivery.

In FIG. 32 a portion of the transport system described in connection with FIG. 22 will be seen. The transport platform 777 of this mechanism picks up the banded package and in its forward motion deposits it on the guide arms 888, which in turn deposits it in the opened box. When the pushers 941 are actuated by the Scotch yoke driving mechanism (as described above) they move the filled box and deposit it on the delivery belt 881 which is an endless conveyor belt of the well known type which is operated continuously from conventional driving means. The endless conveyor belt 881 delivers the filled box at the end of the apparatus where it is picked up.

IX. INSPECTING AND CONTROL

(FIGS. 33–39)

In order for an item to be processed properly in the apparatus of this invention it is necessary that it be placed or delivered upon the horizontal platforms 560 (FIG. 3) of the rotating and aligning station in a manner so that it is in proper alignment for further processing in the apparatus. If the apparatus of this invention is to be used in connection with the automatic handling equipment of Serial No. 792,151 then an operating sensing mechanism is unnecessary since it may be assumed that the two pieces of apparatus will be properly aligned to deliver the folded pair of hosiery in proper condition to the platforms 560 of Station H. However, if the apparatus of this invention is to be used with any other piece of apparatus which does not have an integrated sensing and control mechanism, or if the apparatus of this invention is to be used as a distinct and separate device and the items to be processed are for example placed on it by hand, then it is necessary to provide an inspection system to determine whether or not proper alignment is achieved at Station H. If the alignment is proper, the mechanisms at Stations H and J will operate. If not, these mechanisms will not be actuated since the proper type of signal will not be sent to the solenoids associated with the one-revolution clutch which must be actuated before the mechanisms at Stations H and J can operate.

The inspection mechanism which may be incorporated into the apparatus of this invention is identical with that described for the inspection mechanism placed above the feeding station of the apparatus of Serial No. 792,151. If it is to be used in connection with the apparatus of this invention then it is mounted on the main frame in connection with the rotating and aligning Station H, and more particularly above the plurality of holding platforms 560 (see FIG. 3). The inspection mechanism is illustrated in FIGS. 33–36. FIGS. 33 and 34 show the means whereby the inspection head shaft on which the inspection heads are maintained is rotated to raise and lower the inspection heads as succeeding pairs of hosiery pass under it.

In FIGS. 33 and 34, cam 360 is mounted on main shaft 452 through suitable support 362. This cam 360 imparts up and down motion to a vertical rod 374. This is accomplished through cam follower 364, arms 366 and 368, which are rigidly positioned with respect to each other and rotated about pin 370. Pin 370 is in turn pivotally mounted through bearing 371 on a support plate 372, fixed to the upright 382. Vertical rod 374 is moved up and down through a distance designated β. In moving through this distance β, drive rod 374 imparts a partial turning motion to inspection head shaft 378 through arm 376 which is rigidly connected to shaft 378, and attached to vertical rod 374 through bolt 375. Shaft 378 is permitted to rotate in housing 380 which is also attached to main frame 382 by a suitable device such as bolt 383. Attached to the other side of frame 382 and running lengthwise across and positioned above the holding platforms is an inspection head bridge 384. Suitable connections, such as screws 385, fix bridge 384 rigidly to the uprights of the apparatus and in the required position above the holding platforms.

Referring now to FIGS. 35 and 36, it will be seen how inspection head bridge 384 supports mounting brackets 386 which are slideable on bridge 384 and which are locked into position thereon by adjusting screw 388. Main inspection head shaft 378 effects vertical motion of sensing heads through arm 390 and pin 394. The three sensing heads are actually formed of two parallel nonconducting holders 392 (see FIG. 36) which are spaced apart by spacers 393 and 395, shown in the dotted line in FIG. 35. The sensing heads are pivotally linked by parallel arms 390 and 396 to support brackets 386. The support brackets, and thus the sensing head, are positioned along the bridge piece 384 so each head is directly over one of three of the chosen horizontal platforms that have contact strips 401 and 403 embedded in them.

Figure 37:
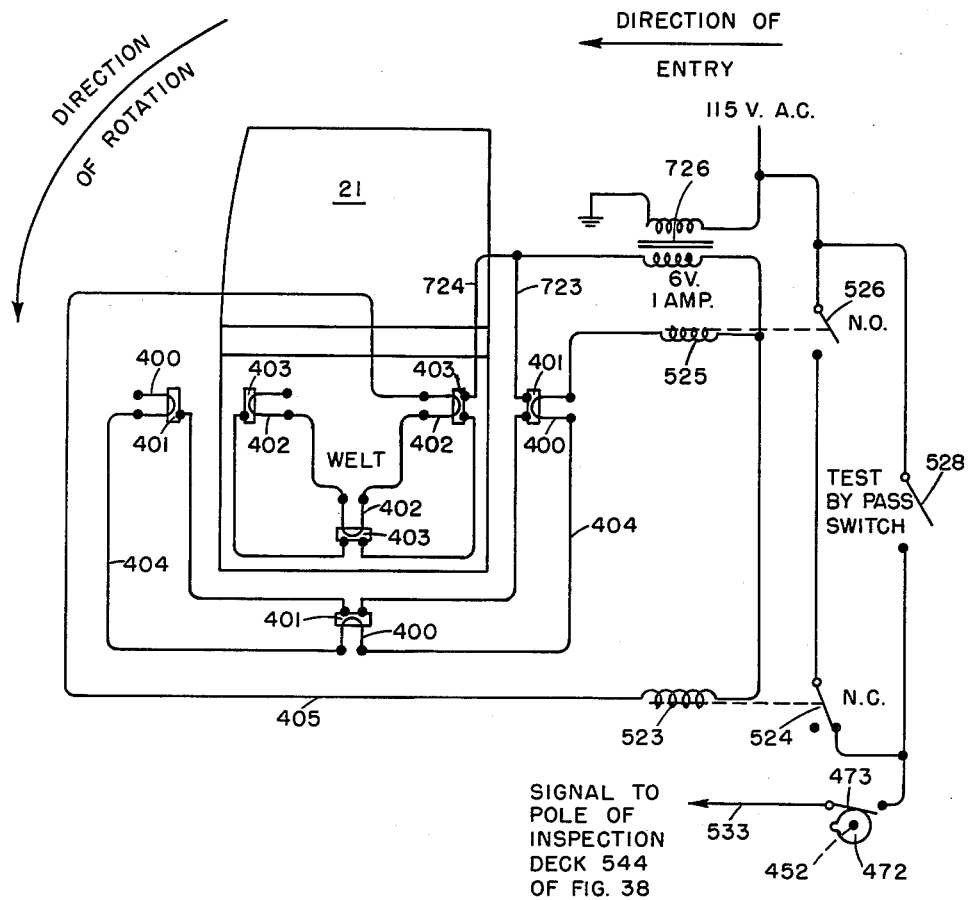
FIG. 37 is a schematic wiring diagram for the three inspection heads.

The sensing heads carry a forward contact spring 400 and an after contact spring 402. Positioned directly under these is a forward contact strip 401 and an after contact strip 403. These contact strips 401 and 403 are embedded flush into horizontal platforms 560 and insulated from them by suitable electrical insulation 497 (see detailed section of FIG. 36). Wire 404 leads from the forward contact springs 400 to a relay, the coil of which is designated 525; wire 405 leads from the after or normally nonconducting contact springs 402 to a relay, the coil of which is designated 523. Wires 723 and 724 are joined to receive 6 volt power from the transformer 726, as seen in FIG. 37. During the operational cycle when a pair of hosiery is being positioned on the horizontal platforms 560, the sensing heads are held in an elevated position by the cam operated linkage (FIGS. 33 and 34) acting through the aforementioned parallel arms 390 and 396. When the hosiery has arrived into position at Station H, the linkage shown in FIGS. 33 and 34 causes the three heads to descend simultaneously until the contact springs make contact with the stocking and/or the contact strips 401 and 403.

A partial end view of this sensing system is shown in FIG. 36 wherein like numbers refer to like parts as in FIG. 35.

Three sensing mechanisms, such as illustrated in FIG. 35, are provided (see FIG. 37). Two of them determine the alignment of the sides of the folded hosiery, while the third checks the alignment of the welt edge so that when the hosiery is rotated through 90° as indicated in FIG. 37, it will arrive at the proper location on the shuttle plate.

In the operation of the sensing head the hosiery is considered to be in proper alignment if the front edge separates the after contact spring 402 from the after contact strip 403 (FIG. 35) and does not separate the forward contact spring 400 from the forward contact strip 401. If these requirements are met for the hosiery positioned with respect to the two sensing heads used to determine the alignment of the sides of the hosiery, the circuit is broken between elements 402 and 403 but not between elements 400 and 401. Under such circumstances a specified signal will be fed into an electric memory system which in turn will control the operation of the mechanism of the subsequent stations as described in detail below. If, on the other hand, the edge of the hosiery is not in a position to break contact between elements 402 and 403, i.e., is too far back; or if the hosiery is so positioned that it is too far forward and hence also breaks the contact between 400 and 401, this information fed into the memory system will alter certain operations along the subsequent stations. More particularly, a signal of this type will cause the hosiery to be ejected and halt the deposition of a tissue sheet on the shuttle plate.

The remaining stations are controlled by a memory and control mechanism associated with Station K wherever it is located, i.e., at the folding position of Station H or at Station L where cards are placed on the assembled items.

The inspection mechanism of FIG. 37 controls by proper signals the ejection mechanism as well as the folding mechanism of Station J, including the up and down motion of the tissue pickup vacuum cups and the on and off of the vacuum for these cups which are responsible for picking up a tissue sheet, the on and off of the vacuum associated with the holding down operation once the tissue holding the hosiery has arrived at the folding, the actuation of the folding arm assemblies to fold the tissue, the chain drive, and the card placing mechanism. This is conveniently accomplished by having a one-revolution clutch associated with each of these mechanical operations which is controlled by a solenoid which in turn derives its signal from the memory device of FIG. 38 and solenoid valves on the vacuum lines which also receive a signal from the memory device.

It is necessary to employ a memory device to halt or actuate the various mechanisms in the proper sequence. Inasmuch as the operations at Stations J and L are of such a nature that the properly stored signals can be fed out in a consecutive nature, an electrical unit is incorporated for this control. This unit may be incorporated in an apparatus such as that described in Serial No. 792,151 in which case it will control the operations of Stations J and L. However, if the item to be processed is delivered to the apparatus of this invention by other means, a memory device may be made a part of this apparatus as described below. It will be understood therefore that the apparatus of this invention may or may not incorporate the inspection and memory devices described in this section.

This unit will have a secondary memory or signal accumulating device whether it has a separate memory device incorporated in it or not. This signal accumulating device, shown in FIG. 39, will receive signals from the main memory device, shown in FIG. 38, and accumulate these signals for use depending upon the predetermined setting of the manually adjustable controls.

If a memory device is to be incorporated in the apparatus of this invention, it will be an electrical device which consists of a multi-deck stepping switch with a plurality of positions for each deck and separate latching relays corresponding to each of these positions. These units are partially shown in FIG. 38, the memory relays I and II representing the latching relays. For simplicity there are only four decks of the multi-deck switching station shown. These four decks of the stepping switch which are shown for illustration are the inspection deck 544, the main control deck 542, and the rotating and aligning decks 546 and 548. There is a deck similar to the rotating and aligning decks 546 and 548 provided for control of card placing at Station L. Further decks can be added to this mechanism if they are necessary for any subsequent operation and it will be appreciated that if the memory device which is to be described is incorporated in an apparatus preceding the apparatus of this invention, the decks controlling the operation of Stations H, J and L will be positioned after those which control the operation of the stations in the preceding apparatus.

There are a plurality of memory relays corresponding to the positions on each deck of the stepping swtch. Thus, one can relate the memory device to the mechanical unit in the following fashion: the decks of the stepping switch correspond to the various stations of the machine and the memory relays correspond to the pairs of hoisery or other items being processed by the machine. When a pair of hoisery for example is fed into the machine, it is inspected for proper alignment and the no-error or error signal is fed into the memory relay corresponding to that pair of hoisery. This relay is then read out by the control system through the position on the deck which corresponds to the station in which the pair of hoisery is then being processed. As the pair of hoisery moves through the successive stations the poles, of which there is one per dcek and which are connected together by virtue of being mounted on a common shaft, are rotated to the successive positions on each deck thereby connecting each memory relay to the mechanism that controls the operation being performed. The pole shaft is operated by a ratcheting solenoid and receives a signal from a cam-switch combination on the main shaft (not shown).

The memory unit will always read an error until a good or no-error signal is fed into it. Thus, if the machine is run with no hoisery being fed into it, or when it is run to finish one lot of hoisery or to start another lot, the control stations will operate the same as they would for an improperly aligned pair of hoisery.

The initial signal is generated at the inspection heads shown in FIGS. 35 and 36. This signal is sent to the memory relay in the fashion shown in FIG. 37 wherein like numbers refer to like elements in FIGS. 35 and 36.

It will be seen in FIG. 37 that proper alignment is determined by three sets of inspection heads, each set being made up of a forward contact spring 400 with a forward contact strip 401 and an after contact spring 402 with an after contact strip 403. If the pair of hosiery lies on the horizontal platforms of Station H so that it is interposed between the after contact springs 402 and the after contact strips 403 and in a position not to extend under the forward contact springs 400, then the proper conditions exist in the electrical system illustrated in FIG. 37 to transmit a signal to the inspection deck pole through a sensitive relay.

When proper alignment is achieved as in FIG. 37, no current can be transmitted from the after contact springs 402 to the after contact strips 403 and hence the circuit represented by lines 405 will be nonconducting. On the other hand, because the hosiery is not interposed between the forward contact springs 400 and forward contact strips 401 positioned directly below them, metal to metal contact is made and current is permitted to flow in lines 404 to give a conducting circuit. Under these circumstances switches 524 and 526 are closed and power is transmitted to result in the generation of a signal to the main control system. The circuit of FIG. 37 also includes auxiliary devices such as coils 523 and 525 and switch 528.

Any other arrangement of conditions which make cricuit 405 conducting or circuit 404 nonconducting will be seen to not result in the transmission of a signal to the main controls. Thus the transmission of current to the control mechanism of FIG. 38 is equivalent to a no-error signal while the transmission of a no-current is equivalent of introducing an error signal into the memory system.

Figure 38:
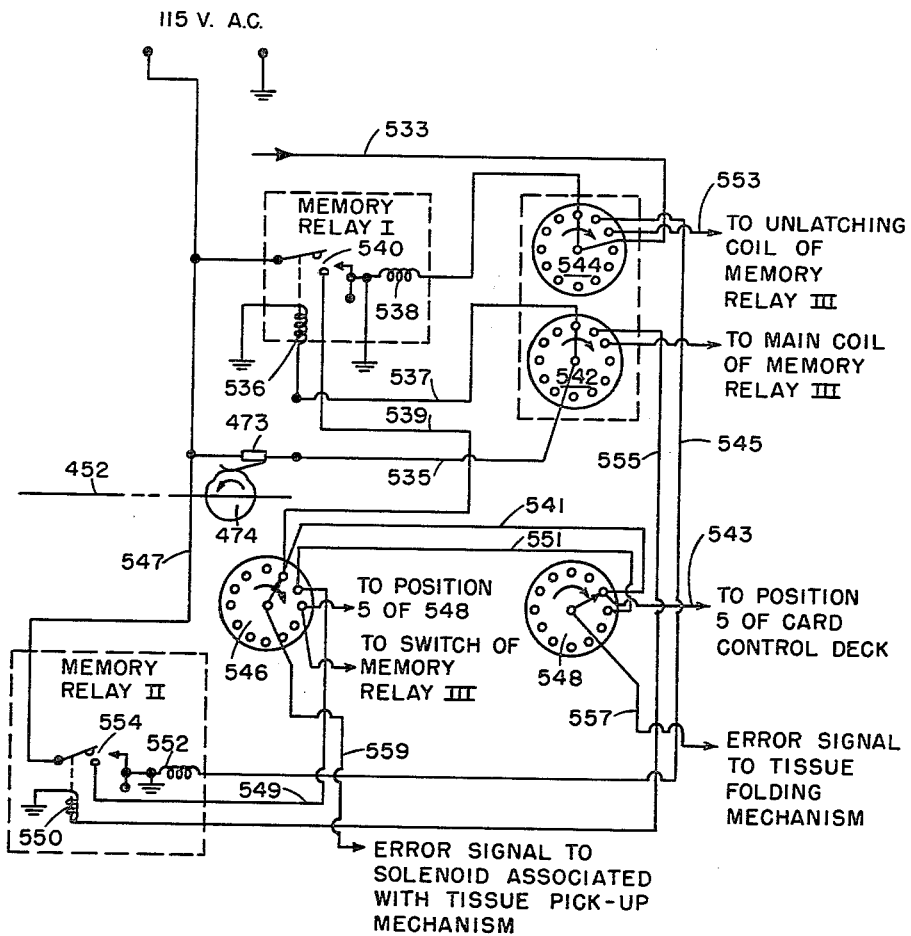
FIG. 38 is a simplified wiring diagram for the control of the apparatus associated with the inspection heads.

The signal transmitted to the apparatus of FIG. 38 is in the form of a pulse due to the cam 472 and switch 473. Cam 472 is mounted on main shaft 452 of the machine and thus will cause switch 473 to be closed once each cycle of the machine. Therefore, if switches 526 and 524 are closed when switch 473 is closed, a pulse of current will flow through circuit 533 to give a no-error signal to the apparatus in FIG. 38. Likewise, if the test bypass switch 528 is closed to simulate a stocking to check out the operation of the various units, a signal will be transmitted through circuit 533.

A simplified schematic diagram of a portion of the electrical control of the apparatus is shown in FIG. 38. In general the controls will be seen to be made up of the cam 474 which is located on the main shaft 452 of the apparatus. Cam 474 actuates the switch 475 associated with it and permits current to pass in circuit 535 by way of the main control deck 542 to energize the main coil 536 of memory relay I through circuit 537. Because of the energization of this main coil 536, switch 540 is closed, but if a no-error signal is received by virtue of current flowing through circuit 533 as described above, the energization of the un-latching coil 538 opens this closed switch 540 and prevents the passing of current through switch 540 in circuit 539.

It will be seen from this description that if no current passes through circuit 533, un-latching coil 538 will not be energized and switch 540 will not be opened. In this case current, signifying an error, will pass through circuit 539 and to the second station of the deck 546 which controls the operation of the tissue pickup mechanism; and because the pole of this deck is moved to the second position, the circuit will be completed through this switching mechanism to send a signal by means of circuit 559 to the solenoid on the tissue pickup mechanism. Likewise, circuit 541 connecting the second position of the tissue pickup deck with the third position of the tissue fold mechanism deck will transmit an error signal by way of circuit 557 to the tissue fold mechanism. This system is continued in a like manner for all of the operations of the apparatus up to the point where a predetermined number of items are to be assembled.

It will be appreciated that in the control system shown in FIG. 38 in order to provide a control deck having for example 12 positions, it is necessary to provide 12 corresponding memory relays which are equivalent to memory relays I and II illustrated. Each of these memory relays works in precisely the same manner as that described for memory relay I, that is, latching coil 552 of relay II operates in the same manner as un-latching coil 538 except that it is connected with the second position of the inspection deck 544 through circuit 545. Likewise the corresponding un-latching coils of the successive memory relays will be connected with the successive positions of the inspection deck 544 such as by circuit 553 which leads to memory relay III (not shown further). In a similar manner, main coil 550 of memory relay II, equivalent in operation to main coil 536 of memory relay I, is connected to the second position of the main control deck 542 through circuit 555). The switches (such as 540 and 554) of the memory relays are connected as through circuits 549 and 539 with successive positions of the controls for the various operations, each one being the next consecutive position from that of the preceding control.

The circuit from each control deck such as 546 (FIG. 38) is connected to the station on the machine associated with it through a circuit such as circuit 559. In series with this circuit is a switch and cam arrangement similar to switch 475 and cam 474, the cam being mounted on main shaft 452 such that a pulse current of a duration necessary to actuate the mechanisms involved is sent through the circuit when the cam closes the normally-open switch.

The poles on each deck are rigidly positioned on a common shaft so that rotation of this shaft moves all of the poles angularly to the next position on its corresponding deck. The shaft is rotated by means of a ratcheting mechanism which is solenoid operated and which moves the shaft through a 30° increment each time the solenoid is actuated, thus moving from one position to the next on each deck. The solenoid is actuated by a cam mounted on the main shaft 452 of the machine, closing in a pulse like fashion a switch similar to 473 in FIG. 38 so that the solenoid will be actuated once each time that the main shaft of the machine makes a complete revolution, regardless of the speed of the machine.

Figure 39:
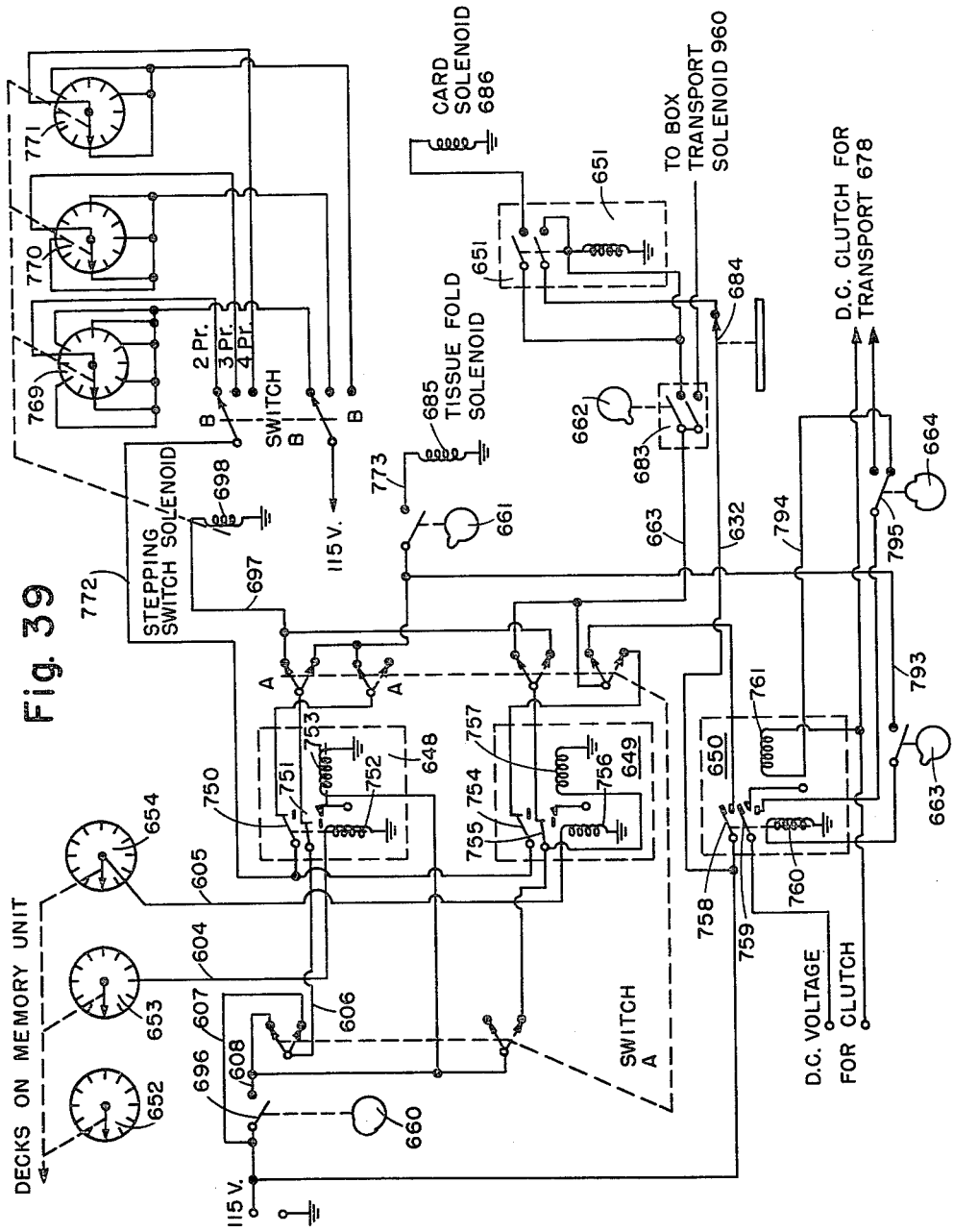
FIG. 39 is a schematic diagram of the accumulator control portion of the control mechanism.

The control means for the accumulation of hosiery and for actuating the mechanisms associated with the packaging of hosiery are illustrated in FIG. 39. This unit is connected to the memory device described herein. In the case where the apparatus of this invention is used in connection with the automatic handling equipment of Serial No. 792,151, the three decks numbered 652, 653 and 654 are the last three decks of the stepping switch used in the memory device of that unit. In the alternative case where the apparatus herein described is used alone, the three decks, 652, 653 and 654, are the decks of the stepping switch to be used in the memory device of this apparatus, and are combined with a control deck and an inspection deck to form a complete unit. The stepping switch is then combined with an appropriate number of latching relays to form a complete memory device. Under this type of operation two of these three deck, 652 and 653, are the decks 546 and 548 shown in FIG. 38.

In FIG. 39, the three decks, 652, 653 and 654, are shown as the last three decks of a stepping switch used in a memory device in automatic handling equipment such as in Serial No. 792,151. Switches A and B are manual selection switches located so that they can be easily operated for changes in the types of operations. Switch A, consisting of six separate switches all banked together, is the one which will cause the accumulation of the folded hosiery to occur either at the folding position of Station J or at Station L where the card is placed on the hosiery; while switch B is provided to set the number of pairs which are to be accumulated. Switch A is shown for the accumulation to occur in Station J where tissue folding is accomplished. Relays 648, 649 and 650 are all of the latching type, and all three are shown in FIG. 39 in the un-latched position. In the case of relay 648, an error signal in the form of a pulse of current would cause coil 752 to close switches 750 and 751 and cause them to be latched in this position. When relay 648 is in the un-latched position as shown, it permits current to flow in a manner to cause operations corresponding to good signals to take place.

All of the cams shown here, 660, 661, 662, 663 and 664, are mounted on shaft 452 (not shown) so that they each make one revolution each time the machine makes a complete cycle. Thus, when cam 660 makes a revolution, it causes switch 696 to be closed for a very short period of time, allowing a pulse of current to flow through it. This pulse of current will flow through circuit 608, through circuit 606, through switch 751 of relay 648, through circuit 697 and through the stepping switch solenoid 698. This stepping switch contains three decks, 769, 770 and 771. Deck 769 is wired on every other position so that it will permit a circuit to be closed for each two pairs of hosiery counted. Deck 770 is wired for three pair of hosiery, and deck 771 is wired for four pair of hosiery. It can be seen that with switch B set for counting two pair, a complete circuit is made each time that the pole on deck 769 is moved ahead two positions and this causes a current to flow in circuit 772. It can be seen that, by changing switch B to either of the other two positions, the unit counts off either three or four pair of hosiery before causing a current to flow in circuit 772.

The current flowing in circuit 772 flows through switch 750 and into circuit 773. Cam 661 causes its switch to be closed long enough to properly actuate the tissue fold solenoid 685 to allow this operation to take place. The current in circuit 772 also flows through circuit 793 to the coil 760 in relay 650 when cam 663 causes its switch to be closed. Coil 760 closes switches 758 and 759 in this relay and they remain closed until the un-latching coil 761 is energized. Closing switch 759 will then permit the D.C. current to flow through circuit 794 and cause the un-latching coil 761 to unlatch the switches when the cam 664 is as shown. However, due to proper synchronization of the cam operations, the cam 664 is in such a position to cause switch 795 to be in the other position which will allow the D.C. current to flow on to the D.C. electric clutch 678, shown in FIG. 15. Also when switch 758 is closed as described above, current will flow through circuit 632, through switch 758 and through circuit 633. This current flowing in circuit 633 allows a pulse of current to flow through switch 683 to the box transport solenoid 960 and to the card placing apparatus. With switch 684 normally closed as shown until a card opens it as the card moves past it, the pulse of current through one side of switch 683 causes relay 651 to close the two switches in it. These switches will stay closed until the circuit is broken by the card opening switch 684. When these switches are closed, the card solenoid 686 is closed to allow for the placing of the card on the assembly of folded hosiery. The use of the signal to the box transport solenoid 960 is discussed below.

It can be seen that with switch A positioned as shown in FIG. 39, hosiery is accumulated at the tissue fold station, the tissue is then folded over after the proper number of pairs of hosiery (in this example this will be two pairs) has accumulated, then after proper timing the tissue-wrapped hosiery assembly is transported to the card placing Station L, and then the previously transported pairs of hosiery receive a card and, as explained below, this assembly is transported to the banding Station M. It can also be seen that the signals from deck 654 are not used for controlling the hosiery, and that likewise, relay 649 is not used in this case.

By switching switch A to the other position as shown with broken lines in FIG. 39, the sequence of operations is changed to cause each pair of hosiery to be folded in tissue and to cause the pairs of hosiery to accumulate at the card placing Station L. With switch A changed to that shown in the broken lines, the current will flow through circuits 697 and 696, through switch 751 in relay 648 as long as there is no error signal from deck 653, and through circuit 773 to the tissue fold solenoid 685. Thus, so long as there is no error signal or current to cause switch 751 to be latched open, the tissue fold solenoid will be actuated by the action of cam 661 closing its switch on each cycle of the machine. Also, the D.C. electric clutch 687 will be actuated to transport this pair of hosiery after the tissue is folded to the card placing Station L. An error signal from deck 654 through circuit 605 will now cause coil 756 in relay 649 to open switches 754 and 755 and latch them open until coil 757 causes them to be unlatched. With relay 649 in the unlatched position as shown, the pulse of current due to the closing of the switch momentarily by cam 660 will flow through circuits 608 and 609, through switch 755 and through circuit 697 to actuate the stepping switch solenoid 698. This will cause, as described above, the poles of the stepping switch to advance one position. Depending on how switch B is positioned, this unit will count off two, three or four pairs of hosiery accumulating in the card Station L. When the pole moves to a position which causes a complete circuit to be closed, the current flows through circuit 772, through switch 754 of relay 649 and through circuit 633 to cause the card to be placed on the hosiery and the hosiery to be moved in the same manner as described above.

It can be seen that with switch A in the position shown by the broken lines in FIG. 39, the pair of hosiery will be folded with a sheet of tissue in Station J, be moved to the card placing Station L where either two, three or four pairs accumulate, and then a card placed on the resulting assembly of hosiery pairs. Just after this happens, as is explained below, the stack will be transported to the banding Station M.

The banding and boxing operations, previously described in Sections VII and VIII, are comprised of four main operations. These are: the transporting mechanism, the package bander, the box transport, and the box opening and closing mechanism. The box printing operation is one which occurs along with these four main operations, but is considered a secondary one. Each of these five operations is actuated by a single revolution clutch operated by a solenoid, with each clutch mounted on a jack shaft which receives its power from the main shaft 452. An example of this is shown in FIG. 27. Also mounted on each of these jack shafts is a cam (not shown) which actuates a normally open switch (not shown).

The action of the jack shaft in making one complete revolution each time its single revolution clutch is tripped causes the cam to close the switch so that the subsequent operation can be actuated. In this manner, these operations are actuated in a sequential manner. Thus, the signal described above as the one which actuates the solenoid on the box transport mechanism 960 causes the box transport mechanism to function. The box transport mechanism in turn actuates the box opening and closing operation which in turn actuates the transport mechanism which in turn actuates the banding mechanism. The box printing mechanism is actuated by a switch which is mounted in such a manner that it is closed by the motion of arm 917 which is described in Section VIII.

The entire operation is timed as follows: the box transport mechanism is actuated as noted above; the box printer is actuated so that the printing head contacts the end of the box when the back up arm 914 is inserted behind the lip of the box top; the box opening operation starts after the new box has been transported into position; the transport mechanism is actuated so that the banded package of hosiery is placed on the guide arms 888 when the arms are in their horizontal position; and the banding mechanism is actuated so that its operation starts when the transport mechanism has completed its cycle. In this manner the stacks of hosiery are moved through the banding and idle stations into the open box on subsequent operations of the entire operation. Likewise, the box is removed from the bottom of the magazine stack, has the lip on one end printed, is moved through the opening and closing station and then onto the belt conveyor which is described in Section VIII.

It will be seen from the above that the inspection and control system of the apparatus of this invention achieves reliable and accurate handling of the items and eliminates the processing of misaligned items. The ultimate result is the accurate processing of any predetermined number of items in a selected type of arrangement and the final deposition of this predetermined number of items in a banded condition into a box.

X. OPERATION

In order to more clearly and concisely illustrate the operation of the apparatus of this invention it will be convenient now to trace the travel of several pairs of hosiery through the various operation stations. It will be assumed for this example that three pairs of hosiery are to be placed in a box in a single arrangement, i.e., each pair is to be wrapped separately in tissue and then the three wrapped pairs are to be banded. Thus the assembly Station K will be associated with Station L where the cards or other typed or written matter are to be placed on the assembled items.

Figure 3:
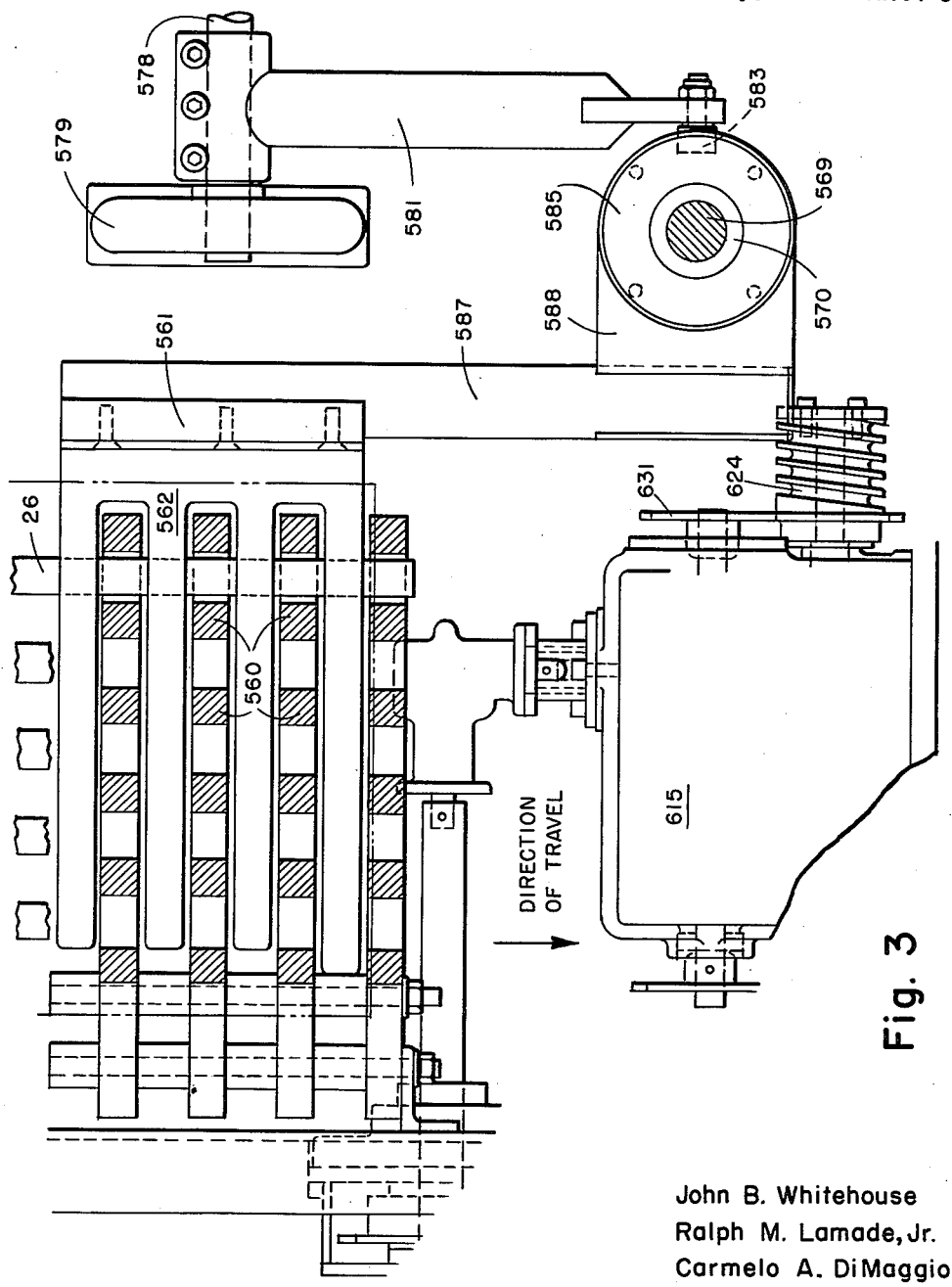
FIG. 3 is a top plan view of the mechanism for aligning and delivering the item to be wrapped in tissue sheet.

A properly folded pair of hosiery is first deposited on the horizontal platforms 560 (FIG. 3). These are then picked up by the tynes 562 of the spatula conveyor 561, and by the mechanism described, the pair of hosiery is raised above the platforms 560 and rotated through 90° to be delivered to Station H. In the meantime the shuttle plate occupies a position back of the tissue supply magazine 615, the vacuum in the vacuum cups 635 has been turned on and the vacuum cups themselves have been positioned over the after end of a tissue sheet in the magazine. The tissue is picked up by virtue of the fact that the vacuum cups are then raised by the mechanism of FIGS. 9 and 10 to hold the tissue in position so that when the shuttle plate 600 is moved to its forward-most location by the mechanism of FIGS. 13–15 the tissue may be dropped onto the shuttle plate to be laid there as a single sheet. At this point the spatula conveyor moves into position over the shuttle plate and is lowered into position as shown in FIG. 5. With the movement of the shuttle plate 600 toward its forward-most position in the cycle, the wedges 602 permit the shuttle plate to withdraw the hosiery onto the tissue in proper position and be held by vacuum in holes 661 (FIG. 12), and the spatula conveyor is free to return to Station H to pick up an additional pair of hosiery.

The forward-most position of the shuttle plate is at the folding position of Station H (FIG. 6) where the vacuum mechanism, comprising vacuum cups 672, holds the tissue sheet with the hosiery on it into position while the shuttle plate is withdrawn again to its forward position. Upon arrival of the tissue holding the hosiery at the folding position, the folding mechanism of FIG. 18 is actuated to fold and crease the sides of the tissue over the hosiery. As explained in connection with FIGS. 19 and 20 it is possible to choose by moving the lever arm 733 whether the right side of the tissue is to be folded over the left side or the left side over the right side. Now that the tissue has been wrapped about the stocking the pushers 717 on chain 718 come into position and push the wrapped pair of hosiery onto Station L.

As pointed out above, in this example it will be assumed that three properly wrapped pairs of hosiery must be assembled at Station L before they can move on as an assembled group for further processing. When three such pairs have been assembled at Station L the mechanism for ejecting a card by the device shown in FIG. 21 is actuated and a card is placed on top of the three pairs of hosiery. Then the transport mechanism of FIG. 22 is actuated to pick up the assembled pairs and move them to the banding station illustrated in FIGS. 23–26. At this station the vacuum cups 802 and 803 pick up a band, the main support head 817 then swings through an angle of approximately 90° into operating position while the triangular head support 799 (FIGS. 25 and 26) is maintained in its horizontal position. Subseqeuntly arms 806, holding the faster and slower moving vacuum cups 802 and 803, are caused to rotate thus swinging these vacuum cups holding the ends of the band around the assembled pair of hosiery. By virtue of the arrangement explained in Section VI one of these arms rotates faster than the other so that one end of the band can be wrapped over the other. With the application of pressure through hammer 807 and anvil 850 the pressure-sensitive adhesive placed upon the ends of the band fixes this band in position in a manner so that the seam is under the assembly. Subsequently the transport mechanism of FIG. 22 advances the banded assembly to an idle station.

Simultaneously the box supply mechanism of FIG. 27 has caused the Scotch yoke arrangement to actuate the pushers 937 which push a box into position. The box may, at this point, be stamped or printed on one end if markings had not already been placed on it. From the stamping position the box is then pushed by pushers 941 to Station O where the vacuum cups separate the top from the bottom and the bottom is moved downwardly permitting the guide arms 888, which then receive a banded assembly of items from the idle station, to swing downwardly and deposit the banded assembly into the box bottom. Then the bottom is raised to fit into the top, the vacuum in cups 878 and 882 is released and the filled box is subsequently pushed to the conveyor 881 which takes the completed boxed item to the end of the apparatus to be picked up.

Modifications of various components of the apparatus of this invention will occur to those skilled in the art and such modifications are contemplated as being within the scope of this invention. It should be understood, therefore, that the foregoing description is for the purpose of illustration only, and that the invention includes all modifications falling within the scope of the appended claims.

We claim:

1. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped item; first transport means associated with said folder means and said card placement means adapted to advance said tissue-wrapped item from said folding means to said card placement means; banding means adapted to permanently affix a band around said tissue-wrapped item; idle holding station means adapted to temporarily hold the resulting tissue-wrapped item; second transport means adapted to advance succeeding tissue-wrapped items from said card placement means to said banding means and subsequently said banded item to said idle holding station means; box supply means; box opening and closing means; platform means, adapted to receive said banded item from said idle holding station means, associated with said box opening and closing means and adapted to deposit and direct said banded item into the bottom of said box; pusher means adapted to advance succeeding boxes from said box supply means to said box opening and closing means; third transport means for transferring said banded item from said idle holding station means to said platform means; conveyor means for carrying away the resulting filled box; and mechanical driving means adapted to drive, control and time the operation of each of the aforesaid means whereby said sheer item is wrapped, banded, boxed and delivered.

2. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; control means associated with said folder means adapted to permit the formation of an assembly of a predetermined number of said tissue sheets holding said sheer items prior to the operation of said folder means; means for moving said flat plate means back and forth between a position over said tissue supply means and said folder means; card placement means adapted to eject a card onto said assembly of tissue-wrapped item; first transport means associated with said folder means and said card placement means adapted to advance said assembly from said folding means to said card placement means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive, control and time the operation of each of the aforesaid means whereby said sheer item is wrapped, banded, boxed and delivered.

3. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item to form a tissue-wrapped item; means for moving said flat plate means back and forth between a position over said tissue supply means and said folder means; card placement means adapted to eject a card onto the resulting tissue-wrapped item; control means associated with said card placement means adapted to permit the formation of an assembly of a predetermined number of said tissue-wrapped items prior to the operation of said card placement means; first transport means associated with said folder means and said card placement means adapted to advance said tissue-wrapped item from said folding means to said card placement means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive, control and time the operation of each of the aforesaid means whereby said sheer item is wrapped, banded, boxed and delivered.

4. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport associated with said folder means and said card placement means adapted to advance said tissue-wrapped items from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means adapted to recieve said banded assembly from said idle holding station means associated with said box opening and closing means and adapted to deposit and to direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

5. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; vacuum cup means for transferring said tissue sheet from said tissue supply means to said flat plate means; interdigitated spatula conveyor means for picking up said sheer item from said horizontal platforms of said horizontal holding means and placing it on said tissue sheet on said flat plate means; holding means associated with said interdigitated spatula means adapted to maintain said sheer item in a flat, properly aligned condition on said tissue sheet upon withdrawal of said conveyor means; folder means adapted to wrap the sides of said tissue sheet about said sheer item; means for moving said flat plate means back and forth between a position over said tissue supply means and said folder means; card placement means adapted to eject a card onto the resulting tissue-wrapped item; first transport means associated with said folder means and said card placement means adapted to advance said tissue-wrapped item from asid folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded tissue-wrapped item; second transport means adapted to advance succeeding assemblies from said card placement means to said banding means and subsequently said banded item to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

6. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means incorporating means for maintaining said tissue sheets at a predetermined level and means for adjusting the position of said tissue sheet supply means with relation to the position of said flat plate means; vacuum cup means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped item; first transport means associated with said folder means and said card placement means adapted to advance said tissue-wrapped item from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded tissue-wrapped item; second transport means adapted to advance succeeding assemblies from said card placement means to said banding means and subsequently said banded item to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

7. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item and incorporating vacuum holding means adapted to maintain said tissue sheet in a flat extended position to receive said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; vacuum cup means associated with said folder means for holding said tissue sheet containing said sheer item in position at said folder means during the withdrawal of said flat plate means from said folder means; card placement means adapted to eject a card onto the resulting tissue-wrapped item; first transport means associated with said folder means and said card placement means adapted to advance said tissue-wrapped item from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded tissue-wrapped item; second transport means adapted to advance succeeding assemblies from said card placement means to said banding means and subsequently said banded item to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

8. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; said folder means comprising horizontal plate holding means incorporating vacuum means for holding said tissue sheet in place during folding and roller means adapted to roll and crease the sides of said tissue sheet over said sheer item lying thereon; means for moving said flat plate means back and forth between a position over said tissue supply means and said folder means; card placement means adapted to eject a card onto the resulting tissue-wrapped item; first transport means associated with said folder means and said card placement means adapted to advance said tissue-wrapped item from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded tissue-wrapped item; second transport means adapted to advance succeeding assemblies from said card placement means to said banding means and subsequently said banded item to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

9. Apparatus in accordance with claim 8 further characterized by having means associated with said folder means whereby the order in which said sides of said tissue sheet are rolled and creased over said sheer item may be preselected.

10. Apparatus for automatically processing sheer items, comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped item; first transport means associated with said folder means and said card placement means adapted to advance said tissue-wrapped item from said folding means to said card placement means; assembly station means for assembling a predetermined number of tissue-wrapped items to form an assembly of said tissue-wrapped items; control means associated with said assembly station means adapted to actuate all succeeding means beyond said assembly station means; band supply means; arm means supporting vacuum cup means and adapted to pick up the two ends of a flexible band from said band supply means; and means for rotating said arm means in sequence thereby to cause one end of said band to overlap the other end and to permanently affix said band around said assembly; idle holding station means adapted to temporarily hold the resulting banded tissue-wrapped item; second transport means adapted to advance succeeding assemblies from said card placement means to said banding means and subsequently said banded item to said idle holding station means; box supply means; box opening and closing means; platform means, adapted to receive said banded assembly from said idle holding station means, associated with said box opening and closing means and adapted to deposit and direct said banded assembly into the bottom of said box; pusher means adapted to advance succeeding boxes from said box supply means to said box opening and closing means; conveyor means for carrying away the resulting filled box; and mechanical driving means adapted to drive and time the operation of each of the aforesaid means whereby said sheer article is wrapped, banded, boxed and delivered.

11. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly of said tissue-wrapped items; control means associated with said assembly station means adapted to actuate all succceeding means beyond said assembly station means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means and comprising successive movable platforms rigidly connected with spacings therebetween corresponding to the spacings between said card placement means, said banding means and said idle holding station means, and means for imparting to said transport means an upward-backward-downward-forward motion; box supply means; box opening and closing means; platform means adapted to receive said banded assembly from said idle holding station means, associated with said box opening and closing means, and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

12. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; stamping means adapted to print on the end of said box; platform means adapted to receive said banded assembly from said idle holding station means, associated with said box opening and closing means, and adapted to deposit and direct said banded assembly into the bottom of said box; pusher means adapted to advance succeeding boxes from said box supply means to said stamping means and then to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped, banded, boxed and delivered.

13. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means comprising means for holding the top of said box in position, and means for lowering and raising the bottom of said box while maintaining its relative position with said top so that when said bottom receives said item and is raised, said box will be closed; platform means adapted to receive said banded assembly from said idle holding station means, associated with said box opening and closing means, and adapted to deposit and direct said banded assembly into the bottom of said box during the time the bottom of said box is in its lowermost position; pusher means adapted to advance succeeding boxes from said box supply means to said box opening and closing means; third transport means for transferring said banded assembly from said idle holding station means to said platform means; conveyor means for carrying away the resulting filled box; and mechanical driving means adapted to drive and time the operation of each of the aforesaid means whereby said sheer item is wrapped.

14. Apparatus for automatically processing sheer items comprising horizontal holding means characterized by being a plurality of small horizontal platforms defining spaces therebetween and adapted to receive and hold a sheer item aligned within predetermined limits with respect to said holding means; inspection means associated with said horizontal means adapted to determine whether said sheet item is aligned within said predetermined limits; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly of said tissue-wrapped items; control means associated with said assembly station means adapted to actuate all succeeding means beyond said assembly station means; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means adapted to receive said banded assembly from said idle holding station means, associated with said box opening and closing means, and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; mechanical driving means adapted to drive and time the operation of each of the aforesaid means whereby said sheer item is wrapped, banded, boxed and delivered; and control means associated with said inspection means adapted to control the operation of all of said means up to said assembly station means.

15. Apparatus for automatically processing sheer items comprising horizontal holding means characterized by being a plurality of small horizontal platforms defining spaces therebetween and adapted to receive and hold a sheer item aligned within predetermined limits with respect to said holding means; flat plate means adapted to hold a tissue sheet larger than said sheer item; tissue sheet supply means; means for transferring said tissue sheet from said tissue supply means to said flat plate means; conveyor means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly including switching means for preselecting said predetermined number; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means adapted to receive said banded assembly from said idle holding station means, associated with said box opening and closing means, and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; mechanical driving means adapted to drive and time the operation of each of the aforesaid means whereby said sheer item is wrapped, banded, boxed and delivered; and control means associated with said assembly station means adapted to actuate said mechanical driving means associated with the operation of each of the succeeding means beyond said assembly station means when said predetermined number has been assembled.

16. Apparatus for automatically processing sheer items comprising horizontal holding means characterized by being a plurality of small horizontal platforms defining spaces therebetween and adapted to receive and hold a sheer item aligned within predetermined limits with respect to said holding means; inspection means associated with said horizontal means adapted to determine whether said sheer item is aligned within said predetermined limits; flat plate means adapted to hold a tissue sheet larger than said sheer item; tissue sheet supply means; means for transferring said tissue sheet from said tissue supply means to said flat plate means; conveyer means for picking up said sheer item from said horizontal platforms of said horizontal holding means and placing it on said flat plate means; folder means adapted to wrap the sides of said tissue sheet about said sheer item; means for moving said flat plate means back and forth between a position over said tissue supply means and said folder means; card placement means adapted to eject a card onto the resulting tissue-wrapped items; first transport means associated with said folder means and said card placement means adapted to advance said tissue-wrapped items from said folding means to said card placement means; assembly station means for assembling a predetermined number of tissue-wrapped items to form an assembly including switching means for preselecting said predetermined number; banding means adapted to permanently affix a band around said assembly; idle holding station means adapted to temporarily hold the resulting banded assembly; second transport means adapted to advance succeeding assemblies from said card placement means to said banding means and subsequently to said idle holding station means; box supply means; box opening and closing means; platform means adapted to receive said banded assembly from said idle holding station means, associated with said box opening and closing means, and adapted to deposit and direct said banded assembly into the bottom of said box; pusher means adapted to advance succeeding boxes from said box supply means to said box opening and closing means; third transport means for transferring said banded assembly from said idle holding station means to said platform means; conveyor means for carrying away the resulting filled box; mechanical driving means adapted to drive and time the operation of each of the aforesaid means whereby said sheer item is wrapped, banded, boxed and delivered; first control means associated with said inspection means adapted to control the operation of all of said means up to said assembly station means; and second control means associated with said assembly station means adapted to actuate said mechanical driving means associated with the operation of each of the succeeding means beyond said assembly station means when said predetermined number has been assembled.

References Cited in the file of this patent

UNITED STATES PATENTS

| | | |
|---|---|---|
| 1,873,059 | Smith et al. | Aug. 23, 1932 |
| 1,969,160 | Slusher | Aug. 7, 1934 |
| 2,010,523 | McClatchie | Aug. 6, 1935 |
| 2,163,572 | Crosby | June 27, 1939 |
| 2,251,671 | Forst et al. | Aug. 5, 1941 |
| 2,780,044 | Dewyer | Feb. 5, 1957 |
| 2,902,806 | Whitecar | Sept. 8, 1959 |
| 2,906,075 | Vogel | Sept. 29, 1959 |